(12) United States Patent
Johnson

(10) Patent No.: US 11,304,283 B2
(45) Date of Patent: Apr. 12, 2022

(54) LIGHTING SYSTEM AND METHOD THEREOF

(71) Applicant: JOHNSON SYSTEMS INC., Calgary (CA)

(72) Inventor: Shaun Johnson, Calgary (CA)

(73) Assignee: Johnson Systems Inc., Calgary (CA)

( * ) Notice: Subject to any disclaimer, the term of this patent is extended or adjusted under 35 U.S.C. 154(b) by 0 days.

(21) Appl. No.: 17/513,035

(22) Filed: Oct. 28, 2021

(65) Prior Publication Data

US 2022/0061140 A1 Feb. 24, 2022

Related U.S. Application Data

(62) Division of application No. 17/273,692, filed as application No. PCT/CA2019/051311 on Sep. 16, 2019.

(60) Provisional application No. 62/732,363, filed on Sep. 17, 2018, provisional application No. 62/732,380, filed on Sep. 17, 2018.

(51) Int. Cl.
| | |
|---|---|
| H05B 47/10 | (2020.01) |
| H05B 47/165 | (2020.01) |
| H05B 47/115 | (2020.01) |
| H05B 47/11 | (2020.01) |
| H05B 45/46 | (2020.01) |
| H02G 3/10 | (2006.01) |

(52) U.S. Cl.
CPC ............ *H05B 47/165* (2020.01); *H02G 3/10* (2013.01); *H05B 45/46* (2020.01); *H05B 47/11* (2020.01); *H05B 47/115* (2020.01)

(58) Field of Classification Search
CPC ........ H05B 47/00; H05B 47/10; H05B 47/11; H05B 47/115; H05B 47/165; H05B 45/10; H05B 45/40; H05B 45/46; H02G 3/08; H02G 3/10
See application file for complete search history.

(56) References Cited

U.S. PATENT DOCUMENTS

| | | | | |
|---|---|---|---|---|
| 2009/0278479 | A1* | 11/2009 | Platner | ................. H05B 47/175 315/312 |
| 2018/0116035 | A1* | 4/2018 | Snyder | ................... H05B 47/18 |

FOREIGN PATENT DOCUMENTS

CN 104115564 B * 2/2017 ............. H05B 45/48

* cited by examiner

*Primary Examiner* — Jimmy T Vu
(74) *Attorney, Agent, or Firm* — Gowling WLG (Canada) LLP

(57) ABSTRACT

A lighting system has a plurality of central-control devices and a plurality of groups of local light-control devices. The central-control devices are electrically connected in a first daisy-chain form. Each group of local light-control devices are electrically connected in a second daisy-chain form. Each group of local light-control devices are connected to one of the plurality of central-control devices.

18 Claims, 39 Drawing Sheets

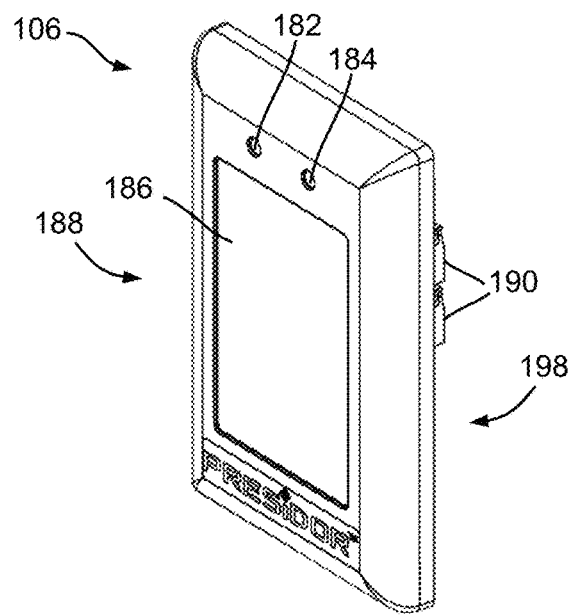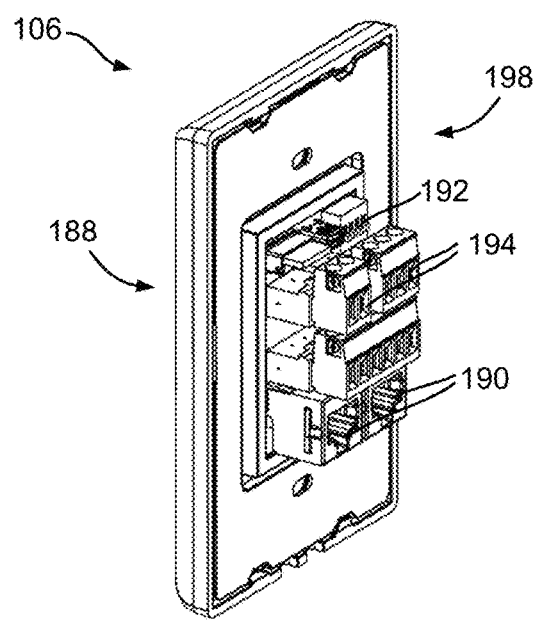
FIG. 6A   FIG. 6B
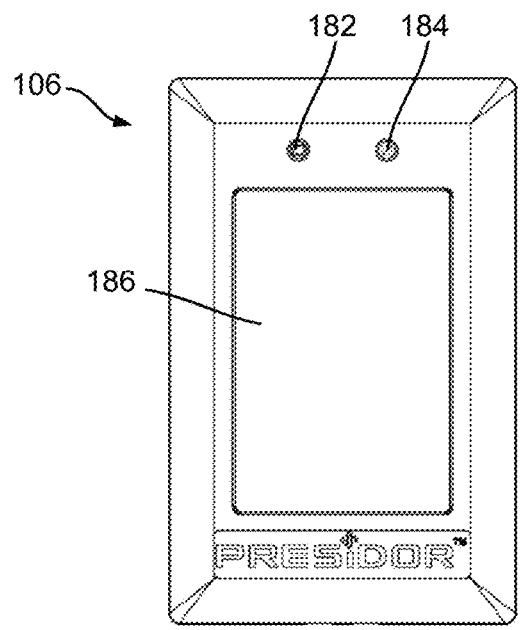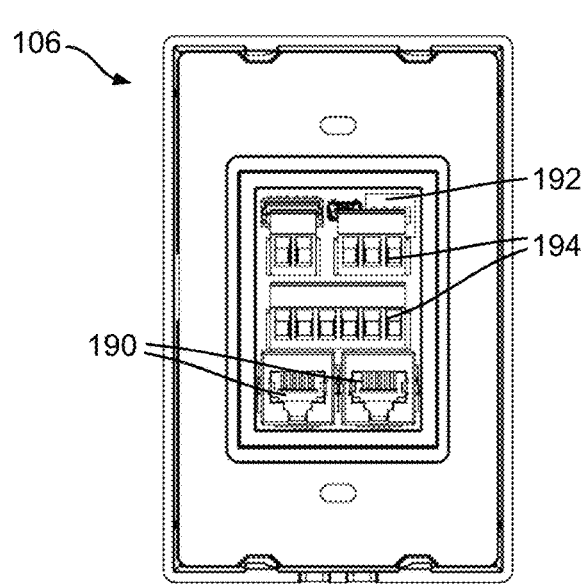
FIG. 6C   FIG. 6D

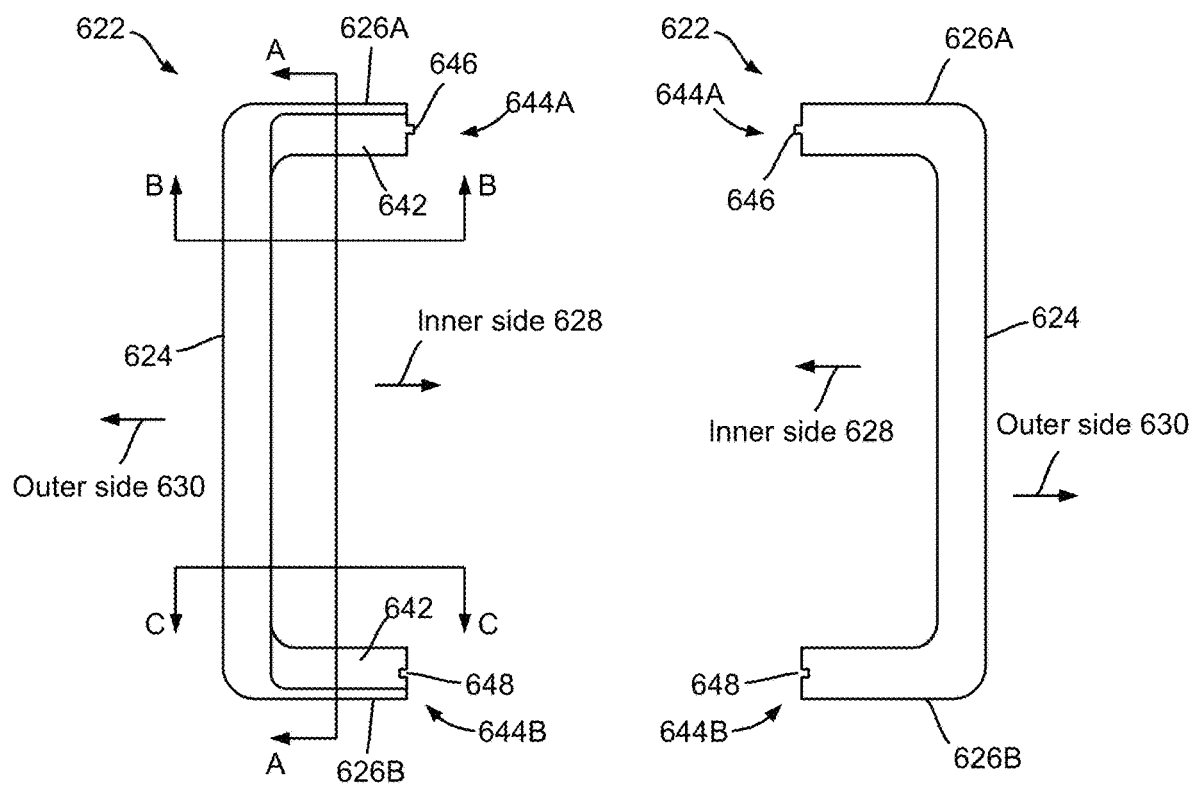
FIG. 16  FIG. 17
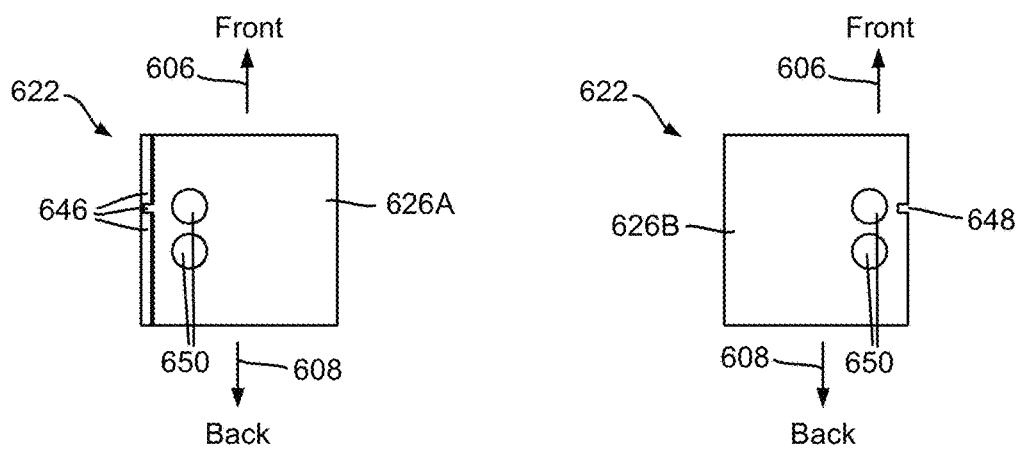
FIG. 18  FIG. 19

LIGHTING SYSTEM AND METHOD THEREOF

CROSS-REFERENCE TO RELATED APPLICATIONS

This application is a division of patent application Ser. No. 17/273,692, filed on Mar. 4, 2021, which claims the benefit of U.S. Provisional Patent Application Ser. No. 62/732,363 filed Sep. 17, 2018, and 62/732,380 filed Sep. 17, 2018, the content of each of which is incorporated herein by reference in its entirety.

FIELD OF THE DISCLOSURE

The present disclosure relates generally to a lighting system and method, and in particular to a system, method, and related devices for controlling lights in a plurality of rooms.

BACKGROUND

Lighting systems are known. The simplest lighting system may comprise a plurality of lighting devices such as incandescent lights, Compact Fluorescent Lamps (CFLs), Light-Emitting Diodes (LEDs), and the like, distributed in a site such as a building with a plurality of rooms. The lighting devices may be powered by a power source such as an Alternate Current (AC) grid. A plurality of light switches may be installed in the rooms and each coupled to one or more lighting devices for controlling the on/off of the corresponding lighting devices.

More sophisticated lighting systems have also been developed. For example, U.S. patent Ser. No. 10/194,507B2 to Snyder teaches a system, method, and apparatus for powering intelligent lighting networks. The power for the intelligent lighting network is supplied by Power-over-Ethernet (PoE) switches and/or Mid-Spans, which are conditioned by a powered device to distribute power tuned specifically for each, at least one LED fixture. The PoE switch and/or Mid-Span with associated router and wireless access point is used to communicate with and power a sensor network that collects data relevant to the intelligent lighting network. Optionally, the PoE switch and/or Mid-Span is used to communicate with and power a network of sensors that collects data relevant to the space the intelligent lighting network is operating in or is used to communicate with and power a network of AC wall plugs that is turned on and off and various switches, relays, PLCs, RFID systems, USB hubs, etc.

US Patent Application Publication No. 2017/0147018A1 to Meruva, et al. teaches an automatic master-slave system and approach for coordinated control of a parameter, for example, a heating, ventilation and air conditioning condition, in an area of multiple spaces controlled by room controllers. Changing a layout of a zone/area in a building such as moving, adding or removing a door, increasing or splitting size of a room through movable walls, or by permanently removing partitions, changing offices to a conference room or vice versa, may occur. A size of a room may be altered within minutes, according to customer demand. For instance, rooms may be converted into a single room by removing partitions. The controllers that were controlling temperatures of the rooms independently earlier, may convert automatically into a master-slave configuration and now work together to control a larger room. If the large room is split into multiple rooms, the controllers may automatically revert to their previous configuration.

U.S. Pat. No. 8,583,843B2 to Rosso teaches a communications control bus and apparatus for controlling multiple electronic hardware devices. The bus comprises an IMB slave CPU, at least two registers, and a three-bit data connector, which connects the two registers. The connector permits transmission of a three-bit data signal between the two registers. A network interconnects the two registers and the IMB slave CPU.

US Patent Application Publication No. 2018/0335870A1 to Ali, et al. teaches system, method, and computer-program product embodiments that can support touch interaction on a projective capacitive (PCAP) display system in the presence of water contamination. According to an embodiment, a system includes a touchscreen coupled to a controller. The controller determines the presence of water contamination on the touchscreen, and obtains measurements during a mixed-mode measurement frame that includes a self-mode measurement and a mutual-mode measurement. Based on the measurements obtained, the controller determines a touch on the touchscreen in the presence of the water contamination. In some embodiments, the self-mode measurement includes measurements collected at a both lower and a higher drive frequency, the higher drive frequency may be in the frequency range of 100 kHz to 500 kHz. In another embodiment, the self-mode measurement includes simultaneously measuring both horizontal-electrodes and vertical-electrodes.

US Patent Application Publication No. 2019/0120471A1 to Witty, et al. teaches multi-function wall switches. A wall switch can include a master assembly and daisy-chained slave assemblies. The master assembly can include more components than the slave assemblies to implement more functionality in a single assembly.

A lighting system generally requires a variety of devices. For example, lighting control devices such as wall-mount switches and dimmers have been widely used. However, existing lighting control devices have drawbacks. For example, installation of existing lighting control devices for mid to large size professional/commercial sites is generally expensive, involves complicated and user-/installer-unfriendly installation processes, and requires a proprietary wiring architecture. Large bulky control interfaces require special or customized electrical back boxes. Communication protocols are often proprietary and outdated, and require communication back to one or more central processing systems of various types.

LED dimmers are also known. Existing LED dimmers designed for line voltage dimming such as those for used at about 120 VAC in North America are typically inexpensive and can be mass-produced. However, existing LED dimmers are often of poor quality and are generally designed for low-wattage (e.g., less than 180 W) residential or commercial single-circuit manual-control.

Almost all existing line-voltage LED dimmers specify the various LED lamps they are designed to be used with for optimum performance (read: to minimize "pop on", "flicker", "dead zones", "false triggering", etc.) vice versa for the LED lamps manufacturers. However, they typically specify the preferred dimmer.

Hitherto, it appears that there are no manufacturers addressing the industry requirement of a professional-grade high-density dimmer system (multi-channel) designed for various self-ballasted LED load types operating at line voltage, and no manufacturer to date has produced an LED dimmer that can "play nice" with virtually any of the various type of LED lamps offering reliable performance and a stable full range of dimming without the typical associated problems.

Electronic Theatre Controls Inc. of Middleton, Wis., U.S.A. makes a rack LED dimmer as an option to their bussed relay rack system. However, it is relatively unintelligent and limited to a maximum of 300 W.

Therefore, there is always a desire for a lighting system with low cost, ease of installation, and ease of control.

SUMMARY

According to one aspect of this disclosure, there is provided a lighting system for deploying in a lighting area, the light area comprising a plurality of lighting subareas. The lighting system comprises: a plurality of central-control devices electrically connected in a first daisy-chain form; and a plurality of groups of local light-control devices for deploying in the plurality of lighting subareas for controlling a plurality of lighting devices therein. Each group of local light-control devices are electrically connected in a second daisy-chain form; and each group of local light-control devices are connected to one of the plurality of central-control devices.

In some embodiments, the plurality of central-control devices and the plurality of groups of local light-control devices form a distributed lighting control structure.

In some embodiments, a first one of the plurality of central-control devices of the first daisy-chain is automatically configured as a master central-control device, and others of the plurality of central-control devices of the first daisy-chain are configured as slave central-control devices manageable by the master central-control device.

In some embodiments, each central-control device comprises a plurality of input ports each configured for connecting one of the plurality of groups of local light-control devices.

In some embodiments, one of the plurality of input ports is configured for connecting to a next one of the plurality of central-control devices in the first daisy-chain.

In some embodiments, each central-control device further comprises an output port for connecting to a previous one of the plurality of central-control devices in the first daisy-chain.

In some embodiments, each central-control device is configured for maintaining a link table recording a mapping between the plurality of groups of local light-control devices and the plurality of lighting subareas.

In some embodiments, each group of local light-control devices control one or more of the plurality of lighting devices in one of the plurality of lighting areas.

In some embodiments, in each second daisy-chain, a first one of the plurality of local light-control devices is automatically configured as a master local light-control device, and others of the plurality of local light-control devices are configured as slave local light-control devices manageable by the master local light-control device.

In some embodiments, each of the plurality of local light-control devices comprises a touch-sensitive screen.

In some embodiments, the touch-sensitive screen is configured for displaying a plurality of touchable icons for triggering a plurality of functions.

In some embodiments, the plurality of touchable icons comprise a clean-screen icon for disabling the touch response of the touch-sensitive screen for a predefined time-period.

In some embodiments, each of the plurality of local light-control devices comprises a motion sensor and a light sensor.

In some embodiments, each of the plurality of local light-control devices comprises a faceplate; and wherein the faceplate comprises a pair of tubes engageable with the motion sensor and the light sensor, respectively, for preventing ambient light from entering the light sensor and the motion sensor.

According to one aspect of this disclosure, there is provided an electrical device for mounting to an anchor, the electrical device comprising: a faceplate having a front wall and a sidewall, the front wall and the sidewall forming a recess, the faceplate comprising one or more rearward extending screw-holes on the front wall for receiving one or more screws, and comprising one or more clips on the sidewall; a circuitry received in the recess, the circuitry comprising one or more first openings at locations corresponding to those of the one or more rearward extending screw-holes of the faceplate for the one or more screws to extend therethrough, and comprising one or more second openings on one or more edges thereof at locations corresponding to those of the one or more clips of the faceplate for the one or more clips to extend therethrough; and a mounting plate for mounting to an anchor, the mount plate comprising one or more recesses on one or more edges thereof for engaging the one or more clips of the faceplate so as to engage the faceplate and sandwich the circuitry therebetween, and comprising one or more recesses at locations corresponding to those of the one or more rearward extending screw-holes of the faceplate for receiving therein heads of the one or more screws so as to reduce the thickness of the electrical device.

In some embodiments, the mounting plate has a dimension for mounting to a single-gang electrical box.

In some embodiments, the circuitry comprises a touch-sensitive screen; and wherein the front wall of the faceplate comprises an opening for receiving the touch-sensitive screen.

In some embodiments, the circuitry comprises at least one printed circuit board (PCB).

In some embodiments, the circuitry comprises at least two PCBs mechanically and electrically coupled together; and the electrical device further comprises at least one PCB spacer sandwiched between the at least two PCBs for supporting the at least two PCBs.

In some embodiments, the touch-sensitive screen is mechanically and electrically couple to a front one of the at least two PCBs.

In some embodiments, the circuitry comprises a motion sensor and a light sensor.

In some embodiments, the front PCB comprises a motion sensor and a light sensor.

In some embodiments, the faceplate comprises a pair of tubes engageable with the motion sensor and the light sensor, respectively, for preventing ambient light from entering the light sensor and the motion sensor.

In some embodiments, a rear one of the at least two PCBs has a dimension smaller than a front one of the at least two PCBs.

In some embodiments, a rear one of the at least one PCB spacer supports the rear PCB; and wherein the rear PCB spacer has a dimension same as that of the rear PCB.

In some embodiments, rear PCB comprises at least one of one or more RJ-45 connectors, a plurality of dual in-line package (DIP) switches, and a plurality of breakaway terminal block connectors.

In some embodiments, the electrical device further comprises a cover for engaging the faceplate and sandwiching the circuitry therebetween, the cover comprising one or more first openings at locations corresponding to those of the one or more rearward extending screw-holes of the faceplate for the one or more screws to extend therethrough, and comprising one or more second openings on one or more edges thereof at locations corresponding to those of the one or more clips of the faceplate for the one or more clips to extend therethrough.

In some embodiments, the cover further comprises a third opening have a rearward-extending sidewall thereabout, the third opening having a dimension same as that of the rear PCB for the rear PCB to extend therethrough, and the sidewall of the cover having a height flush with the rear PCB.

According to one aspect of this disclosure, there is provided an electrical device comprising: a plurality of stacked electrical circuit boards; a plurality of spacers, each of said spacers is configured between a pair of neighboring electrical circuit boards for separation and support thereof; an enclosure comprising perimetric sidewalls and a plurality of perimetric grooves on an inner side of the sidewalls, each of the groove receiving therein a respective electrical circuit board.

In some embodiments, the enclosure has a dimension for sitting into a single-gang electrical box.

In some embodiments, the enclosure comprises a pair of enclosure halves.

In some embodiments, a top electrical circuit board of the plurality of stacked electrical circuit boards comprises a touch-sensitive display coupled thereto, and wherein the enclosure comprises a perimetric step for receiving the touch-sensitive display thereon.

According to one aspect of this disclosure, there is provided an electrical device comprising: a circuit board; an insert having at least a front frame, two side-frames, and a rear wall having two opposite ends, said insert comprising one or more protrusions perimetrically distributed on outer side surfaces of said front and side frames, said rear wall comprising a ridge, said ridge and the front and side frames forming a supporting structure; and a housing structure having at least a front wall and two sidewalls, each of said sidewall comprising a groove for receiving a respective end of the rear wall of the insert, said housing structure comprising one or more recesses perimetrically distributed on inner surfaces of said front and sidewalls for receiving the one or more protrusions, and said housing structure comprising a shoulder on an inner side thereof and across said front wall and sidewalls, said should facing said recesses and collaborating with the supporting structure of the insert for sandwiching said circuit board therebetween.

BRIEF DESCRIPTION OF THE DRAWINGS

FIGS. 6A and 6B are perspective views of a local light-control device of lighting system shown in FIG. 1, view from different viewing angles;

FIG. 6C is a front view of the local light-control device shown in FIG. 6A;

FIG. 6D is a rear view of the local light-control device shown in FIG. 6A;

FIG. 16 is a plan view of the enclosure half shown in FIG. 15, viewed from the front side thereof;

FIG. 17 is a rear view of the enclosure half shown in FIG. 15, viewed from the rear side thereof;

FIGS. 18 to 21 are side views of the enclosure half shown in FIG. 15, viewed from different sides thereof;

FIGS. 65 to 67B illustrate a process of assembling the electrical device shown in FIG. 36, wherein FIG. 65 shows positioning the pushbutton (shown in FIGS. 56 to 63) into the housing structure (shown in FIGS. 40 to 46), FIGS. 67A and 67B show inserting the assembled PCB and insert (shown in FIGS. 66A and 66B) into the housing structure (shown in FIG. 65)

DETAILED DESCRIPTION

In the following embodiments of an electrical device are described. In the description, directional phrases such as "top", "bottom", "up", "down", "front", "rear", "left" and "right" are used only for describing the directions of components relative to each other.

Figure 1:
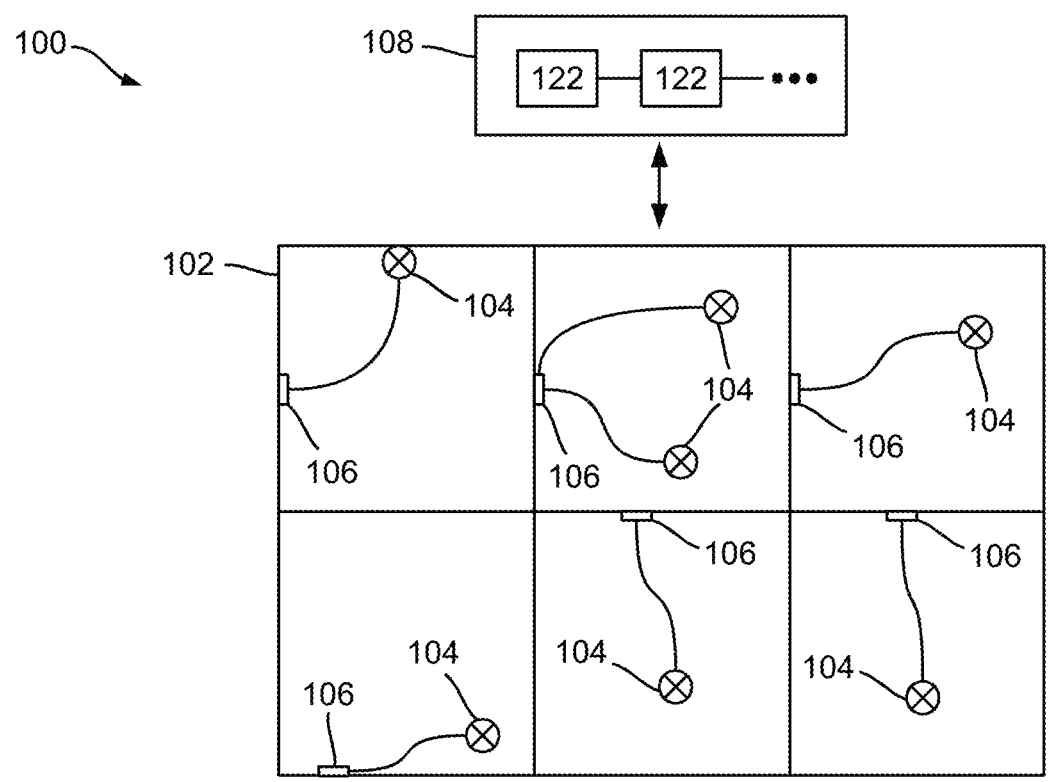
FIG. 1 is a schematic diagram showing a lighting system according to some embodiments of this disclosure, wherein the lighting system comprising a plurality of local light-control devices controlling a plurality of lights in a site and a light-control center having one or more central-control devices and connected to the local light-control devices for controlling the local light-control devices and in the lights connected thereto.

Turning now to FIG. 1, a lighting system is shown and is generally identified using reference numeral 100. As shown, the lighting system 100 is deployed in a site 102 such as a building having a plurality of subareas such as a plurality of rooms and/or zones.

In these embodiments, the lighting system 100 comprises a plurality of local light-control devices 106 such as a plurality of wall-mount control stations controlling a plurality of lights 104 distributed in the subareas of the site 102. Each subarea comprises one or more local light-control devices 106 and each local light-control device 106 controls one or more lights 104 in the subarea via one or more LED dimmers (not shown).

The lighting system 100 further comprises a light-control center 108 connected to the local light-control devices 106 for controlling the local light-control devices 106 and in turn controlling the lights 104.

The light-control center 108 in these embodiments comprises a plurality of central-control devices 122 linked or otherwise electrically connected for controlling the lights 104 via the local light-control devices 106.

Figure 2A:
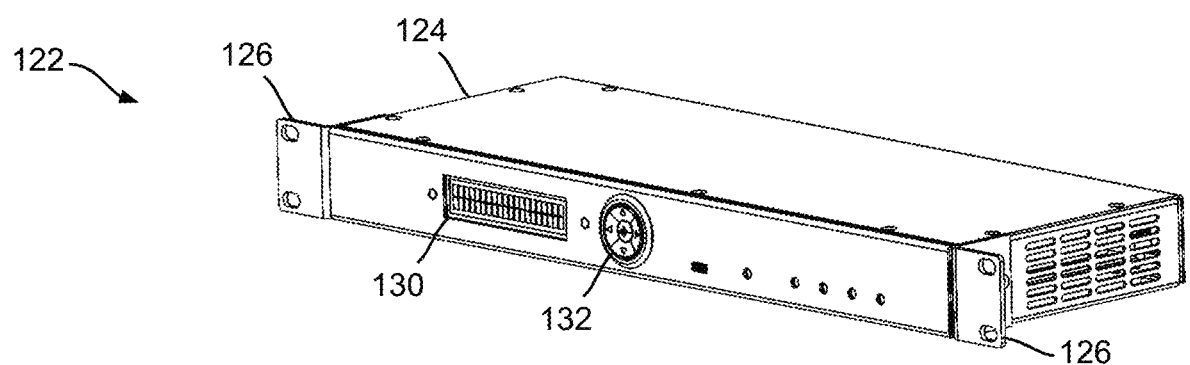
FIGS. 2A and 2B are perspective views of the central-control device of the light-control center of the lighting system shown in FIG. 1, viewing from different viewing angles.
Figure 2B:
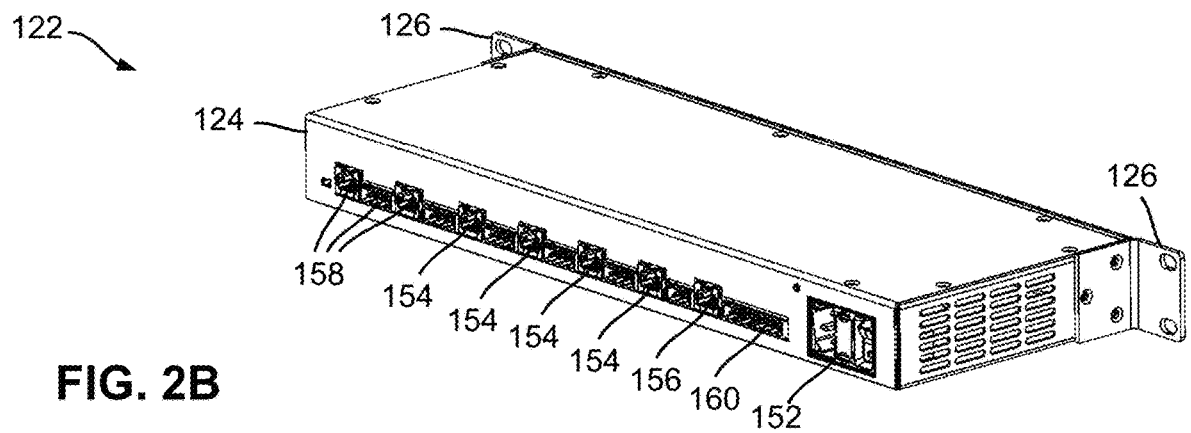
Figure 2C:
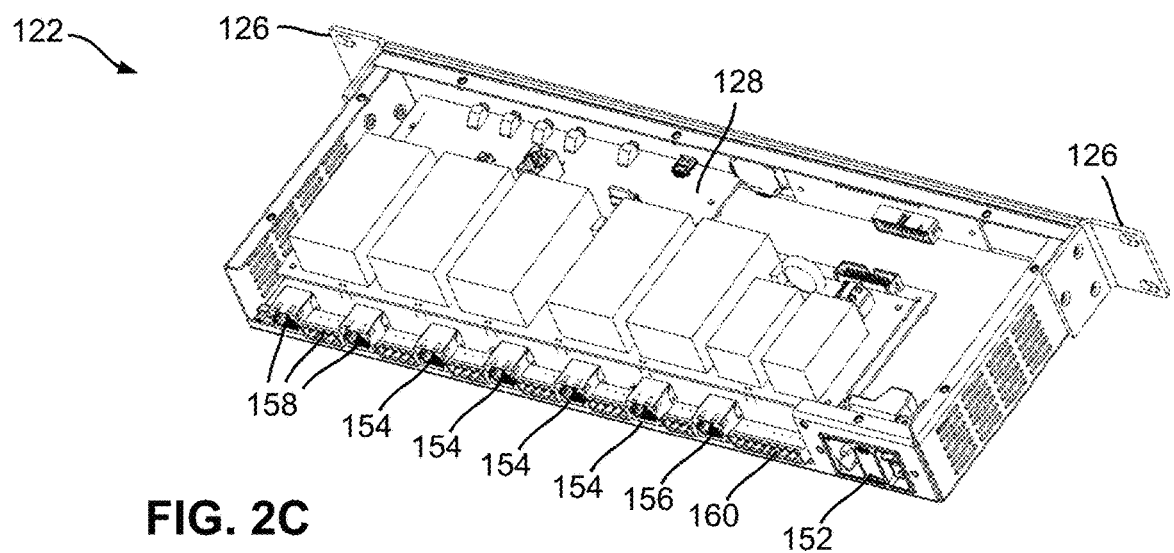
FIG. 2C is a perspective view of the central-control device shown in FIG. 2A with the top cover removed for showing the components therein.

FIGS. 2A and 2B show an example of a central-control device 122 such as Applicant's PRESIDOR® room linker/combiner (PRESIDOR is a registered trademark of Johnson Systems Inc. of Bragg Creek, Alberta, Canada, the Applicant of the subject application). FIG. 2C is a perspective view of the central-control device 122 with the top cover removed for showing the electrical circuitry therein.

As shown, the central-control device 122 in these embodiments comprises a housing 124 with a pair of mounting brackets 126 coupled on opposite sides thereof for attaching the central-control device 122 to an anchor such as a wall, a rack, or the like.

The housing receives therein an electrical circuitry 128 having a printed circuit board (PCB) with a plurality of electrical components thereon. On the front side of the housing 124, the central-control device 122 comprises a display 130 and a navigation structure 132 electrically connected to the circuitry. The display 130 is used for displaying configuration information and a menu system for adjusting the configuration settings.

Figure 3:
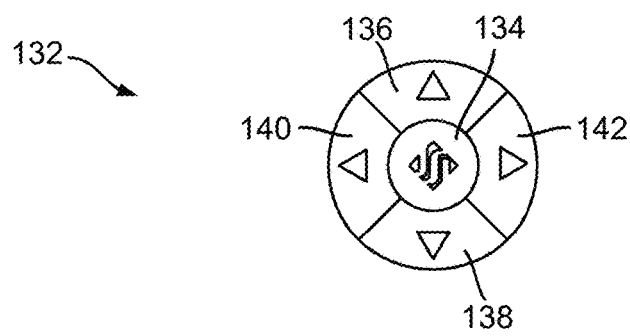
FIG. 3 is a front view of a navigation structure of the central-control device shown in FIG. 2A.

As shown in FIG. 3, the navigation structure 132 is arranged in a circular shape with a selection button 134 at the center thereof surrounded by four arrow buttons 136 to 142. The selection button 134 is used for triggering the display of the menu system on the display 130 and for making a selection of a configuration setting. The up and down buttons 136 and 138 are used for cycling the menu items of the menu system on the display 130, wherein each menu item may correspond to a configuration item and comprise a plurality of configuration options. The left and right buttons 140 and 142 are used for highlighting a configuration option. When a configuration option is highlighted, a user may press the selection button 134 to select the highlighted option as the setting for the corresponding configuration item. Some menu items may comprise submenu items and pressing the selection button 134 may trigger the display of the submenu items on the display 130.

Referring back to FIGS. 2B and 2C, on the rear side of the housing 124, the central-control device 122 comprises a power port 152 for receiving a power cord for powering the central-control device 122, a plurality of downlink ports 154 for connecting the local light-control devices 106, an interlink port 156 (also denoted a DMX Output (DO) port) for connecting or interlinking to another central-control device 122, a networking port 158 for connecting a computing device such as a laptop or a network display/touchscreen to link the rooms remotely, and a plurality of auxiliary ports 160. In these embodiments, the downlink ports 154 are RJ-45 ports and use the DMX512 standard protocol which is a standard protocol for digital communication networks that are commonly used to control stage lighting and effects. The interlink port 156 is a RJ-45 port using a suitable interlink communication protocol.

The auxiliary ports 160 are programmable contact closure inputs to permit a plurality of master local light-control devices 106 (described in more detail later) to be "linked" as configured in the central-control device 122 such that one may initiate some operation instructions (e.g., executing a lighting preset for some subareas at the central-control device 122) to cause the linked master local light-control devices 106 to perform the corresponding operations.

In some embodiments, an external dry-contact maintained switch may be used to contact one of the auxiliary ports 160 with a common terminal which then triggers the central-control device 122 to link the master local light-control devices 106A (described in more detail later) as required in any matrix of combinations.

For example, if an auxiliary port 160 is programmed to link the master local light-control devices 106A in rooms #1, #4, #7, and #22, then, an operator may press a button (which may be a physical button or a digital button displayed on a touch-sensitive screen), such as a preset button, of a local light-control devices 106 in any of the rooms #1, #4, #7, and #22 to send a command to the linked rooms #1, #4, #7, and #22 to perform an action (e.g., to use a predefined set of parameters).

Figure 4:
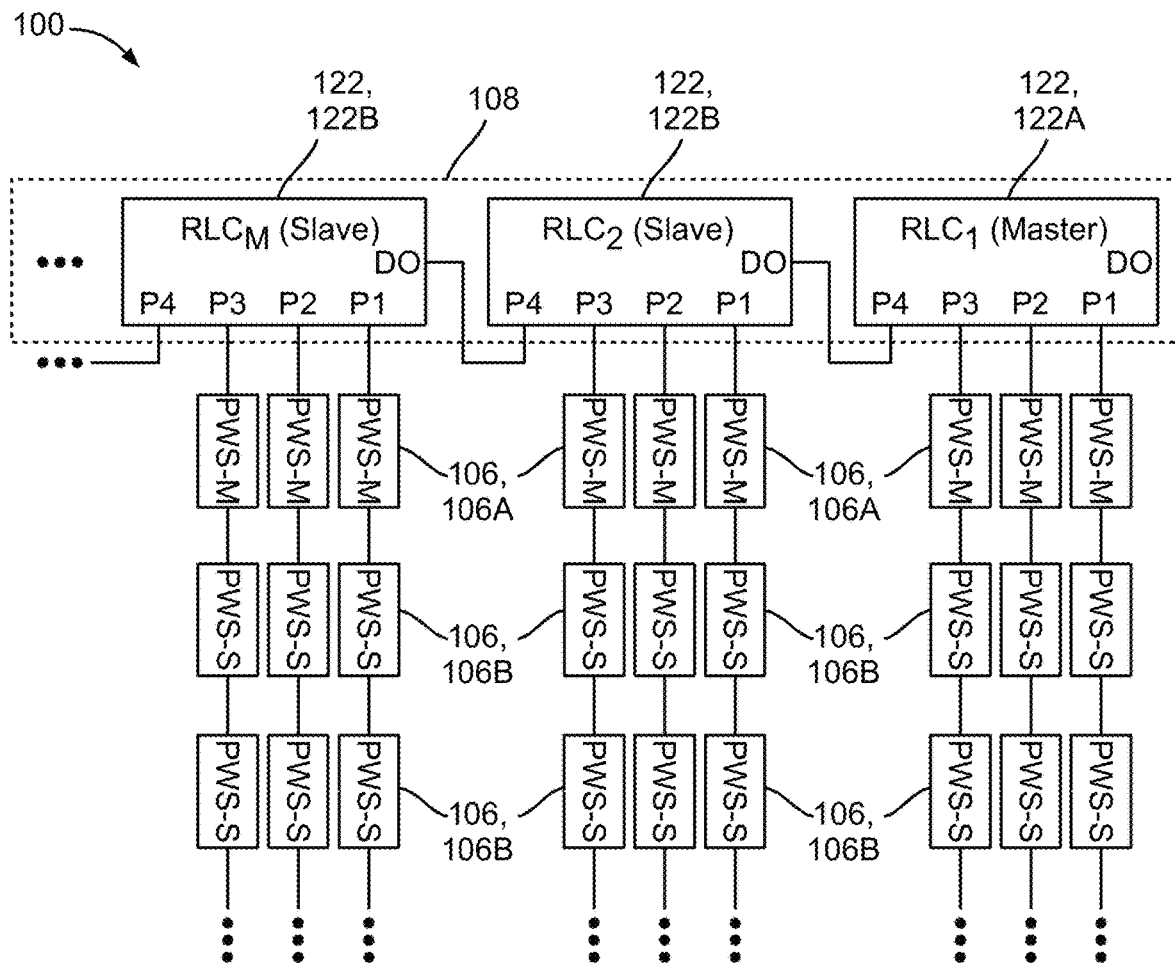
FIG. 4 is a schematic diagram showing the electrical connections between the central-control devices and the local light-control devices.

FIG. 4 is a schematic diagram of the lighting system 100 showing the connections of the light-control center 108 and the local light-control devices 106. The light-control center 108 comprises a plurality of interconnected central-control devices 122. For ease of illustration, each central-control device 122 shown in FIG. 4 has four downlink ports 154 denoted P1, P2, P3, and P4, and one interlink port 156 denoted DO. In these embodiments, the downlink ports 154 are input ports and the interlink port or DO port 156 is an output port. However, as will be described in more detail later, a dedicated one of the downlink ports 154 such as P4 of a first central-control device may be connected to the DO port 156 of a second central-control device, wherein the two central-control devices may automatically the connection therebetween and automatically convert the dedicated downlink ports 154 of the first central-control device and the DO port 156 into bidirectional communication ports.

As shown in FIG. 4, the central-control devices 122 are interconnected in the form of a central-control daisy chain using RJ-45 cables (i.e., cables e.g. Cat5e or Cat6 cables with RJ-45 connectors). The first central-control device 122A at the beginning of the central-control daisy chain acts as a master central-control device and other central-control devices 122B along the central-control daisy chain act as slave central-control devices under the control or management of the master central-control device 122A.

For ease of description, an interlink direction may be defined as a direction from the master device to the last device in the daisy chain. Correspondingly, the term "upstream" device refers to the master device or a slave device closer to the master device compared to another slave device, and the term "downstream" device refers to a slave device further away from the master device compared to another slave device. In other words, the interlink direction is a direction from an "upstream" device to a "downstream" device.

In these embodiments, an upstream central-control device 122 uses a dedicated downlink port such as the downlink port P4 to connect to the interlink port DO/156 of the immediately downstream central-control device for forming the central-control daisy chain. Therefore, the dedicated downlink port may be used for connecting to local light-control devices 106 or a downstream central-control device 122 while other downlink ports may only be used for connecting to local light-control devices 106. The central-control device 122 monitors the devices connected to the dedicated downlink port P4 and automatically determines how to communicate therewith.

In the example shown in FIG. 4, the master central-control device 122A (denoted $RLC_1$ in FIG. 4) is interconnected to the first slave central-control device 122B (denoted RLC$_2$ in FIG. 4) by connecting the downlink port P4 of the master central-control device 122A to the interlink port DO/156 of the first slave central-control device 122B. Similarly, the n-th (n=1, 2, 3, . . . ) slave central-control device (denoted RLCn in FIG. 4) is interconnected to the (n+1)-th slave central-control device RLCn+1 by connecting the downlink port P4 of the n-th central-control device RLCn to the interlink port DO/156 of the (n+1)-th slave central-control device RLCn+1.

Except those used for central-control-device interconnections, each downlink port 154 of the central-control devices 122A and 122B may be used for connecting one or more local light-control devices 106 arranged in the form of a local-control daisy chain. In each local-control daisy chain, the local light-control device 106A at the beginning thereof acts as a master local light-control device (denoted PWS-M in FIG. 4) and other local light-control devices 106B downstream thereto act as slave local light-control devices (denoted PWS-S in FIG. 4) under the control or management of the master local light-control device 106A.

In these embodiments, the system 100 has four types of connections (FIG. 4 shows three of them), wherein each type of connection may use a different communication protocol for data communication between the connected devices, including:

(1) connection between the central-control devices/RLCs 122 (e.g., the master RLC 122A to the slave RLC 122B immediately connected thereto, or a slave RLC 122B to another slave RLC 122B immediately connected thereto): using a hybrid or modified DMX512 protocol.

(2) connection between a central-control device/RLC 122 and a master local light-control device/PWS-M 106A immediately connected thereto: using the hybrid or modified DMX512 protocol.

(3) connection between a local light-control device/PWS 106 (which may be a master local light-control device/PWS-M 106A or a slave local light-control device/PWS-S 106B) and another local light-control device/PWS 106 (which may be a slave local light-control device/PWS-S 106B): using a suitable bidirectional multiplex data communication protocol such as Applicant's Presidor® Multiplexed data communication protocol (PMX).

(4) connection between the DO port 156 of a central-control device/RLC 122 and a device that is not a central-control device/RLC: using the standard DMX512 protocol.

In some embodiments, the DO port 156 may be used for connecting one or more LED dimmers using the standard DMX512 protocol, wherein each dimmer uses a DMX channel. In this manner, a central-control device/RLC 122 may directly control up to 512 LED dimmers for controlling the lights 104 connected thereto.

In these embodiments, the central-control device/RLC 122 monitors the device connected to the DO port 156 thereof and automatically determines the communication protocol to be used. In particular, if the central-control device/RLC 122 detects that the device connected to the DO port 156 thereof is another central-control device/RLC 122', the central-control device/RLC 122 then automatically uses the hybrid or modified DMX512 for communication through the DO port 156; if the central-control device/RLC 122 detects that the device connected to the DO port 156 thereof is not a central-control device/RLC, the central-control device/RLC 122 then automatically uses the standard DMX512 for communication through the DO port 156.

With the system topology shown in FIG. 4, each local-control daisy chain allows any local light-control device 106 thereof to control the lights 106 connected to the local-control daisy chain (via corresponding local light-control devices 106 in the daisy chain). The central-control devices 122 of the central-control daisy chain collaborate with each other under the management of the master central-control device 122A for room or subarea linking such as linking a plurality of local-control daisy chains together such that any local light-control device 106 of the linked local-control daisy chains may control the lights 106 connected to the linked local-control daisy chain (via corresponding local light-control devices 106). Such a system design and topology enable a distributed lighting control.

In some embodiments, each master local light-control device 106A provides settings to allow a user such as an administrator or an authorized user to apply lighting control restrictions and/or user access-rights to the master local light-control device 106A and the slave local light-control devices 106B daisy-chained thereto.

Figure 5:
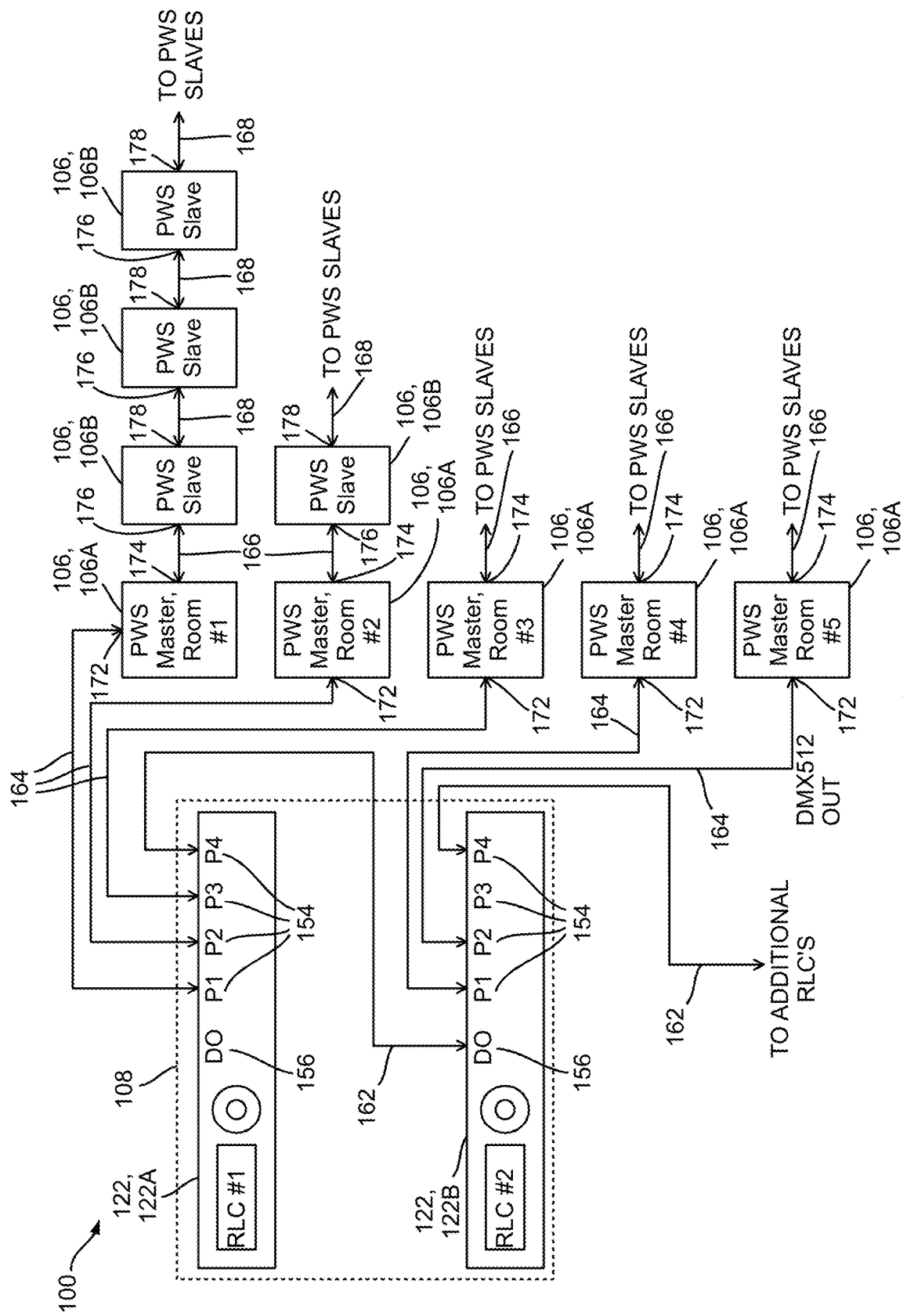
FIG. 5 is a schematic diagram showing the electrical connections between the central-control devices and the local light-control devices in an exemplary embodiment.

FIG. 5 is a schematic diagram of a lighting system 100 in an exemplary embodiment. In this example, the light-control center 108 comprises two central-control devices 122A and 122B for controlling the local light-control devices 106 in five (5) rooms. Each central-control device 122A/122B comprises four (4) downlink ports P1 to P4 configured as input ports and an interlink port DO configured as an output port. The downlink port P4 is the dedicated port for interconnecting a downstream central-control device 122 or for connecting to one or more daisy-chained local light-control devices 106.

In this example, the central-control device 122A is at the beginning of the central-control daisy chain and thus acts as the master central-control device. The central-control device 122B then acts as a slave central-control device. Accordingly, the central-control devices 122A and 122B are interconnected by connecting the input downlink-port P4 of the master central-control device 122A to the output interlink-port DO of the slave central-control device 122B via a RJ-45 cable 162. The master central-control device 122A is in communication with the slave central-control device 122B under a suitable bidirectional data-communication protocol such as a hybrid or modified DMX512 protocol.

The central-control daisy chain may be expanded by connecting additional slave central-control devices to the slave central-control device 122B in series using RJ-45 cables in a similar manner (input downlink-port P4 of an upstream slave central-control device 122B connecting to the output interlink-port DO of a downstream slave central-control device 122B). When a downstream slave central-control device 122B is connected to the central-control daisy chain, the upstream and downstream central-control device (being the master central-control device 122A or a slave central-control device 122B) and the downstream central-control device 122B automatically detect the connection therebetween and automatically convert the dedicated downlink ports 154 of the first central-control device and the DO port 156 into bidirectional communication ports for communicating bidirectional data under the hybrid or modified DMX512 protocol. In this manner, a central-control device in a central-control daisy chain may communicate with other central-control devices of the central-control daisy chain and may communicate with the local light-control devices 106 via the central-control devices linked thereto.

In the example shown in FIG. 5, the light-control center 108 may comprise maximum eight (8) daisy-chained central-control devices 122 in a central-control daisy chain for connecting maximum 25 local light-control devices 106.

Thus, such a central-control daisy chain may be used for control maximum 25 rooms and/or lighting zones.

The two central-control devices 122A and 122B are connected to a plurality of local-control daisy chains of local light-control devices 106 (or specifically, connected to the master local light-control devices 106A of the local-control daisy chains) in the five rooms via RJ-45 cables 164 and using the modified DMX512 protocol for bidirectional communication between the central-control devices 122A and the master local light-control devices 106A connected thereto. The central-control device 122A is connected to three (3) local-control daisy chains of local light-control devices 106 in rooms #1 to #3 at the downlink ports P1 to P3 thereof. The central-control device 122B is connected to two (2) local-control daisy chains of local light-control devices 106 in rooms #4 and #5 at the downlink ports P1 and P2 thereof, respectively. Each local-control daisy chain comprises one master local light-control device 106A and maximum 15 slave local light-control device 106B.

The master local light-control device 106A comprises an output uplink-port 172 for connecting to the corresponding input downlink-port of the central-control device 122A/122B via the RJ-45 cable 164 for bidirectional communication using the hybrid or modified DMX512 protocol. The master local light-control device 106A also comprises an input/output downlink-port 174 for connecting to and in bidirectional communication with the slave local light-control device 106B immediately downstream thereto using a RJ-45 cable 166 and under a suitable bidirectional multiplex data communication protocol.

Each slave local light-control device 106B comprises an input/output uplink-port 176 for connecting to the master local light-control device 106A or the slave local light-control device 106B immediately uplink thereto via a RJ-45 cable 168 and in bidirectional communication therewith under a suitable bidirectional multiplex data communication protocol such as the modified DMX512 protocol. Each slave local light-control device 106B comprises an input/output downlink-port 178 for connecting to the slave local light-control device 106B immediately downlink thereto via a RJ-45 cable 168 and in bidirectional communication therewith under a suitable bidirectional multiplex data communication protocol.

FIGS. 6A to 6D show the local light-control device 106 according to some embodiments of this disclosure. As shown, the local light-control device 106 comprises a light sensor 182, a motion senor 184, and a touchscreen 186 on the front side 188 thereof. On the rear side 198 thereof, the local light-control device 106 comprises a pair of RJ-45 connectors 190 for connecting other local light-control devices, a plurality of dual in-line package (DIP) switches 192 for device-settings adjustment, and a plurality of breakaway terminal block connectors 194 which are redundant terminal block DMX outputs for operators with shielded low-voltage wiring that needs to terminate DMX, each breakaway terminal block connector 194 having a header soldered to the PCB (described later) and a removable plug for ease of field installation and serviceability. The local light-control device 106 also comprises a circuitry (not shown) therein (described later).

In some embodiments, one or both of the RJ-45 connectors 190 may also be used for connecting one or more LED dimmers using the standard DMX512 protocol, wherein each LED dimmer may use one DMX channel. In these embodiments, each master local light-control device 106 may control up to 512 LED dimmers.

In some embodiments, the breakaway terminal block connectors 194 may further be used for connecting one or more LED dimmers using the standard DMX512 protocol.

Figure 7A:
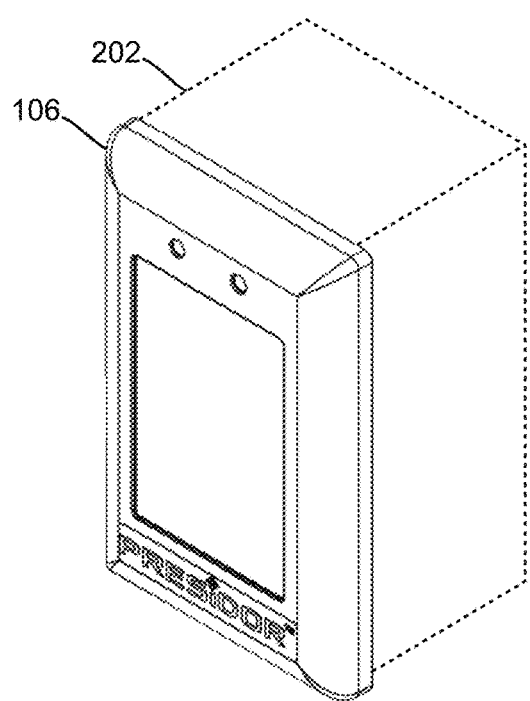
FIG. 7A is a perspective view of the local light-control device shown in FIG. 6A attached to a single-gang electrical box on a wall.
Figure 7B:
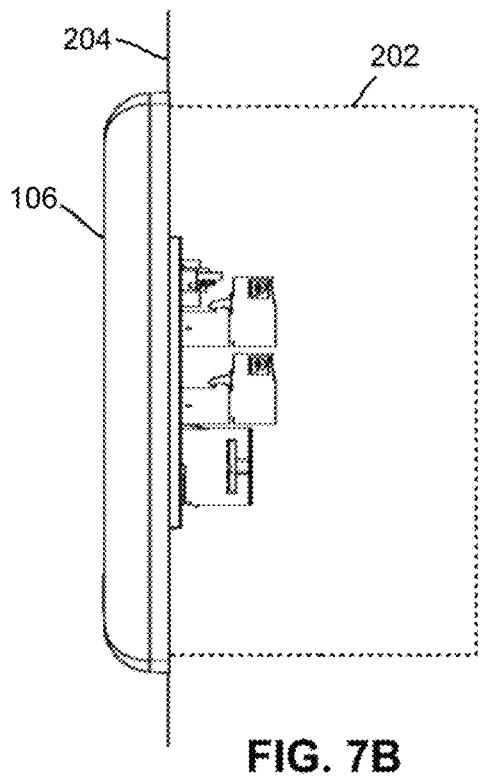
FIG. 7B is a side view of the local light-control device shown in FIG. 6A attached to a single-gang electrical box on a wall.

A shown in FIGS. 7A and 7B, the local light-control device 106 in these embodiments is in the form of a wall-mount station for mounting onto a single-gang electrical box 202 on a wall 204 with the RJ-45 connectors 190 substantially received in the single-gang electrical box 202 for connecting the RJ-45 wires (not shown) such that the local light-control device 106 may maintain a low profile on the wall 204.

Figure 8A:
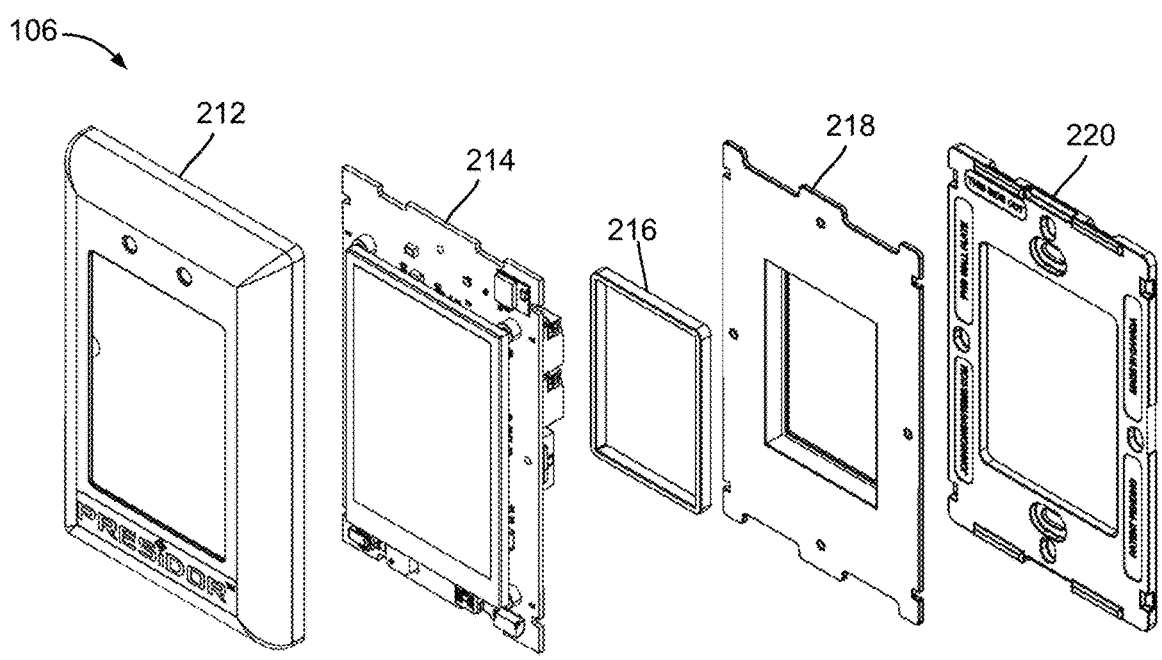
FIGS. 8A and 8B are exploded perspective views of the local light-control device shown in FIG. 6A, viewed from different viewing angles, wherein the local light-control device comprises a faceplate, a circuitry, a PCB spacer, a rear cover, and a wall-plate.
Figure 8B:
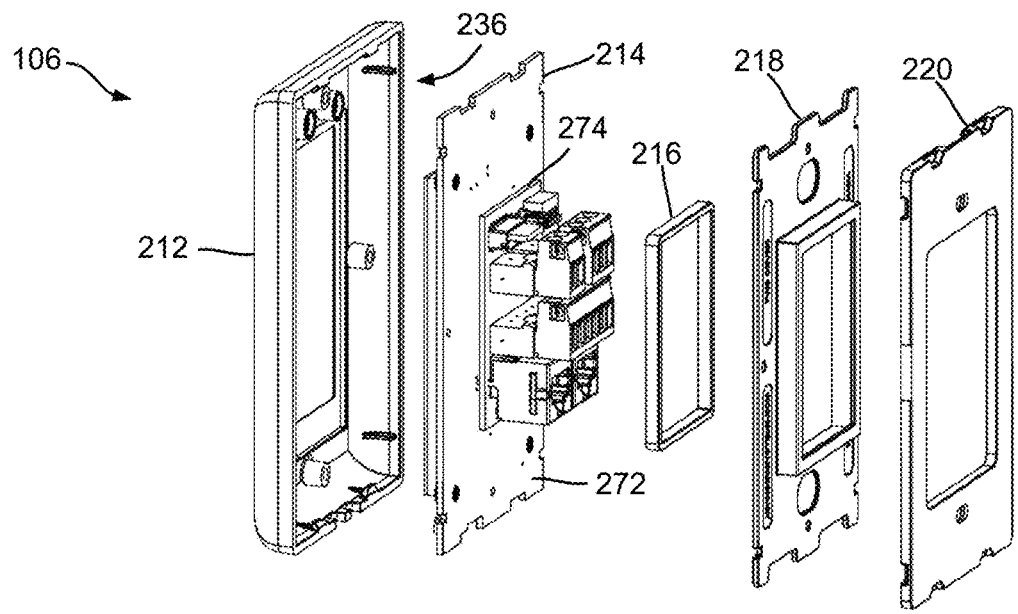
Figure 9A:
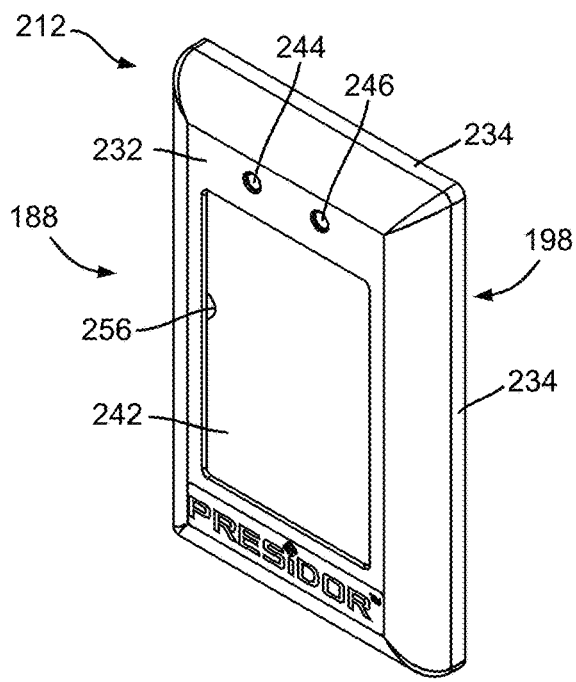
FIGS. 9A and 9B are perspective views of the faceplate of the local light-control device shown in FIG. 6A, viewed from different viewing angles.
Figure 9B:
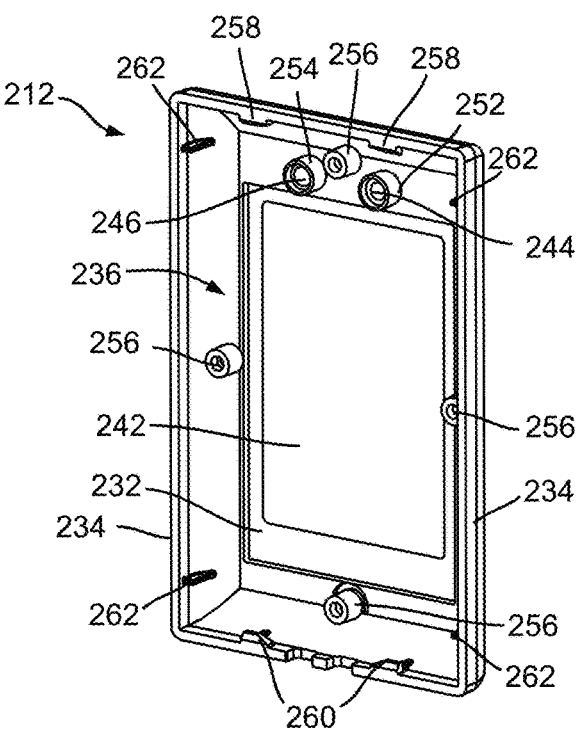
Figure 9C:
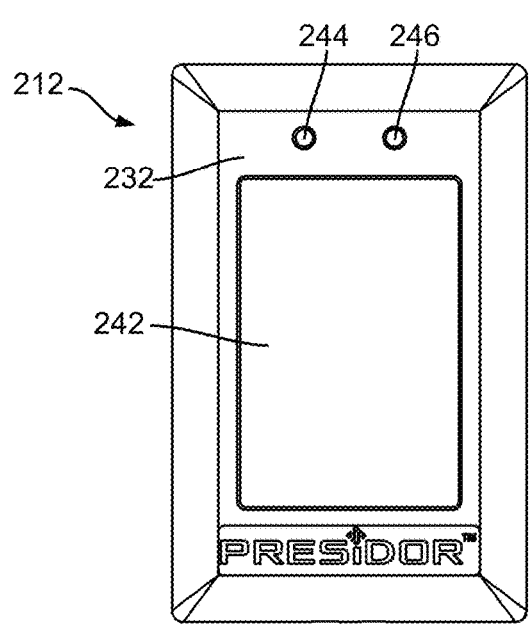
FIGS. 9C and 9D are front a rear views of the faceplate of the local light-control device shown in FIG. 6A.
Figure 9D:
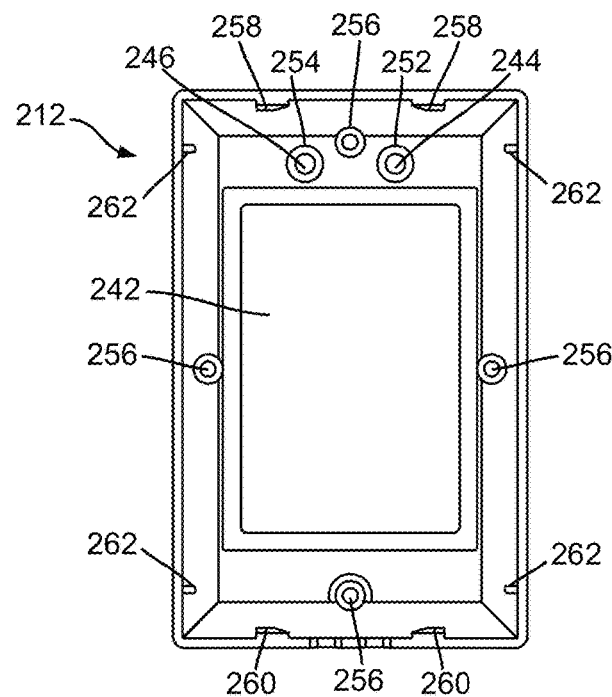
Figure 9E:
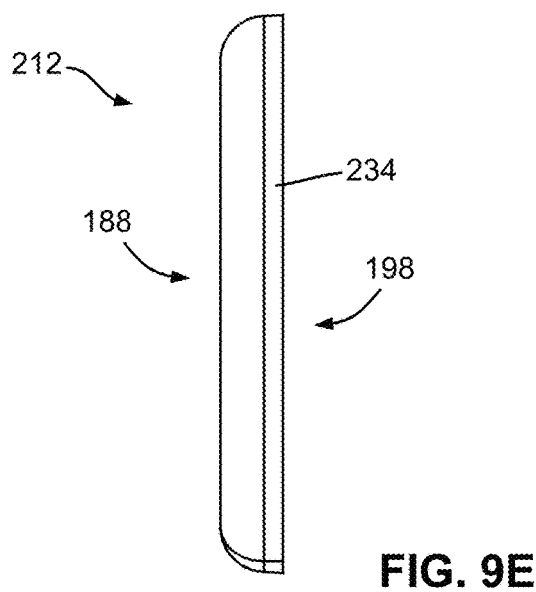
FIGS. 9E and 9F are side views of the faceplate of the local light-control device shown in FIG. 6A.
Figure 9F:
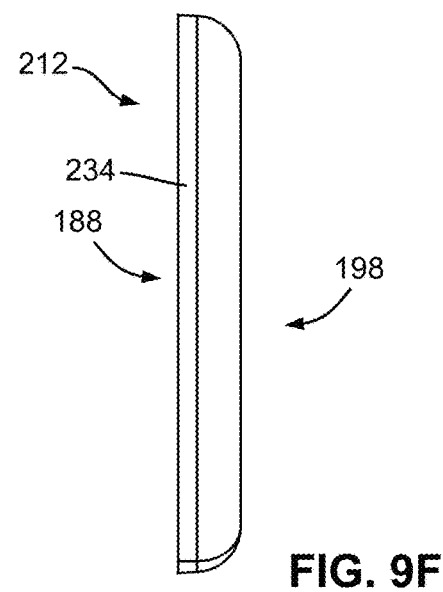
Figure 9G:
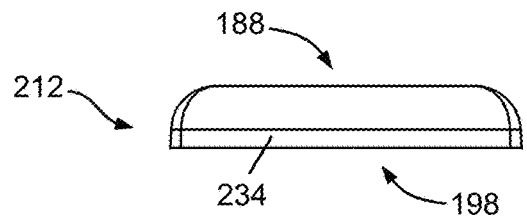
FIGS. 9G and 9H are plan view and bottom view, respectively, of the faceplate of the local light-control device shown in FIG. 6A.
Figure 9H:
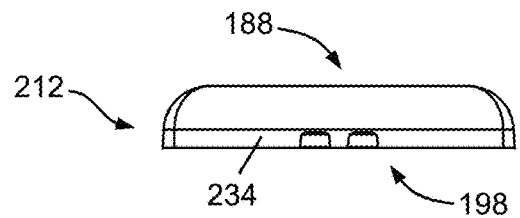

FIGS. 8A and 8B show exploded perspective views of the local light-control device 106. As can be seen, the local light-control device 106 comprises a faceplate 212, a circuitry 214, a PCB spacer 216, a rear cover 218, and a wall-plate 220.

FIG. 9A to 9H show the faceplate 212. As shown, the faceplate 212 comprises a front wall 232 and sidewalls 234 with round or smooth corners and edges. The front wall 232 and sidewalls 234 form a rearwardly facing housing-recess 236 for receiving other components of the local light-control device 106.

On the front side 188 thereof, the faceplate 212 comprises a window 242 for receiving the touchscreen 186 and a pair of holes 244 and 246 for allowing light to go through and enter the light sensor 182 and motion sensor 184 on the circuitry 214.

On the rear side 198 thereof, the faceplate 212 comprises a pair of tubes 252 and 254 extending rearwardly from the holes 244 and 246, respectively, and each having a longitudinal bore in communication with the holes 244 and 246 for engaging and covering the light sensor 182 and motion sensor 184 of the circuitry 214 (i.e., the light sensor 182 and motion sensor 184 are aligned with the bores of the tubes 252 and 254) for preventing ambient light from entering the light sensor 182 and motion sensor 184 so as to only allow light to enter the light sensor 182 and motion sensor 184 from the holes 244 and 246.

On the rear side 198 thereof, the faceplate 212 also comprises a plurality of screw holes 256 distributed about the window 242, a pair of top clips 258 on the top edge thereof, and a pair of bottom clips 260 on the bottom edge thereof. The faceplate 212 further comprises a plurality of re-bars 262 distributed along the periphery thereof coupled to the front wall 232 and sidewalls 234 for improvement the structure strength thereof and providing precise alignment between the circuitry 214 and the faceplate 212.

Figure 10A:
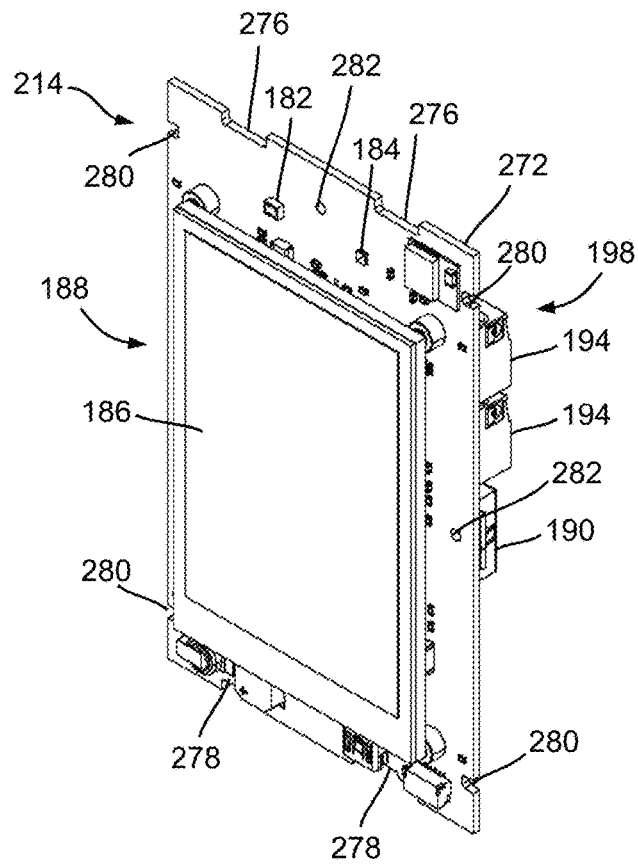
FIG. 10A is a perspective view of the circuitry of the local light-control device shown in FIG. 6A.
Figure 10B:
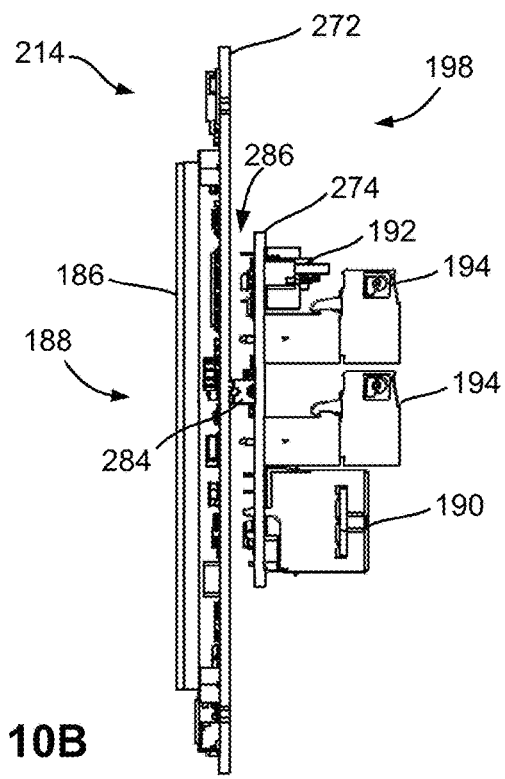
FIG. 10B is a side view of the circuitry of the local light-control device shown in FIG. 6A.
Figure 10C:
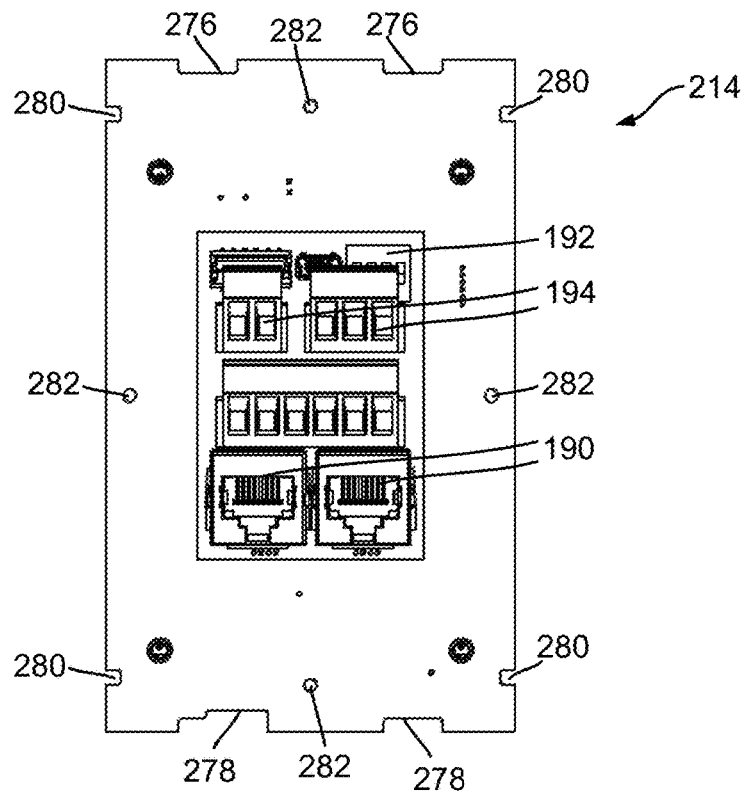
FIG. 10C is a rear view of the circuitry of the local light-control device shown in FIG. 6A.

FIGS. 10A to 10C show the circuitry 214. As shown, the circuitry 214 comprises a first PCB 272 having the light senor 182, the motion sensor 184, and the touchscreen 186 on the front side 188 thereof and physically and electrically coupled to a second PCB 274 on the rear side 198 thereof. The first PCB 272 also comprises a pair of top notches 276 on the top edge thereof at locations corresponding to those of the top clips 258 of the faceplate 212, a pair of bottom notches 278 on the bottom edge thereof at locations corresponding to those of the bottom clips 260 of the faceplate 212, and a plurality of re-bar notches 280 at locations corresponding to those of the re-bars 262 of the faceplate 212. The first PCB 272 further comprises a plurality of screw holes 282 at locations corresponding to those of the screw holes 256 of the faceplate 212.

The second PCB 274 receives the RJ-45 connectors 190, DIP switches 192, and terminal block connectors 194, on the rear side 198 thereof. In these embodiments, the second PCB 274 has a size smaller than that of the first PCB 272 and is physically and electrically coupled to the first PCB 272 via one or more multiple-pin PCB connectors 284. When the local light-control device 106 is assembled, the PCB spacer 216 is fit into the gap 286 between the first and second PCBs 272 and 274 and in contact therewith for maintaining the relative positioning thereof thereby providing structural support between the first and second PCBs 272 and 274. Preferably, the PCB spacer 216 has a width and a length substantially the same as or smaller than those of the second PCB 274 such that the PCB spacer 216 does not extend out of the second PCB 274 when assembled.

Figure 11A:
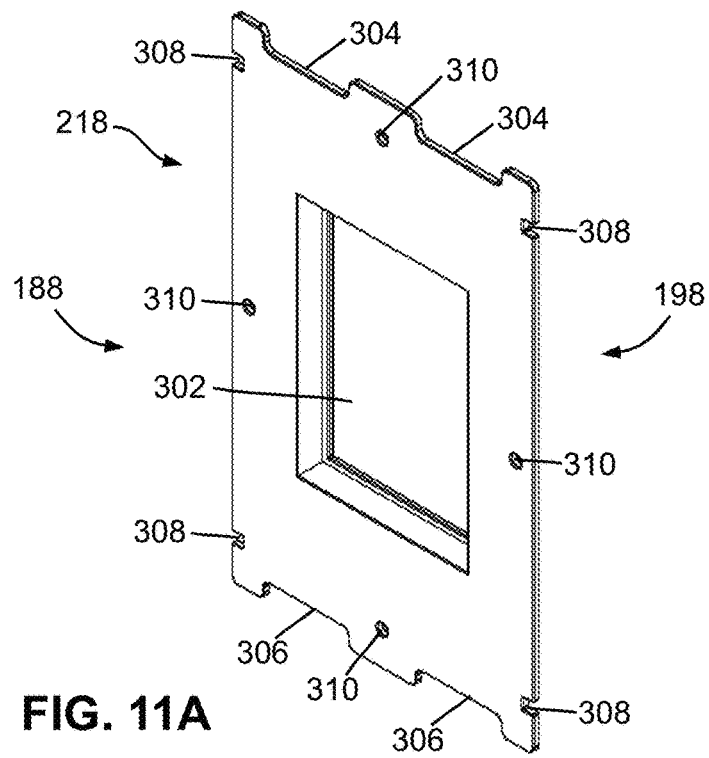
FIGS. 11A and 11B are perspective views of the rear cover of the local light-control device shown in FIG. 6A, viewed from different viewing angles.
Figure 11B:
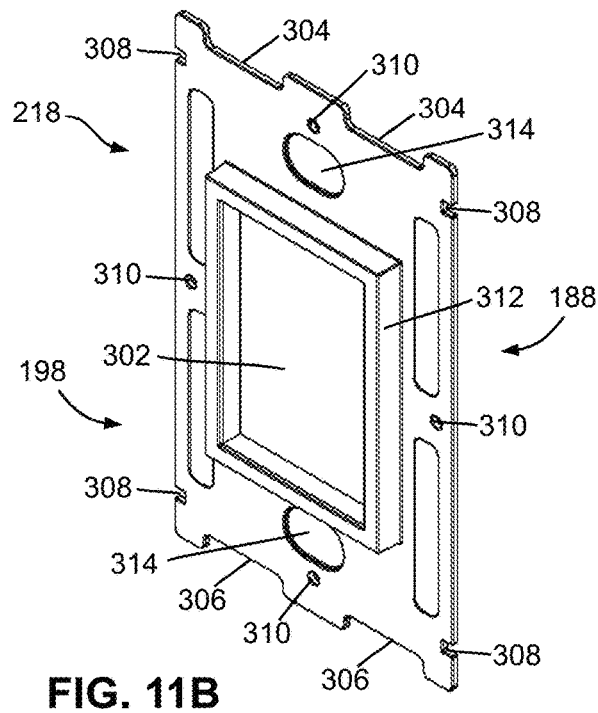

FIGS. 11A and 11B show the rear cover 218. As shown, the rear cover 218 is substantively a flat plate having a window 302 for receiving the second PCB 274. Preferably, the window 302 has a dimension substantially the same as that of the second PCB 274 of the circuitry 214. As will be described in more detail later, the circuitry 214 and the PCB spacer 216 attached thereto may be sandwiched between the faceplate 212 and the rear cover 218 for forming a sub-assembly mountable to an anchor such as a wall, a rack, or the like via the wall-plate 220.

The rear cover 218 comprises a pair of top notches 304 on the top edge thereof at locations corresponding to those of the top clips 258 of the faceplate 212, a pair of bottom notches 306 on the bottom edge thereof at locations corresponding to those of the bottom clips 260 of the faceplate 212, and a plurality of re-bar notches 308 at locations corresponding to those of the re-bars 262 of the faceplate 212. The rear cover 218 also comprises a plurality of screw holes 310 at locations corresponding to those of the screw holes 256 of the faceplate 212.

On the rear side 198 thereof, the rear cover 218 comprises a sidewall 312 rearwardly extending from the periphery of the window 302. The rear cover 218 also comprises a pair of screw-head recesses 314 on the rear side 198 thereof (described later).

Figure 12A:
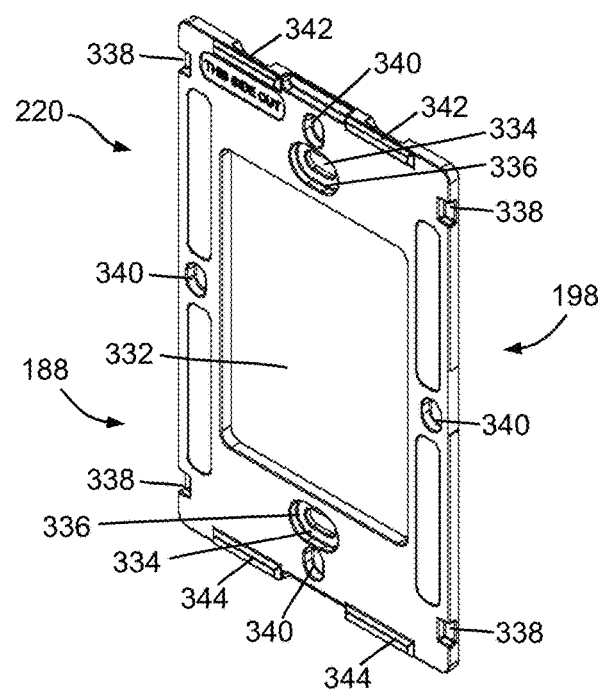
FIGS. 12A and 12B are perspective views of the wall-plate of the local light-control device shown in FIG. 6A, viewed from different viewing angles.
Figure 12B:
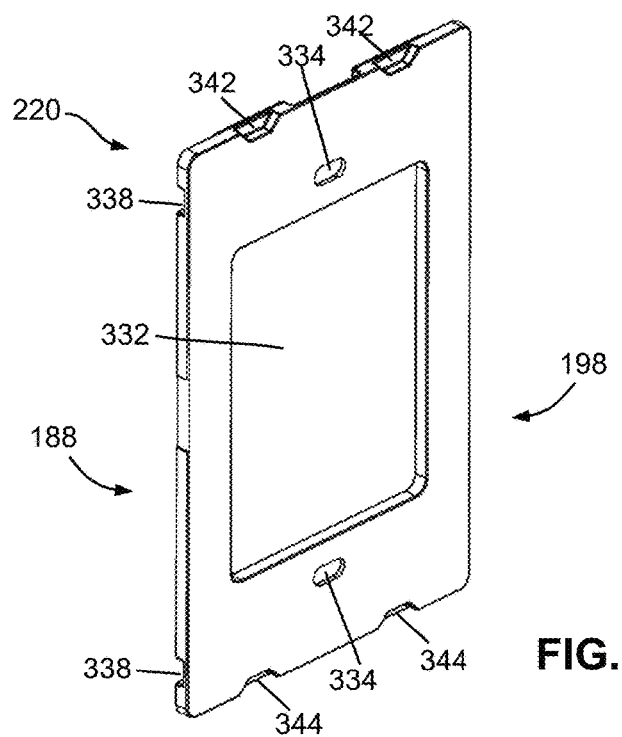

FIGS. 12A and 12B show the wall-plate 220. As shown, the wall-plate 220 is substantively a flat plate having a window 332 for receiving the rearwardly extending sidewall 312 of the rear cover 218. On the front side 188 thereof, the wall-plate 220 comprises a plurality of wall-mount screw-head recesses 336 distributed thereon. Each wall-mount screw-head recess 336 comprises a wall-mount screw-hole 334 at the center thereof for receiving screws to mount the wall-plate 220 to an anchor. The wall-plate 220 also comprises on the front side 188 thereof a plurality of forwardly facing re-bar recesses 338 at locations corresponding to those of the re-bars 262 of the faceplate 212 and a plurality of forwardly facing screw-head recesses 340 at locations corresponding to those of the screw holes 256 of the faceplate 212.

On the rear side 198 thereof, the wall-plate 220 comprises a pair of rearwardly facing top-recesses 342 on the top edge thereof at locations corresponding to those of the top clips 258 of the faceplate 212 and a pair of rearwardly facing bottom-recesses 344 on the bottom edge thereof at locations corresponding to those of the bottom clips 260 of the faceplate 212.

Referring again to FIGS. 8A, 8B, 12A, and 12B, to assemble the local light-control device 106, the PCB spacer 216 is positioned between the first and second PCBs 272 and 274 of the circuitry 214. Then, the circuitry 214 is positioned into the housing-recess 236 of the faceplate 212 with the touchscreen 186 of the circuitry 214 extending into the window 242 of the faceplate 212 and preferably flush with the front wall 232 thereof. As described above, the tubes 252 and 254 engage the light sensor 182 and motion sensor 184 for blocking ambient light.

After the circuitry 214 is positioned to the faceplate 212, the rear cover 218 is positioned onto the circuitry 214 with the RJ-45 connectors 190, DIP switches 192, and terminal block connectors 194 extending through the window 302 of the rear cover 218. Preferably, the rear surface of the second PCB 274 of the circuitry 214 is flush with that of the rearwardly-extending sidewall 312 of the rear cover 218.

After the rear cover 218 is positioned onto the circuitry 214, a plurality of screws are extended from the rear side of the rear cover 218 through the aligned screw holes 310 and 282 of the rear cover 218 and circuitry 214, respectively, into the screw holes 256 of the faceplate 212 to fasten the circuitry 214 (with the PCB spacer 216 attached thereto) and the rear cover 218 into the housing-recess 236 of the faceplate 212. A sub-assembly or semi-assembled local light-control device 106 is then obtained. The re-bar notches 280 and 308 of the circuitry 214 and 218 allow the re-bars 262 of the faceplate 212 to extend therethrough. The top and bottom clips 258 and 260 extend through the top and bottom notches 276 and 278 of the circuitry 214 and the top and bottom notches 304 and 306 of the rear cover 218.

The wall-plate 220 is mounted onto a single-gang electrical box on an anchor by using a plurality of wall-mount screws extending through the wall-mount screw holes 334 and fastening onto the single-gang electrical box. Then, the semi-assembled local light-control device 106 is applied to the wall-plate 220 with a suitable force. The top and bottom clips 258 and 260 then engage the top and bottom recesses 342 and 344 to attach the semi-assembled local light-control device 106 to the wall-plate 220.

After assembling, the re-bars 262 of the faceplate 212 engage the respective re-bar recesses 338 of the wall-plate 220, the heads of the screws fastening the semi-assembled local light-control device 106 are received in the screw-head recesses 340 of the wall-plate 220, and the heads of the wall-mount screws are received in the chambers formed by the screw-head recesses 314 of the rear cover 218 and the wall-mount screw-head recesses 336 of the wall-plate 220.

With this design, the local light-control device 106 has a small thickness (measured from the faceplate 212 to the wall-plate 220) for maintaining a low profile on the anchor.

The local light-control device 106 provides a variety of functionalities such as adjusting lighting settings, managing lights connected thereto, self-maintenance, and the like. For example, the light-control device 106 uses the light sensor 182 to determine the lighting state of the subarea. The light-control device 106 uses the motion sensor 184 to detect the existence of one or more person in the subarea. As the ambient light are block by the tubes 252 and 254 from entering the light sensor 182 and the motion sensor 184, the determination of the lighting state and the motion detection are of less interference and thus are more accurate.

Figure 13A:
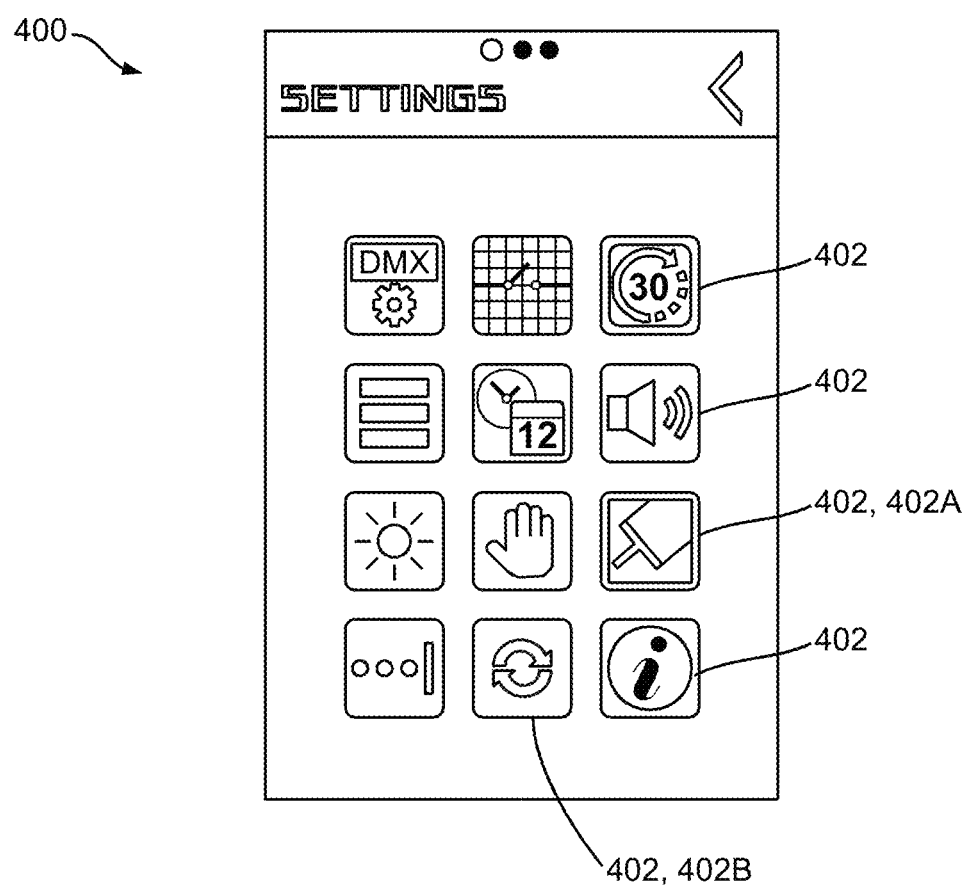
FIG. 13A is a screenshot of a touchscreen of the local light-control device shown in FIG. 6A, wherein the touchscreen may display a plurality of icons for performing various functions.

The touchscreen 186 allows a user to operate the local light-control device 106 and managing the lights in a more intuitive manner. For example, FIG. 13A shows a settings screen 400 displayed on the touch screen 186 for a user to adjust settings of the local light-control device 106.

Figure 13B:
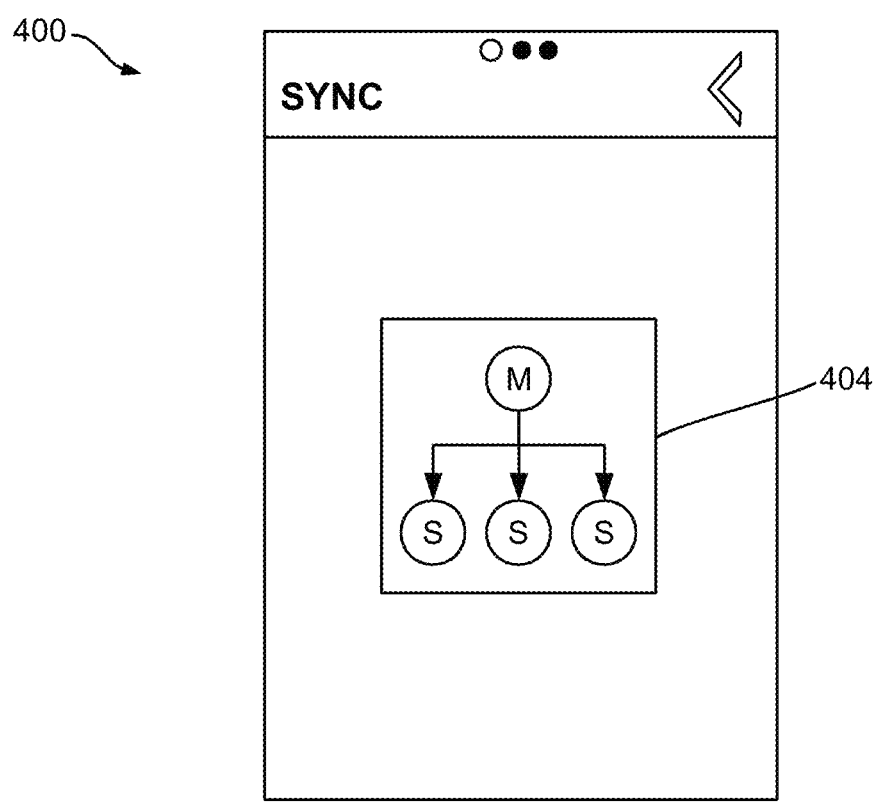
FIG. 13B is a screenshot of a touchscreen of the local light-control device shown in FIG. 6A, wherein the touchscreen displays a diagram for a "SYNC" function.

The screen 400 comprises a plurality of icons 402 arranged in a matrix form with each icon represent a specific function. For example, a user may touch the "clean screen" icon 402A. Then, the local light-control device 106 temporarily disables the touch function of the touchscreen 186 such that the touchscreen 186 does not respond to any touch actions applied thereto for a predefined time-period to allow a user the clean the touchscreen 186. As another example, a user may touch the "SYNC" icon 402B. As shown in FIG. 13B, a synchronization screen 404 is shown indicating the synchronization of devices.

Although in above embodiments, the local light-control device 106 has a dimension suitable for attaching to a single-gang electrical box, in some embodiments, the local light-control device 106 may have a dimension suitable for attaching to electrical boxes of other dimensions such as dual-gang electrical boxes.

In above embodiments, the local light-control device 106 comprises the rear cover 218 which mounts the circuitry 214 and the PCB spacer 216 to the faceplate 212, and also serves as a sealable contamination shield for preventing contaminations such as dust (which may be experienced in various situations such as during installation) from entering the circuitry 214. The rear cover 218 also provides electrical insulation to the circuitry 214.

In some alternative embodiments wherein contamination and electrical insulation to the circuitry 214 may not be a significant concern, the local light-control device 106 may not comprise any rear cover 218. In these embodiments, the circuitry 214 (having the PCB spacer 216 thereon) is mounted to the faceplate 212 by one or more screws extending from the circuitry 214 into the screw holes 256 of the faceplate 212 for forming the semi-assembled local light-control device which may then be attached to the wall plate 220 after the wall plate 220 is mounted to an anchor.

Although in above embodiments, the circuitry 214 comprises two PCBs, in some alternative embodiments, the circuitry 214 may only comprise one PCB. In these embodiments, the local light-control device 106 may not comprise any PCB spacer 216. In yet some alternative embodiments, the circuitry 214 may comprise more than two PCBs. In these embodiments, the local light-control device 106 may comprise more than one PCB spacer 216.

In above embodiments, the central-control device 122 comprises a networking port 158 for connecting a computing device. In some embodiments, the central-control device 122 may also comprise a suitable wireless networking module for connecting a computing device via one or more suitable wireless communication technologies such as WI-FI® (WI-FI is a registered trademark of Wi-Fi Alliance, Austin, Tex., USA), BLUETOOTH® (BLUETOOTH is a registered trademark of Bluetooth Sig Inc., Kirkland, Wash., USA), ZIGBEE® (ZIGBEE is a registered trademark of ZigBee Alliance Corp., San Ramon, Calif., USA), 3G, 4G and/or 5G cellular telecommunications technologies, and/or the like. In some embodiments wherein the central-control device 122 may also comprise a wireless networking module, the central-control device 122 may not comprise any networking port 158.

In above embodiments, each local light-control device 106 controls one or more lights 104 in the corresponding subarea via one or more LED dimmers. In some alternatively embodiments, a local light-control device 106 may control one or more lights 104 directly.

In some embodiments, a highly-compact intelligent distributed lighting control system controller is disclosed. The lighting control system controller in these embodiments is in the form of a light emitting diode (LED) controller, with low cost and easy to customize and install. With the disclosed controller, an intelligent lighting control system can use state-of-the-art "distributed" processing intelligence to eliminate the need for a central control "mothership" processing system. The intelligent lighting control system incorporates advanced features such as high-resolution 16 bit thin-film-transistor (TFT) display through unique capacitive touch-sensitive display designed around the industry-standard single-gang electrical boxes and wall plates such as the DECORA® (DECORA is a trademark of Leviton Manufacturing Co., Inc. of Melville, N.Y., United States) wall plates. The intelligent lighting control system combines both industry-standard and proprietary communication protocols using common low-cost CAT5E and CAT6 wiring thereby permitting easy installation by electrical contractors.

The controller disclosed herein allows reduced overall system cost while meeting advanced modern system requirements. The controller allows easy modular installation with easy support via both the internet and telephone. The scalable design of the controller permits projects to grow as necessary or needed. The controller disclosed herein is a green product with high energy-efficiency such as an energy efficiency with an order of magnitude greater than that of similar large/bulky touchscreens in the art. The controller is in compliance with the International Energy Agency (I.E.A.) 1 Watt Initiative.

The controller disclosed herein has a dense packaging design suitable for installation in a single-gang electrical back box with industry standard rectangular faceplates.

The touch-sensitive display comprises a 6 mm thick soda-lime glass bonded to a 0.5 mm glass screen with an Indium Tin Oxide (ITO) conductive layer using an optically clear high-strength adhesive. This touch-sensitive display is then assembled with custom pins to the processor print circuit board (PCB) while "sandwiching" the high-resolution 16-bit color TFT display in between.

The controller uses a clamshell technique for bringing the touch-sensitive display and multiple (such as three) PCBs together for structural integrity, mounting accuracy and consistency and isolation of contaminant such as drywall dust, metal filings, and the like.

The controller provides various advantages such as low overall system cost, ease of use, scalable modular design, and ease of customization with a Bluetooth® link to a computing device such as a laptop PC or Notebook, thereby permitting a wide range of uses such as displaying corporate logos of clientele, banner ads, real time preset selection, remote dry-contact trigger from room occupancy sensors, Building Management Systems (BMS), and the like.

Figure 14A:
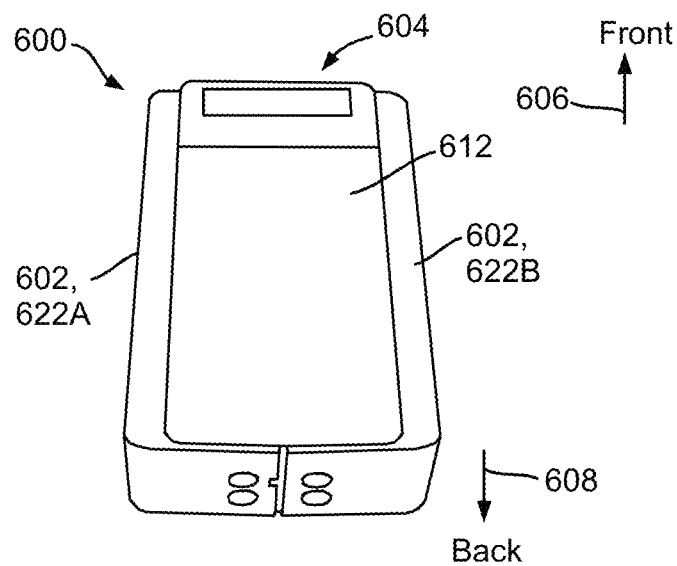
FIG. 14A is a perspective view of a LED controller viewed from a front side thereof, according to some embodiments of this disclosure, wherein the electrical device comprises an enclosure and an electrical assembly.
Figure 14B:
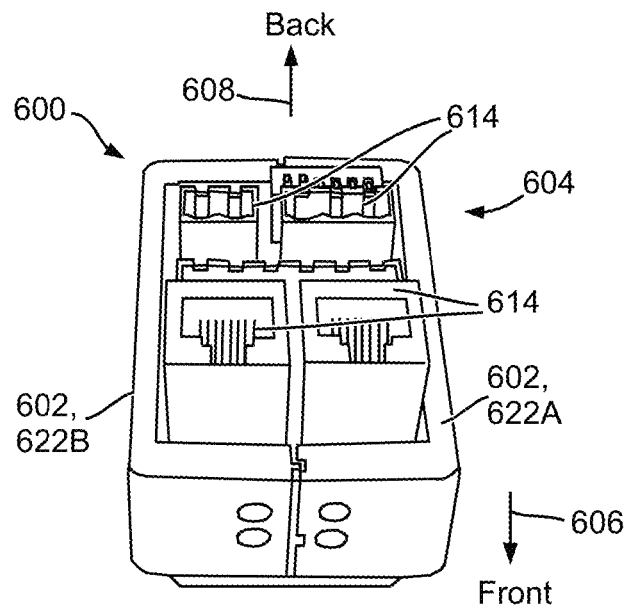
FIG. 14B is a perspective view of the LED controller shown in FIG. 14A viewed from a rear side thereof.
Figure 14C:
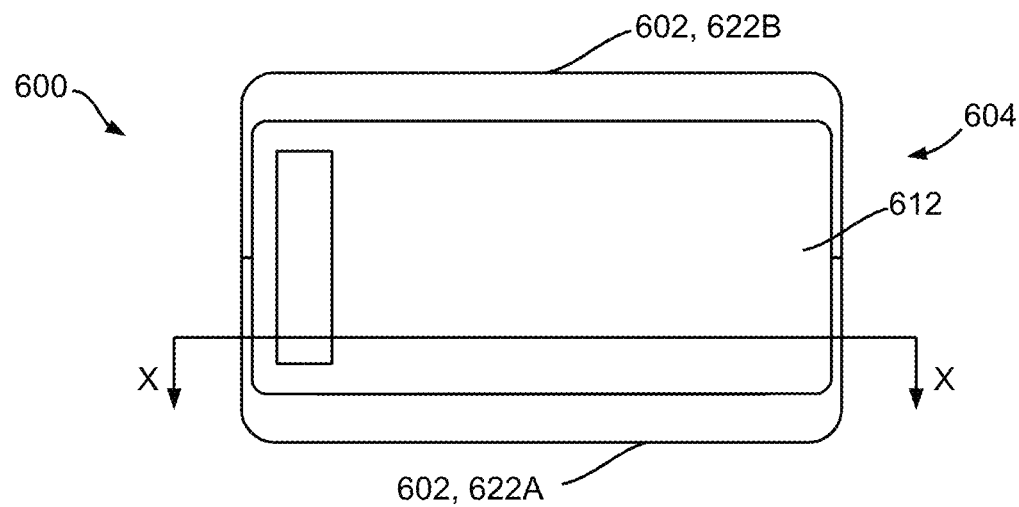
FIG. 14C is a plane view of the LED controller shown in FIG. 14A.

FIGS. 14A to 14C show an electrical device 600 in the form of a light controller. In these embodiments, the light controller 600 is a PRESIDOR® LED controller.

The light controller 600 comprises an enclosure 602 receiving therein an electrical assembly 604. The enclosure 602 in these embodiments is a cubical structure having perimetric sidewalls with an open front (indicated by arrow 606) and an open back (indicated by arrow 608). The electrical assembly 604 comprises a touch-sensitive display 612 received at the open front of the enclosure 602 and one or more electrical terminal connectors 614 exposed from the open back 608 of the enclosure 602 for wiring.

The enclosure 602 in these embodiments is made of a suitable material such as plastic and has a dimension such as about 1.75" (symbol "'" representing inches) by 2.5" by 0.825", thereby suitable for fitting into a standard 2"-by'3" single-gang electrical box and wall plates such as the DECORA® wall plates. As shown in FIGS. 14A to 14D, the enclosure 602 comprises two U-shape enclosure halves 622A and 622B engaging with each other. In these embodiments, the two enclosure halves 622A and 622B are substantially identical with one being a 180° rotation of the other. Therefore, the enclosure halves may also be identified using reference numeral 622 in the following description.

Figure 15:
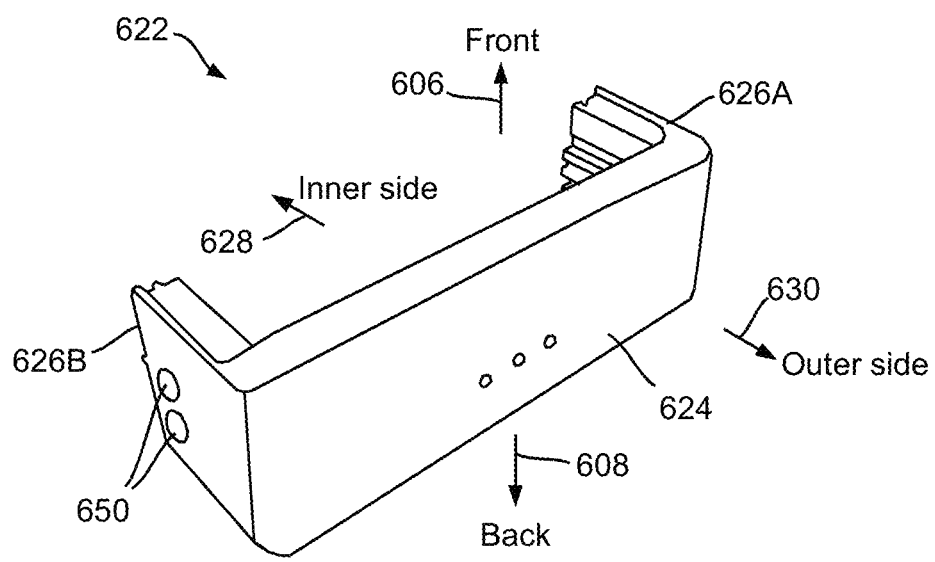
FIG. 15 is a perspective view of an enclosure half of the enclosure of the LED controller shown in FIG. 14A, viewing from the front side thereof.

FIG. 15 is perspective views of the U-shape enclosure half 622. As shown, the enclosure half 622 comprises a longitudinal wall 624, and two lateral walls 626A and 626B extending laterally from two opposite ends of the longitudinal wall 624, thereby defining an inner side 628 enclosed by the three walls 624, 626A and 626B, and an outer side 630 opposite to the inner side 628.

Figure 20:
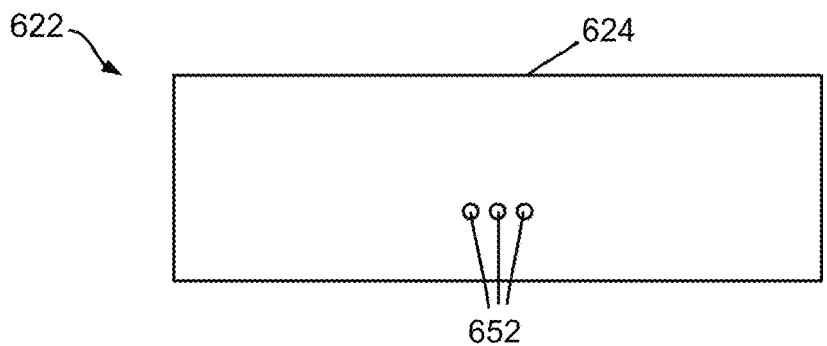
Figure 21:
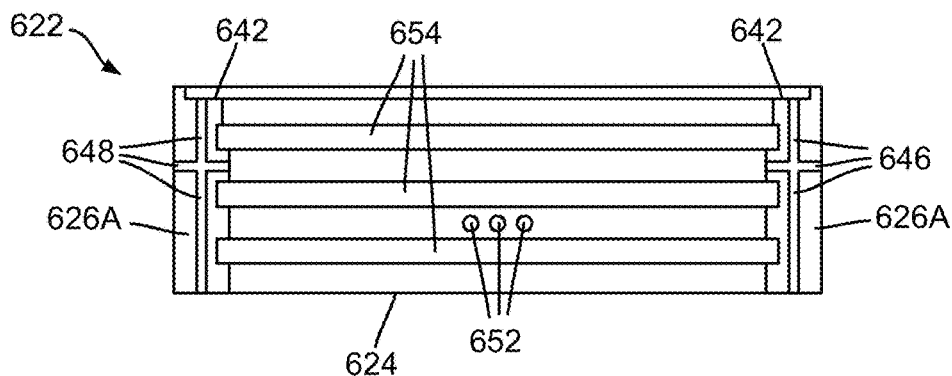

FIG. 16 is a plan view of the enclosure half 622 viewed from the front side 606. FIG. 17 is a rear view of the enclosure half 622 viewed from the rear side 608. FIG. 18 is a lateral-side view of the enclosure half 622 viewed from the outer side of the lateral wall 626A. FIG. 19 is a lateral-side view of the enclosure half 622 viewed from the outer side of the lateral wall 626B. FIG. 20 is a longitudinal-side view of the enclosure half 622 viewed from the outer side of the longitudinal wall 624. FIG. 21 is a longitudinal-side view of the enclosure half 622 viewed from the inner side of the lateral wall 626B.

Figure 22A:
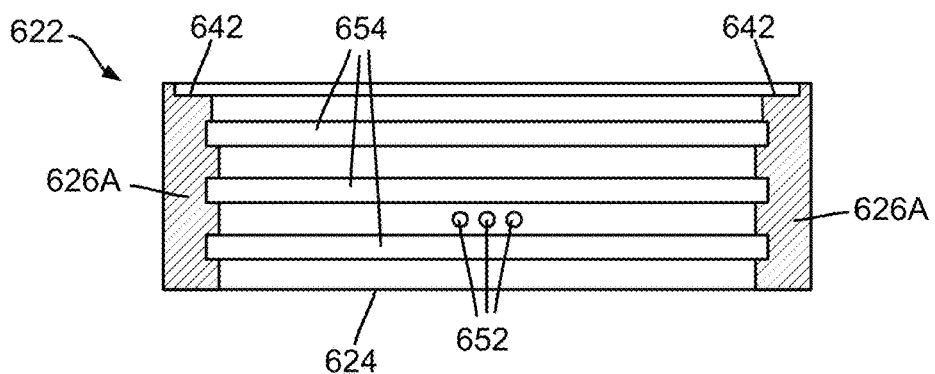
FIG. 22A is a cross-sectional view of the enclosure half shown in FIG. 15 along the cross-sectional line A-A shown in FIG. 16.
Figure 22B:
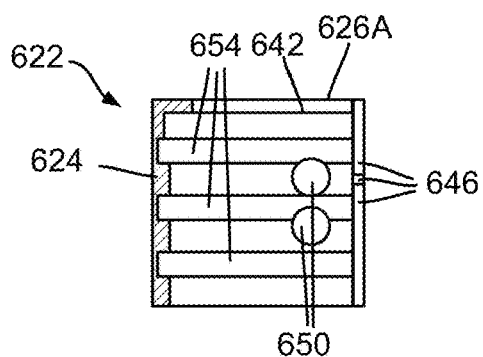
FIG. 22B is a cross-sectional view of the enclosure half shown in FIG. 15 along the cross-sectional line B-B shown in FIG. 16.
Figure 22C:
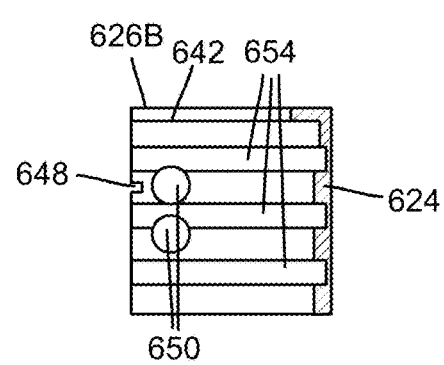
FIG. 22C is a cross-sectional view of the enclosure half shown in FIG. 15 along the cross-sectional line C-C shown in FIG. 16.

FIG. 22A is a cross-sectional view of the enclosure half 622 along the cross-sectional line A-A shown in FIG. 16. FIG. 22B is a cross-sectional view of the enclosure half 622 along the cross-sectional line B-B shown in FIG. 16. FIG. 22C is a cross-sectional view of the enclosure half 622 along the cross-sectional line C-C shown in FIG. 16.

As shown in FIGS. 16 to 22C, the enclosure half 622 comprises a step 642 on the front side 606 about the inner side 628 thereof for receiving the touch-sensitive display 612 of the electrical assembly 604. In these embodiments, the step 642 is located on the front side 606 of the lateral walls 626A and 626B about the inner side 628 thereof. However, in some alternative embodiments, the step 642 may also be located on the front side 606 of the longitudinal wall 624 about the inner side 628 thereof.

The enclosure half 622 also comprises a protrusion 646 and a matching notch 648 on its two ends 644A and 644B. In particular, the lateral wall 626A of the enclosure half 622 comprises a protrusion 646 at the end 644A thereof, and the lateral wall 626B of the enclosure half 622 comprises a notch 648 at the end 644B thereof. The protrusion 646 and the notch 648 match to each other.

The enclosure half 622 further comprises one or more fastening holes 650 on each of the lateral walls 626A and 626B for receiving the inserts of a mounting bracket to assemble the enclosure 602 (described later). The enclosure half 622 also comprises a one or more audio-transmission holes 652 on the longitudinal wall 624 (see FIGS. 20 to 22A) for transmission of audio signals generated from a speaker or audio component of the electrical assembly 604.

As shown in FIGS. 21 to 22C, the enclosure half 622 comprises on the inner surface thereof, a plurality of perimetric grooves 654 spaced from each other for receiving the edges of a plurality of electrical circuit boards such as a plurality of printed circuit boards (PCBs).

Figure 23:
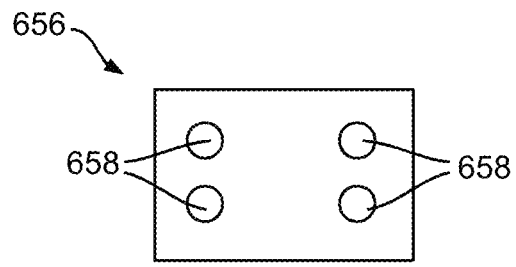
FIG. 23 is a bottom view of a mounting bracket for mounting two enclosure halves shown in FIG. 15 to form the enclosure of the LED controller shown in FIG. 14A.
Figure 24:
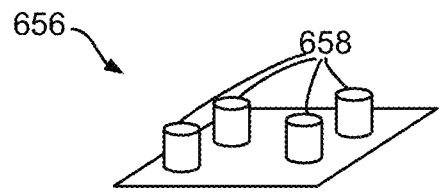
FIG. 24 is a perspective view of the mounting bracket shown in FIG. 23.

FIGS. 23 and 24 show a mounting bracket 656. As shown, the mounting bracket 656 comprises two sets of inserts 658 for fitting into the fastening holes 650 on each of the lateral walls 626A and 626B to assemble the enclosure 602.

Figure 25A:
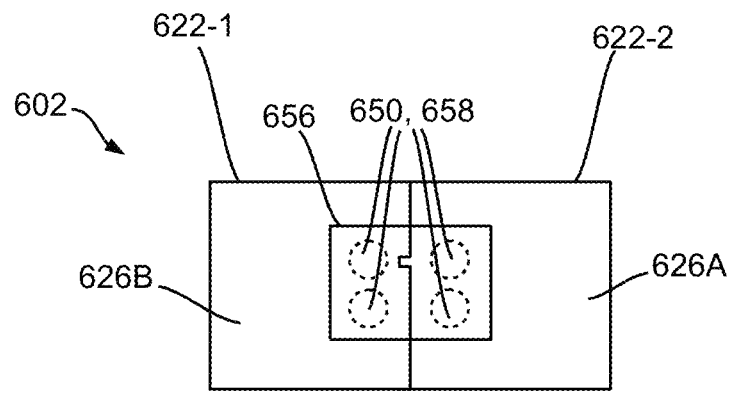
FIG. 25A is a lateral-side view of the enclosure of the LED controller shown in FIG. 14A, viewing from the front side thereof.

As shown in FIG. 25A, when two enclosure halves 622-1 and 622-2 are putting together to form an enclosure 602, a mounting bracket 656 is applied to each lateral side of the enclosure 602 by fitting the inserts 658 of the mounting bracket 656 into the fastening holes 650 on the engaged lateral sidewalls 626A and 626B of the two enclosure halves 622-1 and 622-2 to fastening the two enclosure halves 622-1 and 622-2 together.

Figure 25B:
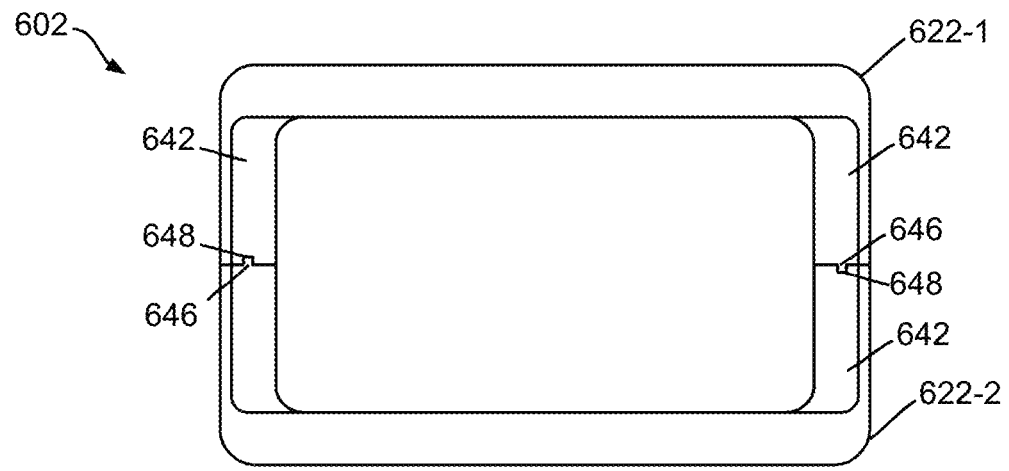
FIG. 25B is a plan view of the enclosure of the LED controller shown in FIG. 14A, viewing from the front side thereof.

FIG. 25B is a plan view of an assembled enclosure 602. As shown, a first and second enclosure halves (denoted as 622-1 and 622-2) are used to form the enclosure 602, wherein the protrusion 646 of the first enclosure half 622-1 is received in the notch 648 of the second enclosure half 622-2, and the protrusion 646 of the second enclosure half 622-2 is received in the notch 648 of the first enclosure half 622-1.

After assembling, the steps 642 of the two enclosure halves 622-1 and 622-2 form a platform (also denoted using reference numeral 642) for receiving the touch-sensitive display 612 of the electrical assembly 604 such that the surface of the touch-sensitive display 612 is flush with that of the assembled enclosure 602.

Figure 26:
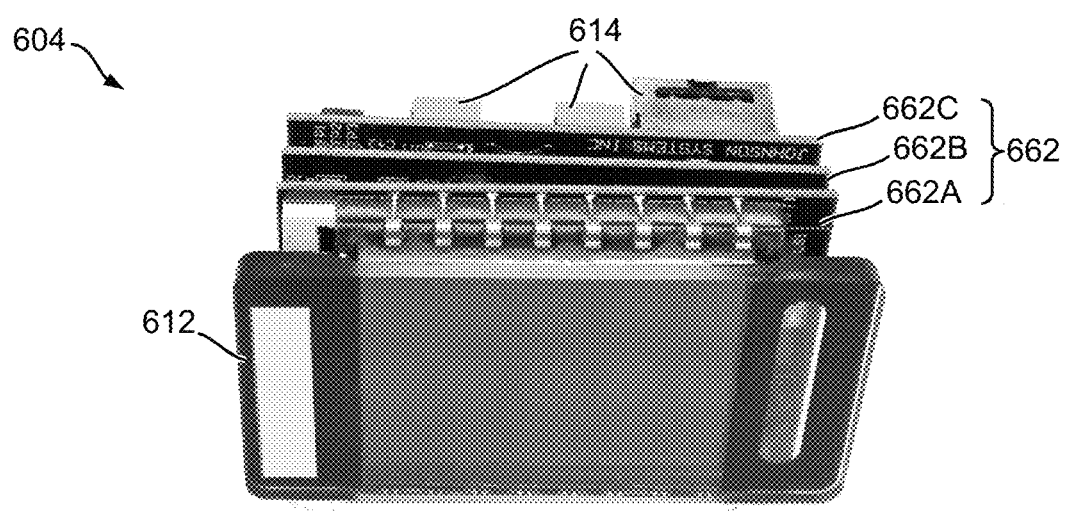
FIG. 26 is a perspective view of the electrical assembly of the LED controller shown in FIG. 14A, viewing from the front side thereof.
Figure 27:
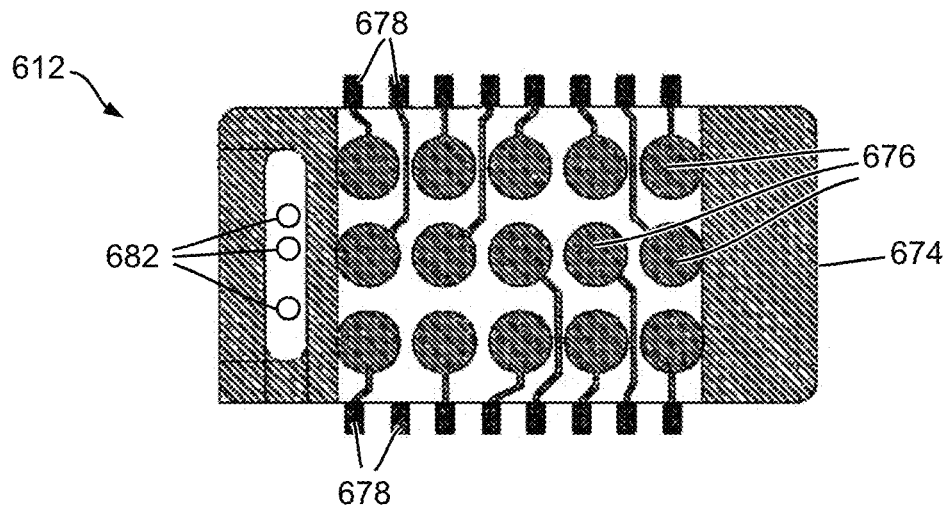
FIG. 27 is a plan view of a touch-sensitive display of the electrical assembly shown in FIG. 26A.

FIGS. 26 and 27 show the electrical assembly 604. As shown, the electrical assembly 604 comprises a plurality of PCBs 662 including the PCBs 662A, 662B and 662C, demoutably mounted or otherwise coupled together. The PCB 662A comprises the touch-sensitive display 612 mounted thereon. The PCB 662C comprises the electrical terminal connectors 614 mounted thereon. The PCB 662B is sandwiched between the PCBs 662A and 662C.

Figure 28:
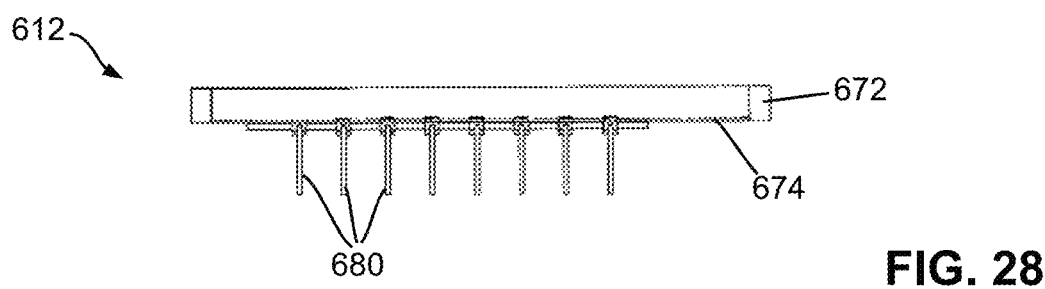
FIGS. 28 and 29 are side views of the touch-sensitive display shown in FIG. 27.
Figure 29:
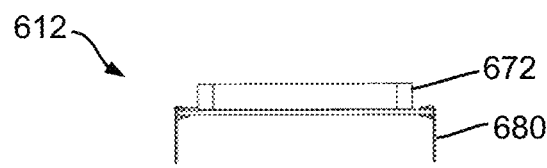

The touch-sensitive display 612 is a 16-bit multi-color thin-film-transistor (TFT) display with capacitive-touch capability, and has a size suitable for fitting onto the platform 642 of the enclosure 602. As shown in FIGS. 27 to 29, the touch-sensitive display 612 comprises a substrate made of soda-lime glass 672 with a 6 mm thickness, and a touch-sensitive film 674 bonded to the glass 672. The touch-sensitive film 674 in these embodiments is a 0.5 mm glass screen with an Indium Tin Oxide (ITO) conductive layer bonded to the glass 672 using an optically clear high-strength adhesive. A plurality of touch-sensitive "buttons" 676 are formed on the touch-sensitive film 674. Each of the buttons 676 is electrically connected to a respective electrical terminal 678 about the edge of the touch-sensitive display 612 which is in turn connected to an electrical pin 680 for connecting to the PCB 662A.

Referring back to FIG. 27, the touch-sensitive display 612 also comprises a set of blue, red and green LEDs 682 for indicating the status of the light controller 600. Each LED 682 may be turned off, on (solid, no flash), single flash, double flash, and triple flash. Table 1 below show an example of the states of the LEDs 682 and the corresponding status of the light controller 600, wherein "ON" represents no flash, solid on, "SF" represents Single Flash, "DF" represents Double Flash, and "TF" represents Triple Flash.

TABLE 1

| STATE | STATUS OF THE LIGHT CONTROLLER |
|---|---|
| STATE 0 | BLUE ON = Normal PWM (dimmer) control output |
| STATE 1 | GREEN SF = DMX control at non-zero, but no output, standby mode (normal operation) PB bump disabled |
| STATE 2 | GREEN DF = DMX control at zero, 10 second waiting period before automatic shutdown |
| STATE 3 | RED ON = "steady red means dead", internal hardware (temp sensor, power supplies, and the like) failure (return to factory) |
| STATE 4 | RED SF = over-temp error (>70° C.) or critical (>80° C.) |
| STATE 5 | RED DF = short circuit detected |
| STATE 6 | RED SF, GREEN SF = inductive load detect |
| STATE 7 | RED DF, GREEN SF = line voltage out of range (too high, too low, zero crossing error or dimmed line input) |
| STATE 8 | YELLOW SF = no load detect |
| STATE 9 | GREEN ON = PWM control at 0, in normal run mode with PB bump enabled |
| STATE 10 | RED TF = invalid hard-key or calibration not complete error |
| STATE 11 | YELLOW TF = line voltage not sensed (no zero crossing or breaker open) |

TABLE 1-continued

| STATE | STATUS OF THE LIGHT CONTROLLER |
|---|---|
| STATE 12 | YELLOW DF = regulation range error |
| STATE 13 | RED SF, YELLOW DF = fan stall error |
| STATE 14 | YELLOW ON = spare |
| STATE 15 | RED SF, YELLOW SF = inrush current error |
| STATE 16 | GREEN TF = spare bump mode enabled for QMX version |
| STATE 17 | RED SF, YELLOW SF = lamp hour alarm |
| STATE 18 | RED DF, YELLOW SF = RMS load overcurrent (to clear, set control to zero) |
| STATE 19 | GREEN SF, YELLOW SF, RED SF = PWM version - curve setup, QMX version - setup dimmer rack address mode |
| STATE 20 | MAGENTA ON = special status indication for switcher fail detect |

Figure 30A:
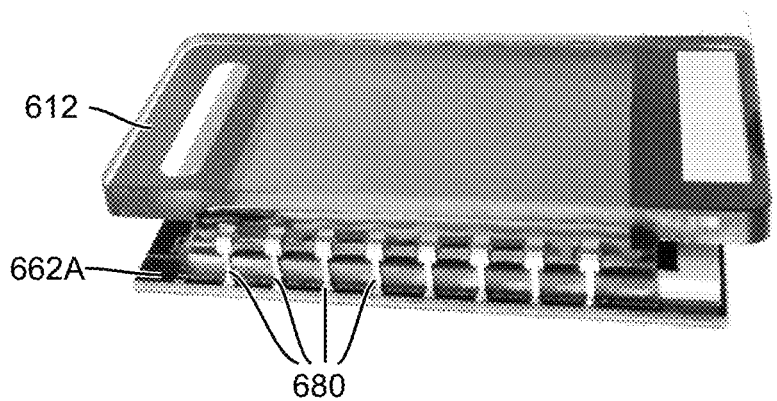
FIG. 30A is a perspective view of the touch-sensitive display shown in FIG. 27 mounted on a first side of a first electrical circuit board of the electrical assembly shown in FIG. 26A.
Figure 30B:
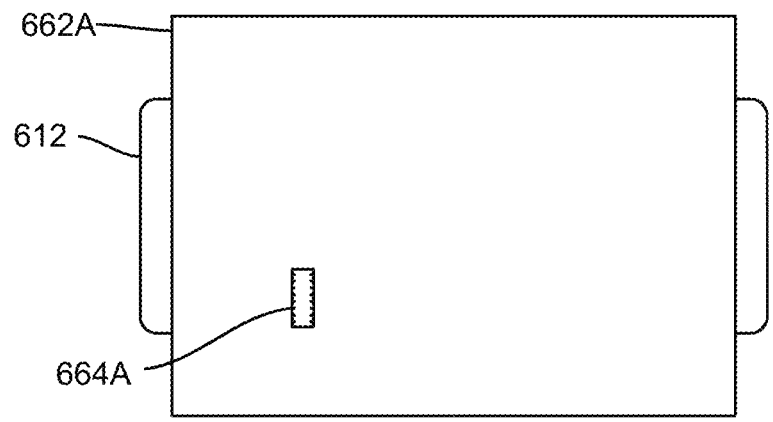
FIG. 30B is a perspective view of the touch-sensitive display and the electrical circuit board shown in FIG. 30A.
Figure 31:
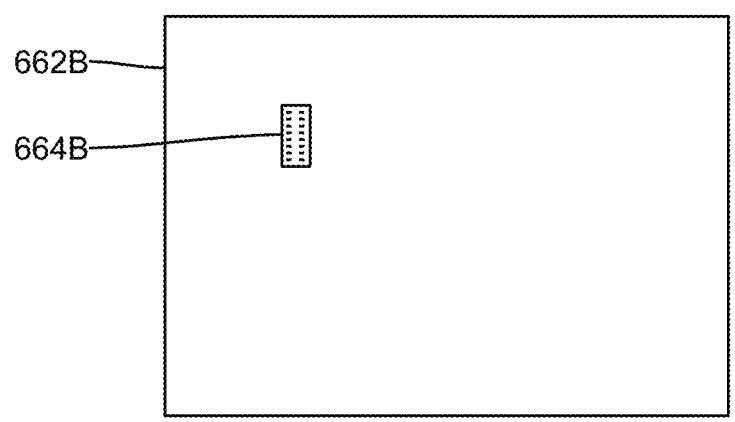
FIGS. 31 and 32 are schematic plan views of a first and a second side of a second PCB of the electrical assembly shown in FIG. 26A.
Figure 32:
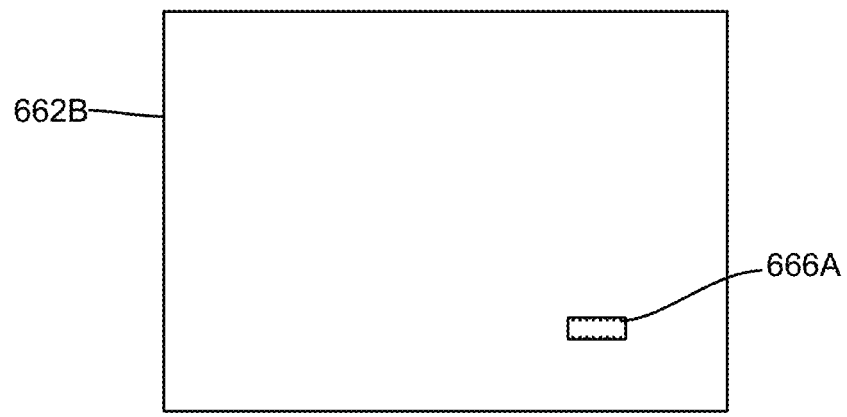
Figure 33:
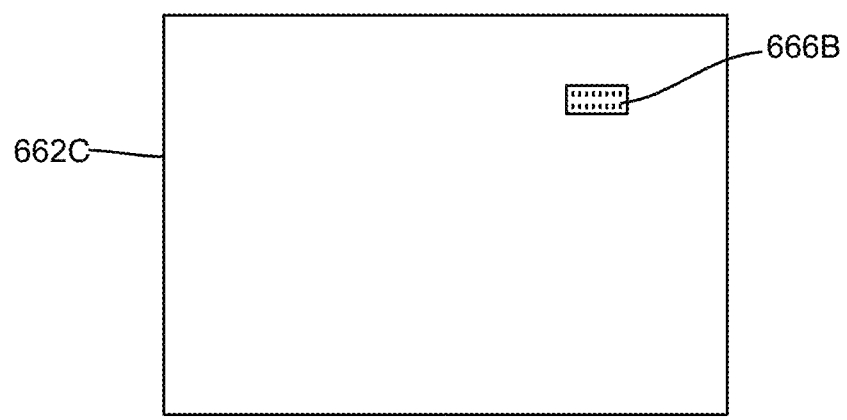
FIGS. 33 and 34 are schematic plan views of a first side and a second side of a third PCB of the electrical assembly shown in FIG. 26A.
Figure 34:
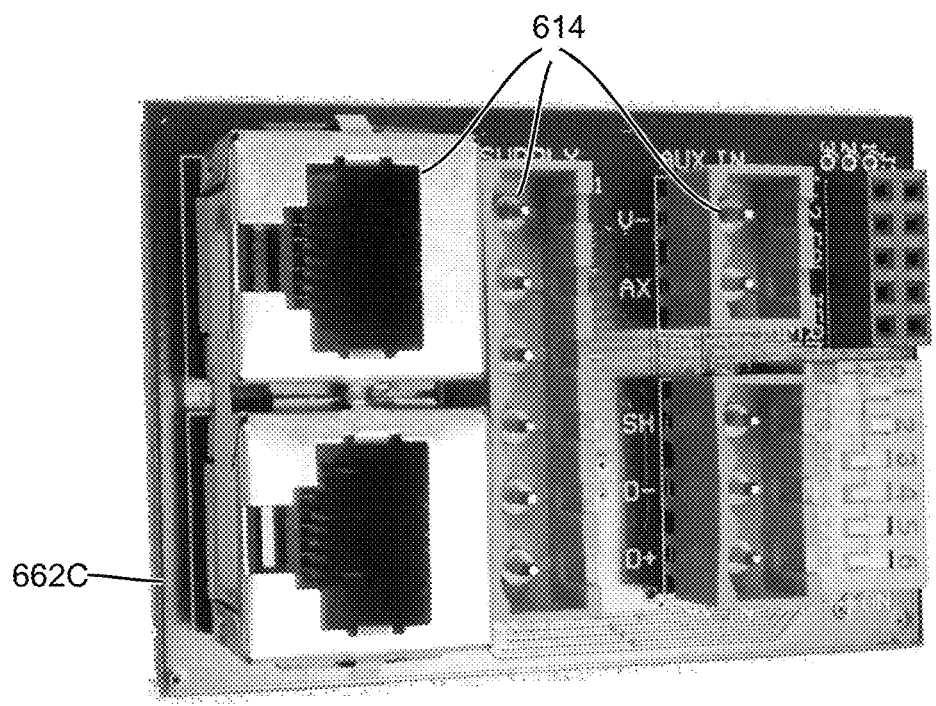

FIGS. 30A and 30B show the touch-sensitive display 612 mounted on a first side of the PCB 662A. FIGS. 31 and 32 show a first and second sides of the PCB 662B. FIGS. 33 and 34 show a first and a second side of the PCB 662C.

As shown in FIG. 30B, on a second side of the PCB 662A opposite to the first side thereof, the PCB 662A comprises a header or male electrical connector 664A such as a header Mezzanine connector. Correspondingly, the PCB 662B comprises a socket or female electrical connector 664B such as a socket Mezzanine connector on a first side thereof (see FIG. 31) at a location matching that of the header electrical connector 664A on the PCB 662A.

Similarly, the PCB 662B comprises a header electrical connector 666A on a second side opposite to the first side thereof (see FIG. 32), and the PCB 662C comprises a socket electrical connector 666B on a first side thereof (see FIG. 33) at a location matching that of the header electrical connector 666A on the PCB 662B. As shown in FIG. 34, the PCB 662C comprises a plurality of electrical terminal connectors 614 on a second side opposite to the first side thereof.

In these embodiments, the electrical connectors 664 (including the header and socket connectors 664A and 664B) and 666 (including the header and socket connectors 666A and 666B) are configured at different locations and with different orientations for avoiding confusion.

To assemble the electrical assembly 604, the PCB 662B is stacked onto the PCB 662C with the header electrical connector 666A inserted into the socket electrical connector 666B, and the PCB 662A is stacked onto the PCB 662B with the header electrical connector 664A inserted into the socket electrical connector 664B. The electrical connector 664 electrically connects the circuits of the PCBs 662A and 662B, and also acts as a spacer separating and supporting the neighboring PCBs 662A and 662B. The electrical connector 666 electrically connects the circuits of the PCBs 662B and 662C, and also acts as a spacer separating and supporting the neighboring PCBs 662B and 662C.

Figure 35:
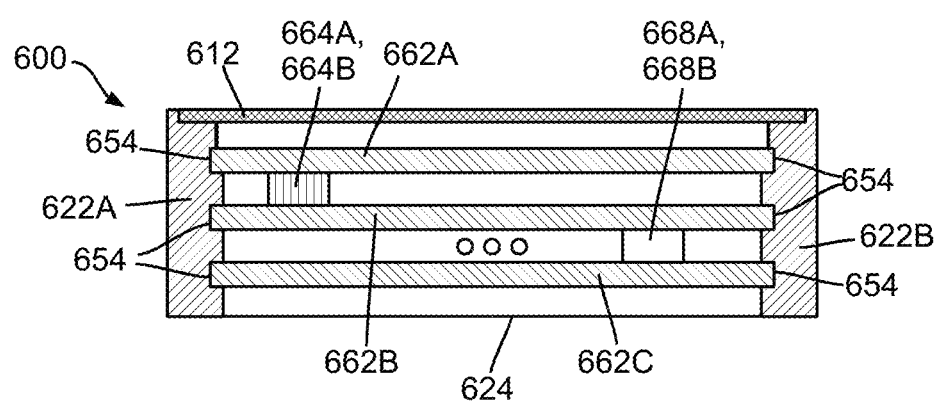
FIG. 35 is a cross-sectional view of the LED controller shown in FIG. 14A along the cross-sectional line X-X shown in FIG. 14C.

As shown in FIG. 35, the electrical assembly 604 is then assembled with two enclosure halves 622A and 622B to form the light controller 600 by using a clamshell technique as follows:

Rotating the enclosure half 622B by 180° to form a complementary counterpart of the enclosure half 622A;

Aligning the enclosure halves 622A, 622B, and the electrical assembly 604 such that their front sides face a same direction;

inserting the edges of the PCBs 662A to 662C into the grooves 654 of the enclosure half 622A such that the touch-sensitive display 612 is received in the step 642 of the enclosure half 622A;

inserting the edges of the PCBs 662A to 662C into the grooves 654 of the rotated enclosure half 622B such that the touch-sensitive display 612 is received in the step 642 of the enclosure half 622B, the protrusion 646 of the enclosure half 622A is received in the notch 648 of the enclosure half 622B, and the protrusion 646 of the enclosure half 622B is received in the notch 648 of the enclosure half 622A; and applying a mounting bracket 656 on to each lateral side of the enclosure 602 by fitting the inserts 658 of the mounting bracket 656 into the fastening holes 650 of the enclosure halves 622A and 622B.

The light controller 600 combines both industry-standard and proprietary communication protocols using commonly-used low-cost CAT5E and CAT6 wiring, thereby permitting easy installation by electrical contractors. The light controller 600 has a dense packaging design suitable for installation in a single-gang electrical back box.

The light controller 600 uses the above-described clamshell technique for assembling the touch-sensitive display 612 and the PCBs 662A to 662C together for structural integrity, mounting accuracy and consistency, and isolation of contaminant (such as drywall dust, metal filings, and the like).

The light controller 600 is a green product with high energy-efficiency such as an energy efficiency with an order of magnitude greater than that of similar large/bulky touch-screens in the art. The light controller 600 is in compliance with the International Energy Agency (I.E.A.) 1 Watt Initiative.

The light controller 600 provides various advantages such as reduced overall system cost, ease of use, scalable modular design and installation, and ease of customization with a Bluetooth® link to a computing device such as a laptop PC or Notebook, thereby permitting a wide range of uses such as displaying corporate logos of clientele, banner ads, real time preset selection, remote dry-contact trigger from room occupancy sensors, Building Management Systems (BMS), and the like.

In some alternative embodiments, the PCB 662A comprises a socket electrical connector 664B on the second side thereof and the PCT 662B comprises a header electrical connector 664A on the first side thereof.

In some alternative embodiments, the PCB 662B comprises a socket electrical connector 664B on the second side thereof and the PCT 662C comprises a header electrical connector 664A on the first side thereof.

In above embodiments, the electrical connectors 664 and 666 connect the electrical circuits of the neighboring PCBs and also act as a spacer. In some alternative embodiments, non-conductive spacers are used for separating and supporting neighboring PCBs. In these embodiments, the electrical circuits of the neighboring PCBs are connected via other suitable means such as by using flexible ribbon cables.

In some embodiments, the lighting system 100 also comprises one or more expandable LED dimmer devices. In these embodiments, the LED dimmer device is a compact, intelligent, multi-channel LED dimming system with capabilities of up to 600 Watts per dimmer/channel thereby allowing a wider range of use. The LED dimmer device uses state-of-the-art power metal-oxide-semiconductor field-effect transistors (MosFETs) coupled with high-speed embedded processing intelligence.

In some embodiments, the above-described light-control devices may be used with the LED dimmer devices disclosed herein. By using a suitable communication protocol (such as QMX) a plurality of the PRESIDOR® LED dimmer devices such as up to 128 PRESIDOR® LED Dimmer devices in various assemblies and enclosures may be individually controlled. The herein-disclosed LED dimmer device obtains various feedbacks/read-backs from the devices/components thereof for intelligently self-diagnosing common issues that may arise in the field.

The herein-disclosed LED dimmer device can handle both LED (capacitive loads) and incandescent (resistive) loads thereby permitting interface to most legacy lighting fixtures and lamps as people slowly replace their lights to LED for power savings. The LED dimmer device uses common industry protocols such as DMX512, BACnet and contact closure for the widest marketability.

Compared to existing LED dimmer devices, the LED dimmer devices disclosed herein achieve more advanced and modern requirements with lower cost and are suitable for easier modular installation with easier support via both the internet and telephone. With its scalable design, the LED dimmer device disclosed herein allows a LED lighting system to grow as necessary. The LED dimmer device disclosed herein is a green product with high energy-efficiency and is in compliance with the International Energy Agency (I.E.A.) 1 Watt Initiative. The power MosFETs are driven using reverse phase control thereby eliminating the requirement of a large, expensive inductor (choke) and thus reducing both the cost and footprint. The LED dimmer device only exhibits one (1) Watt loss at 600-Watt load which is much more efficient than other reverse phase dimmers that typically employ insulated-gate bipolar transistors (IGBTs) and are 10-12 times less efficient at the same load.

The herein-disclosed 600 W "green" LED line voltage (AC) dimmer may be enclosed in a package of less than 3.00 cubic inches and have an efficiency of over 99.7%. Quad MosFET configuration provides this exceptional efficiency using state-of-the-art low-on-resistance devices. The herein-disclosed LED dimmer devices use silicon for heat management instead of heat-sinks.

The herein-disclosed LED dimmer devices use dual microprocessor technique and fast MosFET turn-on for achieving a 1 mW standby power consumption. The herein-disclosed LED dimmer devices use tri-color status indicator technique and unique rack address single pushbutton programming technique to permit a wide range of user-friendly capabilities and visual feedback using a custom transparent light pipe button display RGB LED feedback in solid and/or blink rates in various colors. This permits a wide range of various error reporting when installed, thereby permitting ease of troubleshooting over the phone with unskilled electricians or people who have not read the supplied manual. In some embodiments, 21 visual error codes are used.

The herein-disclosed LED dimmer device employs a single pushbutton light curve set-up method for adapting to numerous line voltage/mains voltage "dimmable" LED lamps on the market. As every LED Lamp driver type is unique, the existing LED lamps on the market respond slightly differently when dimmed due to the characteristics and quality of the drivers they employ. For example, the LED lamps made by a same manufacturer with a same model number but from different batch lots may exhibit different dimming response. The single pushbutton light curve set-up method allows a user to set the low end (dimmest part) of the light curve at the minimum stable level of the LED lamps they are using. Then, the herein-disclosed LED dimmer device locks this level into its memory and eliminate the numerous normal issues that would otherwise occur on the low end/turn on part of the curve when existing LED dimmers were used. Visual feedback via programming "set curve" status is provided to the user with a color change once completed.

With distributed LED dimming, the herein-disclosed LED dimmer device may be deployed closer to the loads, thereby requiring less copper wiring and less installation time and cost in new facilities, compared to existing LED dimmer devices.

The herein-disclosed LED dimmer device can be quickly and easily installed adjacent to an existing power panel in retrofit applications to permit LED line voltage dimming, giving rise to power savings and a better controllable environment. The herein-disclosed LED dimmer device is compatible with existing legacy incandescent lamps, leading to lower cost in updating an existing facility. The herein-disclosed LED dimmer device also provides ease of use and serviceability.

As described above, herein-disclosed LED dimmer device can self-diagnose a number of common field wiring problems, and supports modern communication protocols.

Figure 36:
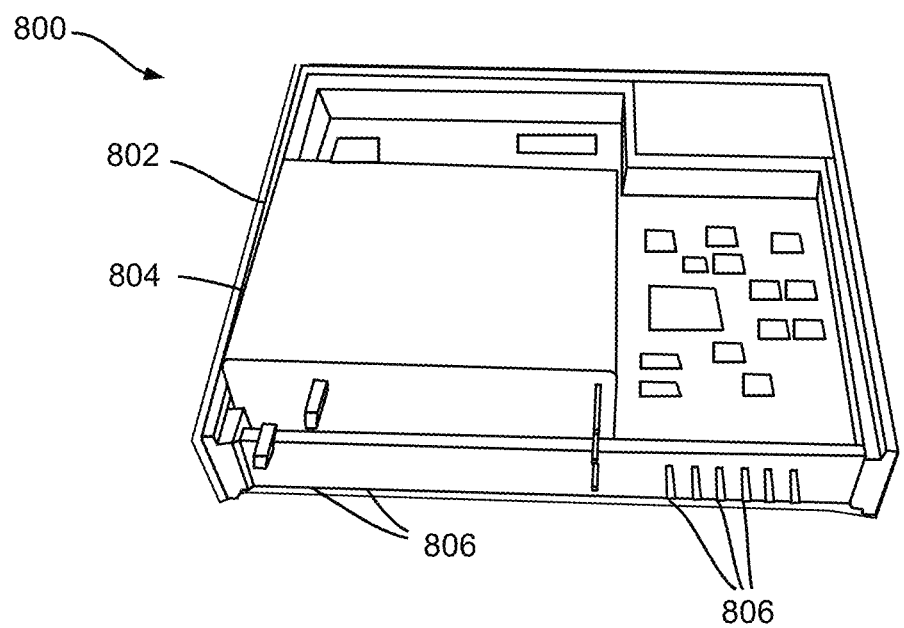
FIGS. 36 to 38 are perspective views of an electrical device from various viewing directions, according to some embodiments of this disclosure, wherein the electrical device comprises an enclosure and an electrical circuit board.
Figure 37:
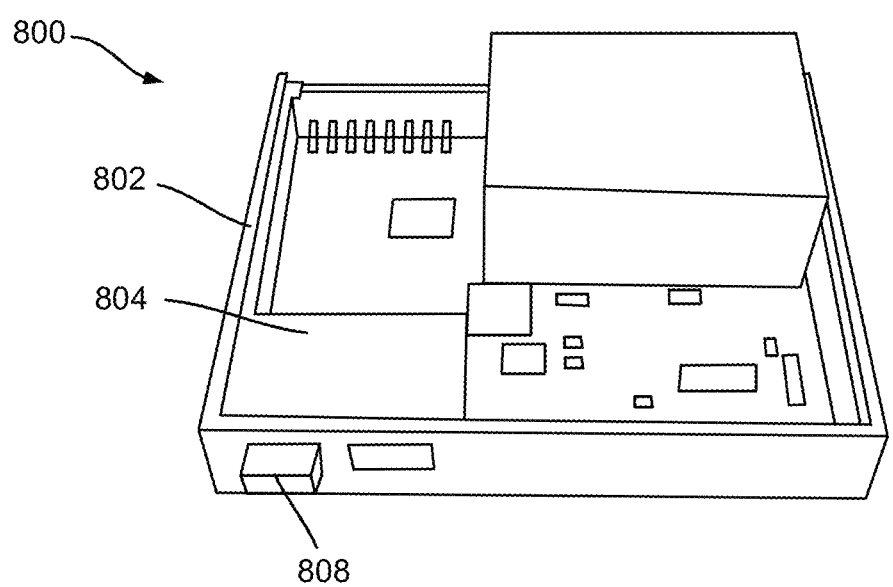
Figure 38:
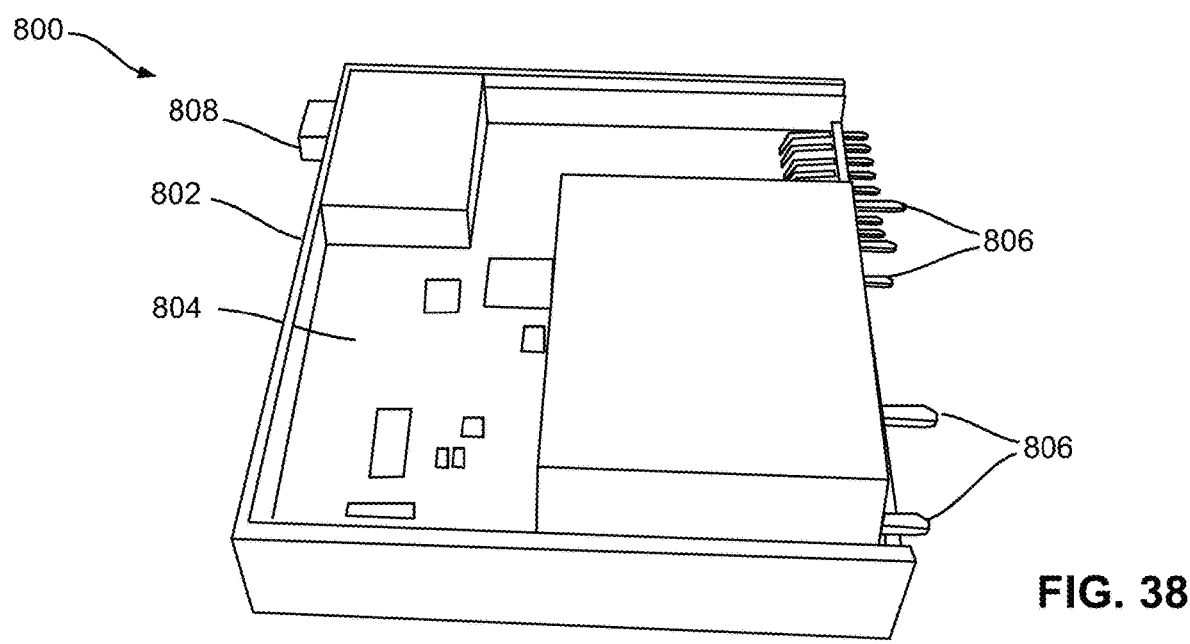

Turning now to FIGS. 36 to 38, an electrical device in the form of a light emitting diode (LED) dimmer device is shown and is generally identified using reference numeral 800. The electrical device 800 comprises an enclosure 802 enclosing therein an electrical circuit board 804 such a printed circuit board (PCB). The electrical circuit board 804 comprises a plurality of electrical/non-electrical components (not shown) thereon. One or more of these components such as a plurality of electrical pins 806 and a pushbutton 808 may extend out of the enclosure 802.

Figure 39:
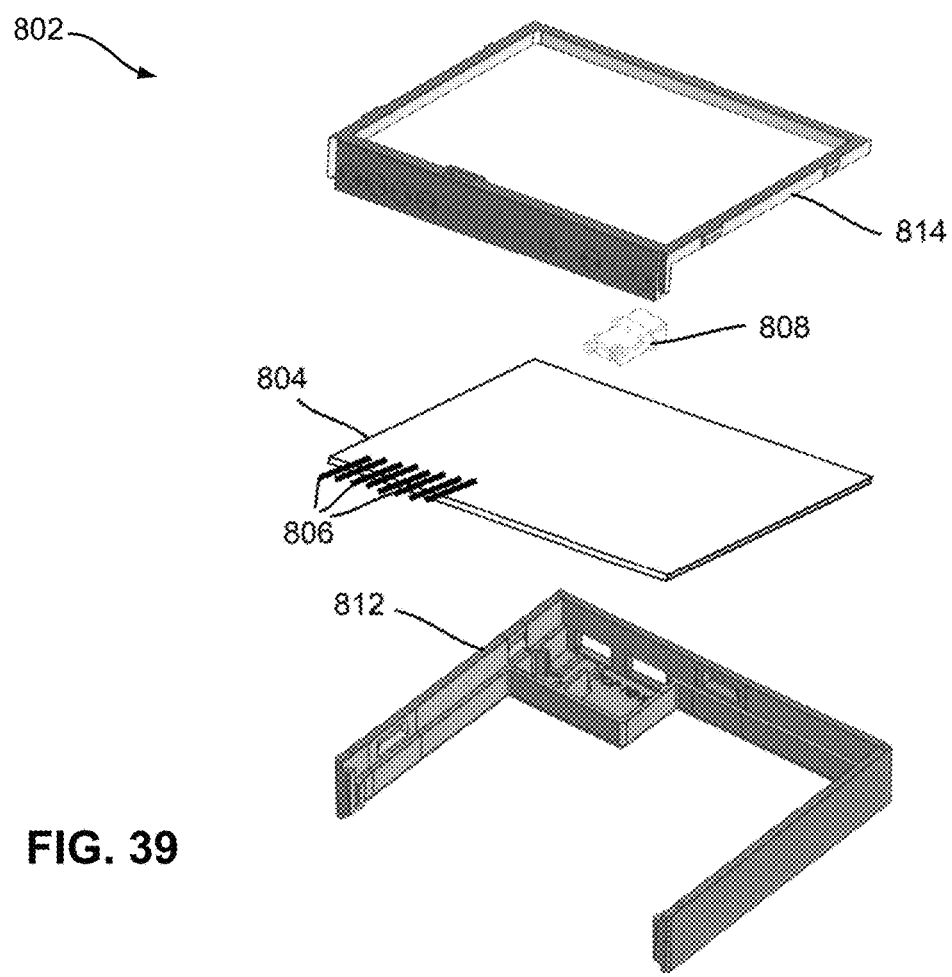
FIG. 39 is an exploded view of the electrical device shown in FIG. 36.

As shown in FIG. 39, the enclosure 802 comprises a housing structure 812 and an insert 814 sandwiching the PCB 804 therebetween. The housing structure 812 and the insert 814 are made of a suitable material such as plastic.

FIGS. 40 to 46 show the housing structure 812. As shown, the housing structure 812 comprises a front wall 822 and two sidewalls 824A and 824B extending rearwardly from two opposite ends 826 and 828 of the front wall 822. The front wall 822 and sidewalls 824A and 824B have a same height and enclose an "interior" space 830 for receiving the insert 814 and the PCB 804 therein.

The front wall 822 shows a logo 842 on an outer surface thereof and comprises two windows or openings 844 adjacent the end 826 of the front wall 822. The windows 844 may be used for extending one or more components such as one or more pushbuttons 808 out of the enclosure 802 or for allowing one or more pins of other devices to extend into the enclosure 802, as the device design may need.

Figure 41:
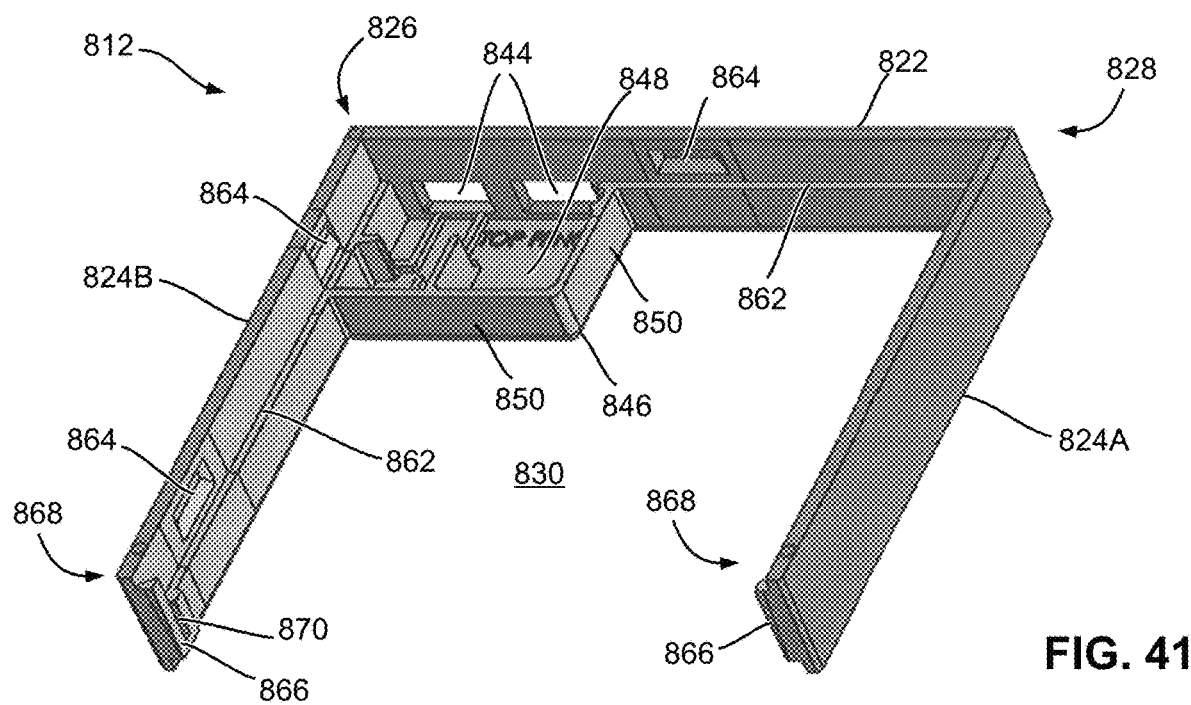
FIG. 41 is a perspective view of the housing structure of the enclosure of the electrical device shown in FIG. 36, viewing from a top side of the housing structure.
Figure 42:
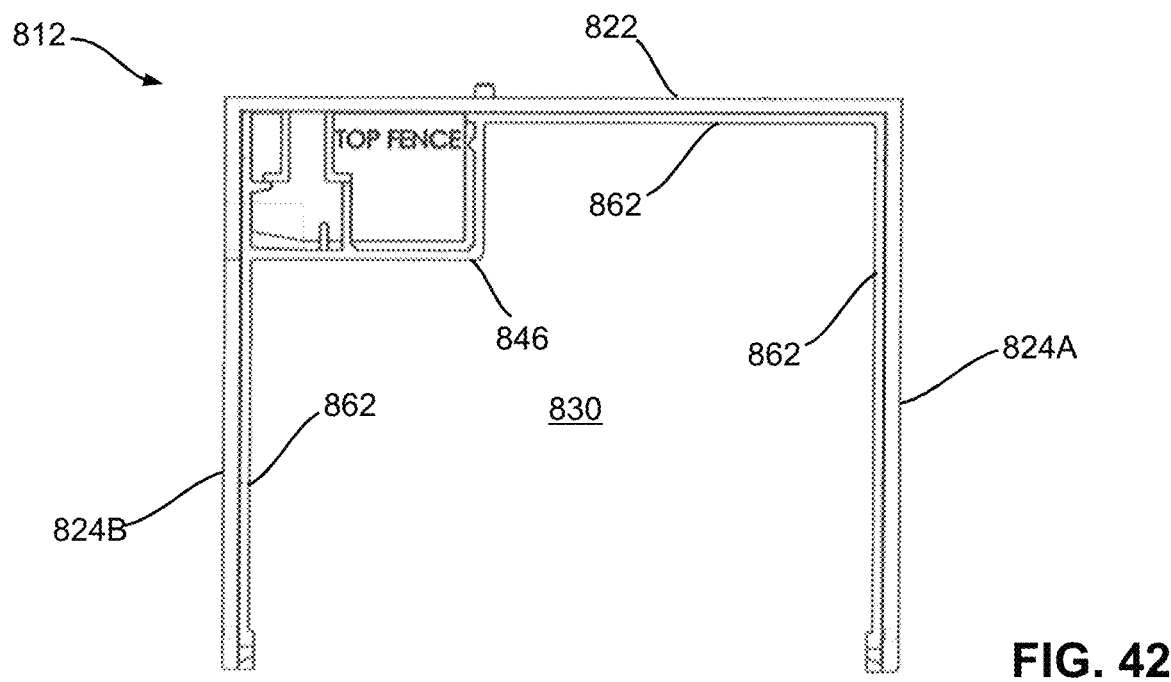
FIG. 42 is a plan view of the housing structure shown in FIG. 40.
Figure 43:
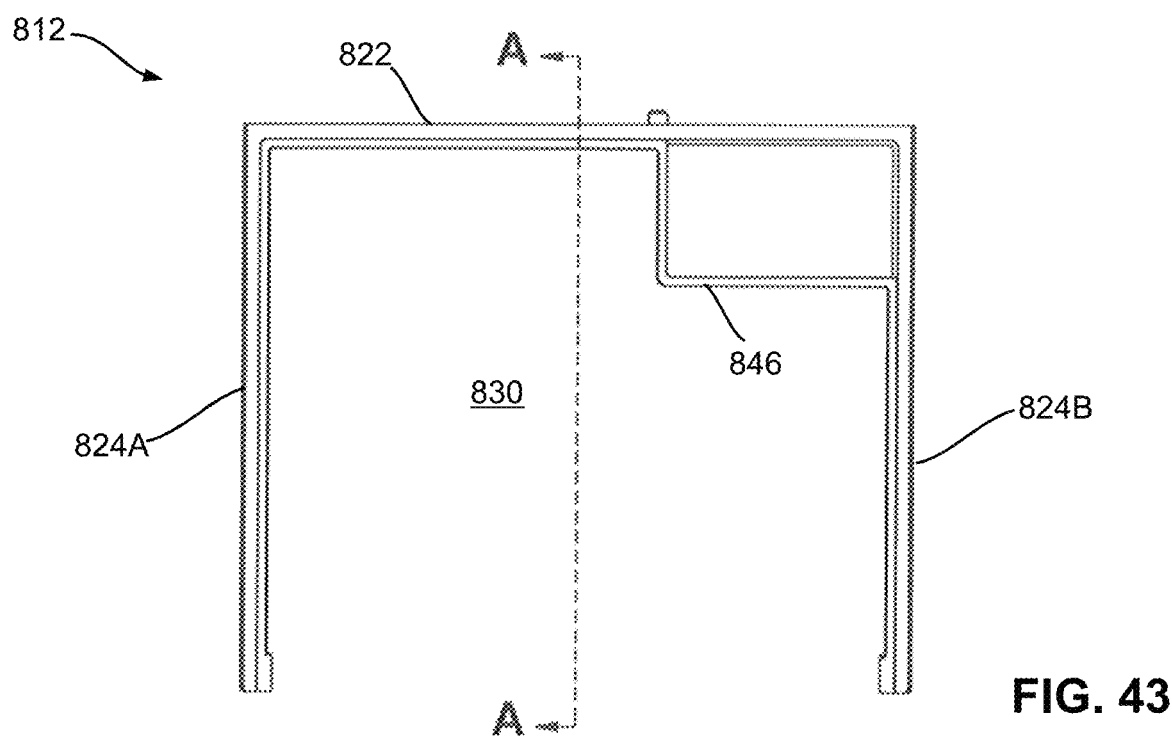
FIG. 43 is a bottom view of the housing structure shown in FIG. 40.
Figure 44:
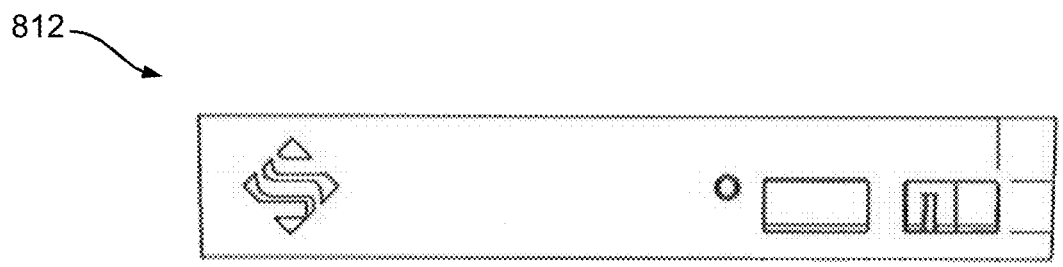
FIG. 44 is a front view of the housing structure shown in FIG. 40.
Figure 45:
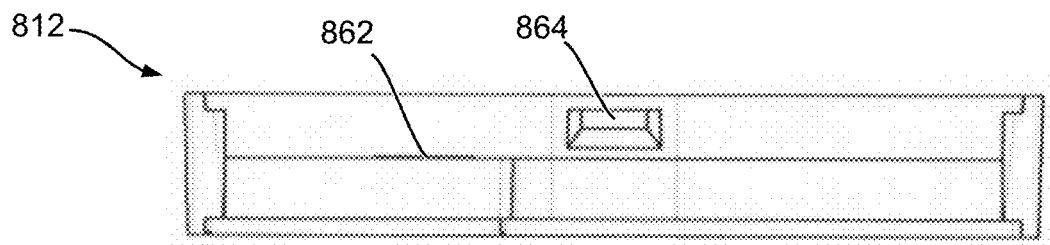
FIG. 45 is a rear view of the housing structure shown in FIG. 40.

In these embodiments, the housing structure 812 also comprises a fenced platform 846 about and in communication with the windows 844 for receiving and supporting the components that may extend out of the windows 844. As shown in FIG. 41, the fenced platform 846 comprises a bottom wall 848 and two side-fences 850 coupled to the front wall 822 and sidewall 824B about the windows 844. The side fences 850 of the fenced platform 846 has a height of about half of that of the sidewalls 824A and 824B. The fenced platform 846 comprises an open top allowing an installer to access and position components therein.

As shown in FIGS. 40 to 46, the housing structure 812 comprises a step or upward-facing shoulder 862 on an inner side thereof across the front wall 822 and the two sidewalls 824A and 824B for receiving and supporting the PCB 804. In particular, each of the front wall 822 and the sidewalls 824A and 824B of the housing structure 812 comprises a portion of the step or upward-facing shoulder 862 on the inner side thereof flush with the top of the side fences 850 of the fenced platform 846.

Each of the front wall 822 and the sidewalls 824A and 824B of the housing structure 812 also comprises one or more recesses 864 on the inner side thereof above the step 862 for securing the insert 814 (described later). In other words, the shoulder 862 faces the recesses 864. In the example shown in FIGS. 40 to 46, the front wall 822 comprises one recess 864 on the inner surface thereof, and each of the sidewalls 824A and 824B comprises two recesses 864 on the inner surface thereof.

Figure 40:
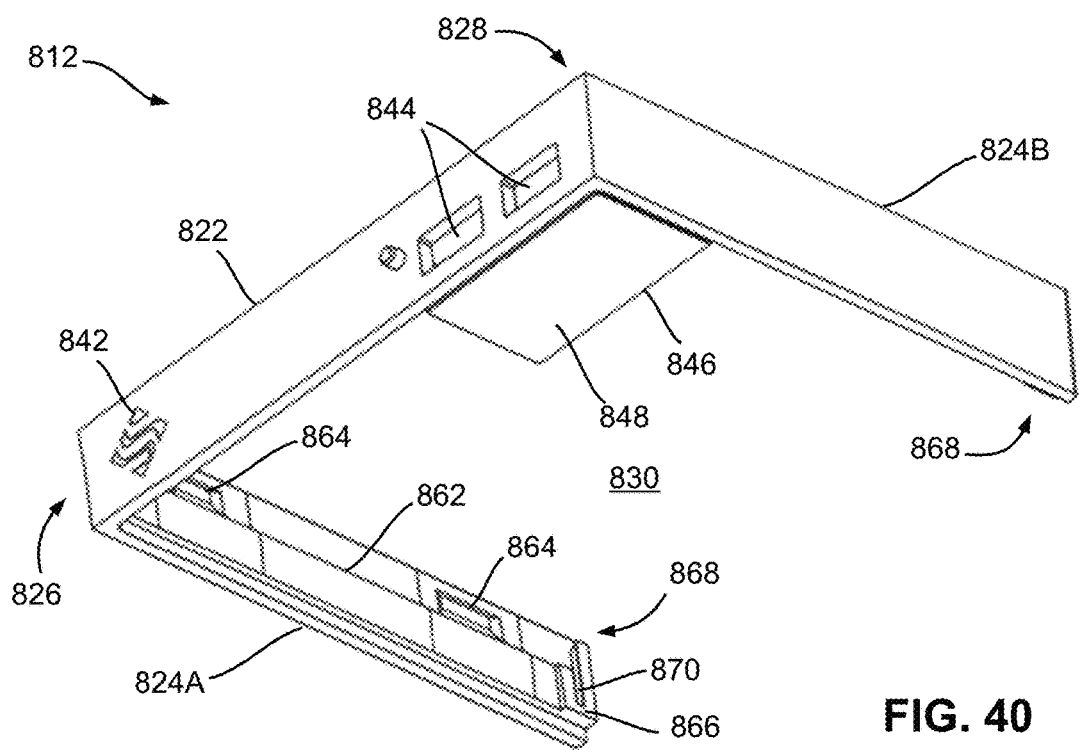
FIG. 40 is a perspective view of a housing structure of the enclosure of the electrical device shown in FIG. 36, viewing from a bottom side of the housing structure.
Figure 46:
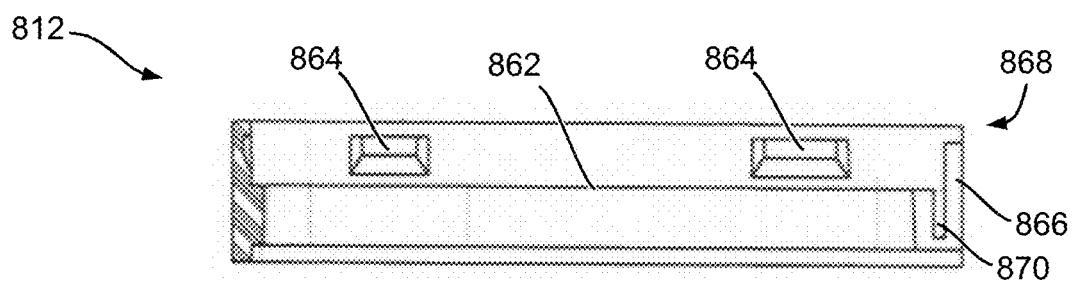
FIG. 46 is a cross-sectional view of the housing structure shown in FIG. 40 along the sectional line A-A shown in FIG. 43.
Figure 47:
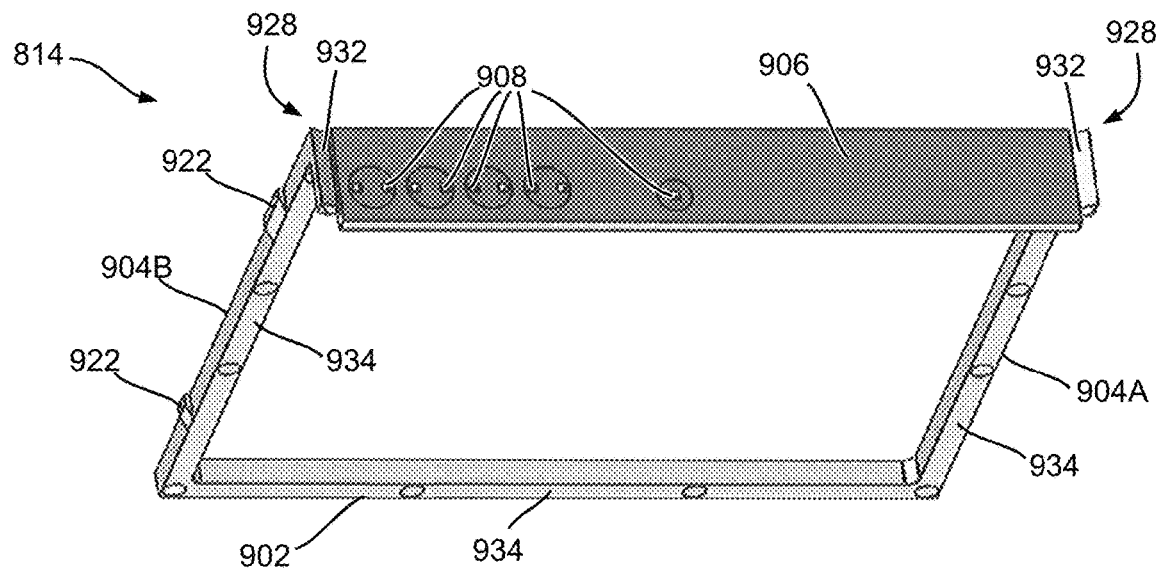
FIGS. 47 and 48 are perspective views of an insert of the enclosure of the electrical device shown in FIG. 36, viewing from a bottom side of the insert.
Figure 48:
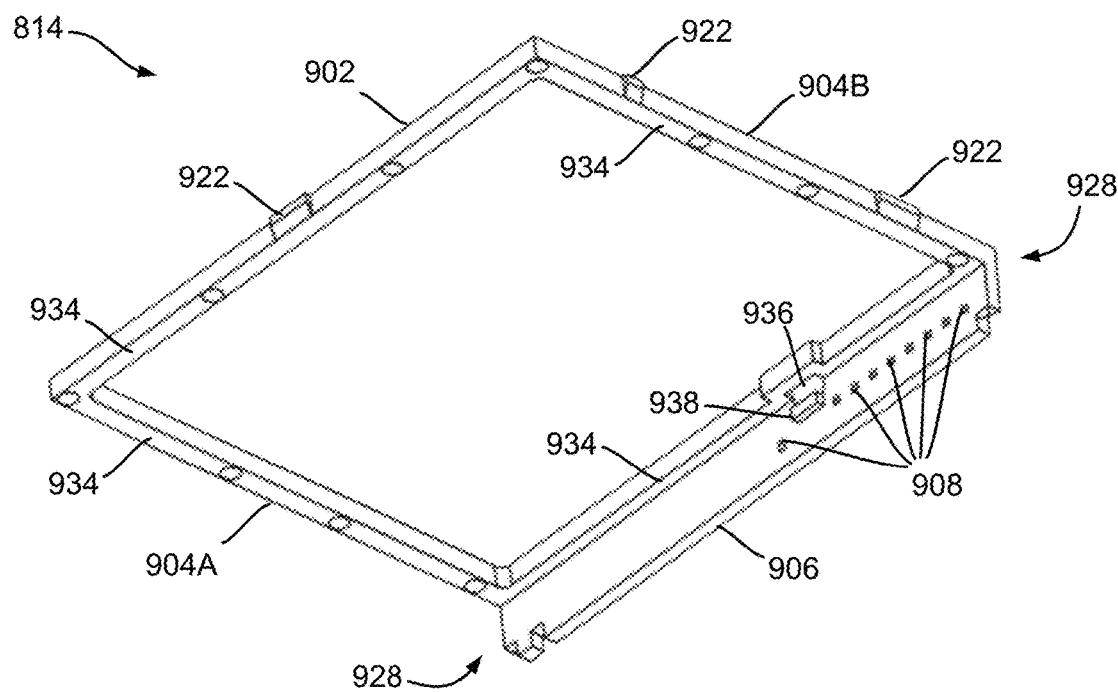
Figure 49:
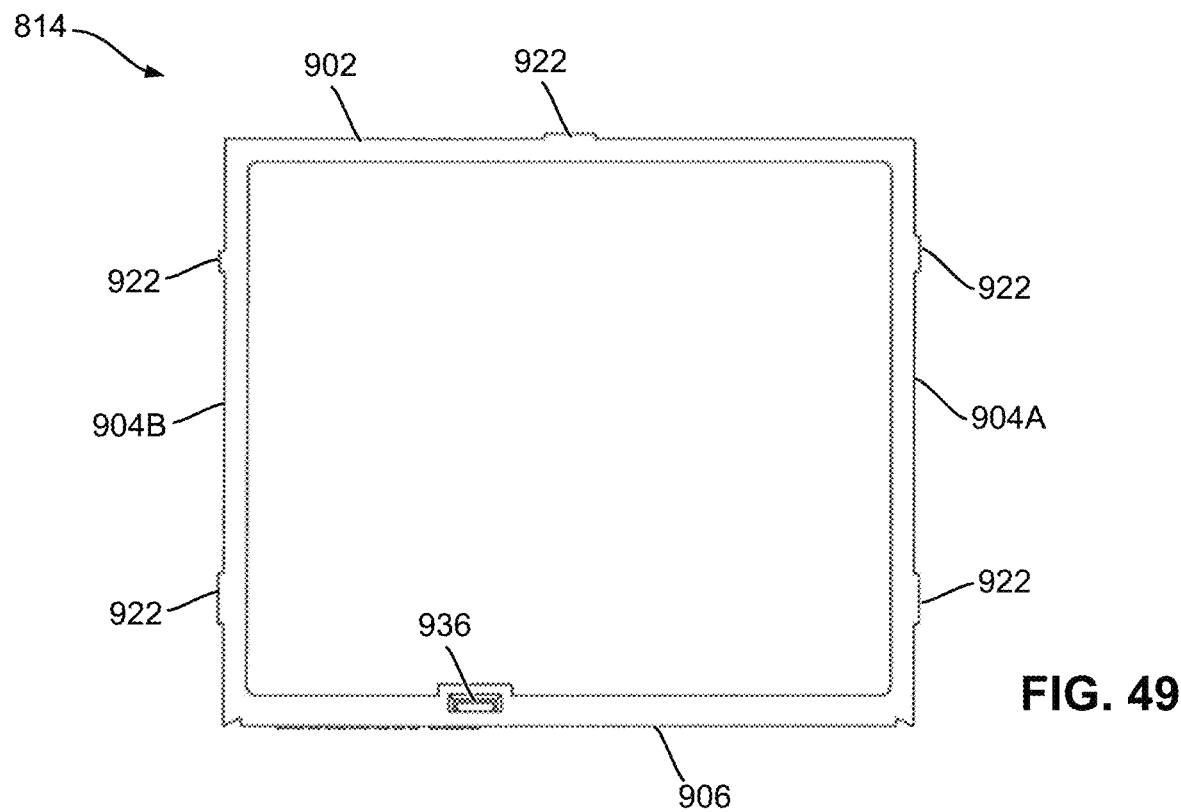
FIG. 49 is a plan view of the insert shown in FIG. 47.
Figure 50:
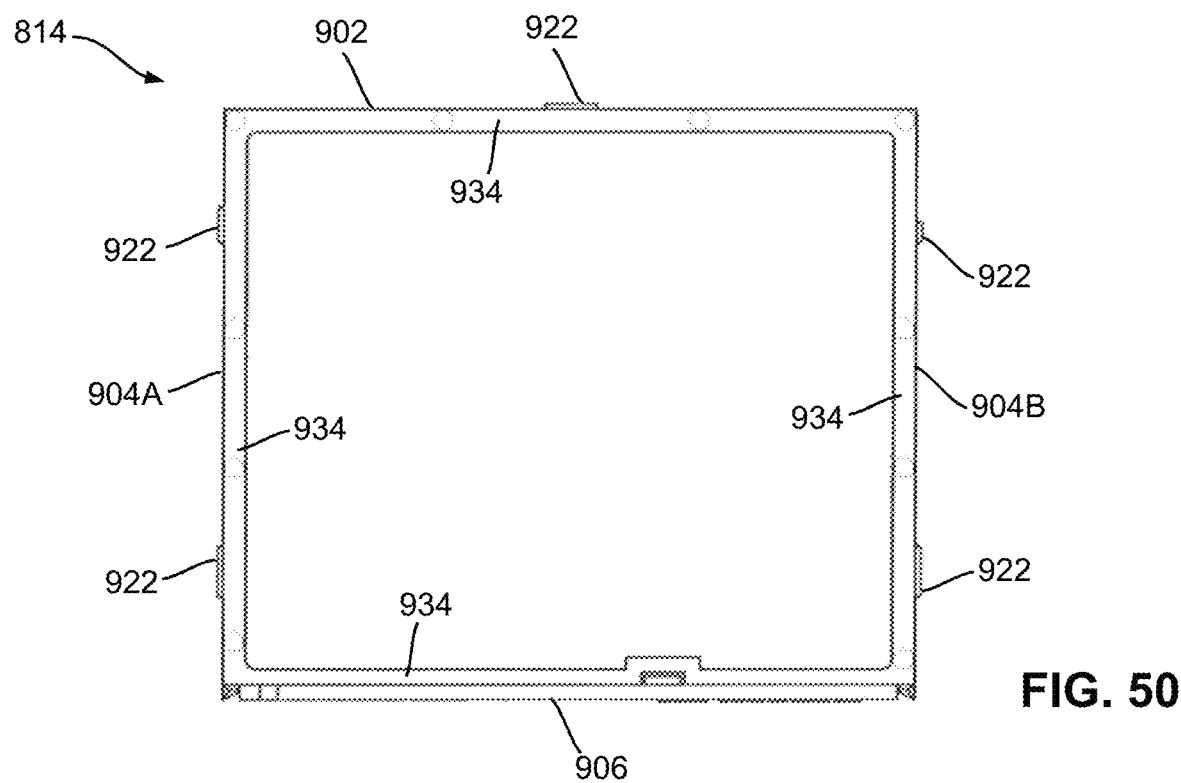
FIG. 50 is a bottom view of the insert shown in FIG. 47.
Figure 51:
FIG. 51 is a side view of the insert shown in FIG. 47.
Figure 52:
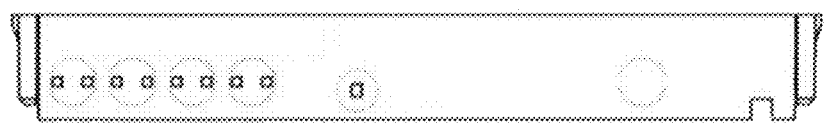
FIG. 52 is a front view of the insert shown in FIG. 47.
Figure 53:
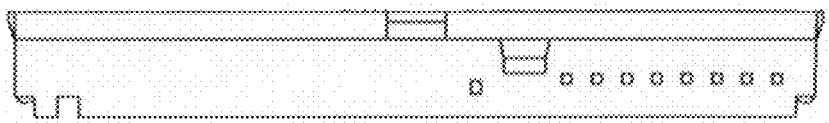
FIG. 53 is a rear view of the insert shown in FIG. 47.

As shown in FIGS. 40, 41, and 46, each sidewall 824A, 824B comprises an upward-facing U-shape ridge 866 on the inner surface thereof about a distal end 868. The U-shape ridge 866 defines a groove 870 for securing the insert 814 (described later).

FIGS. 47 to 53 show the insert 814. As shown, the insert 814 is configured as a rectangular frame and has a size suitable for fitting into the housing structure 812 and engaging the inner surfaces thereof. The insert 814 comprises a front frame 902, two side-frames 904A and 904B, and a rear wall 906.

As shown in FIGS. 47 to 53, each of the front frame 902 and the side frames 904A and 904B of the insert 814 comprises one or more protrusions 922 on an outer side surface thereof at perimetric locations corresponding to those of the recesses 864 of the housing structure 812. In the example shown in FIGS. 47 to 53, the front frame 902 comprises one protrusion 922 on the outer surface thereof, and each of the de frames 904A and 904B comprises two protrusions 922 on the outer surface thereof. Each protrusion 922 has a size suitable for fitting into the corresponding recess 864.

The rear wall 906 comprises a plurality of pinholes 908 for extending electrical pins (not shown) as needed. The two opposite ends 928 of the rear wall 906 have a thickness suitable for fitting into the grooves 870. Each end 928 also comprises a groove 932 with a width suitable for receiving therein the outer portion of the U-shape ridge 866 of the sidewall 824A, 824B of the housing structure 812.

The rear wall 906 further comprises a downward-facing shoulder 934 flush with the bottom surfaces of the frames 902, 904A and 904B forming a supporting structure (also denoted using reference numeral 934) for collaborating with the shoulder 862 of the housing structure 812 for sandwiching the PCB 804 therebetween.

The supporting structure 934 of the rear wall 906 comprises a locking hole 936 generally downwardly extending therethrough. Correspondingly, the rear wall 906 comprises a stopper 938 below the locking hole 936 at a distance about the same or slightly larger than the thickness of the PCB 804.

Figure 54:
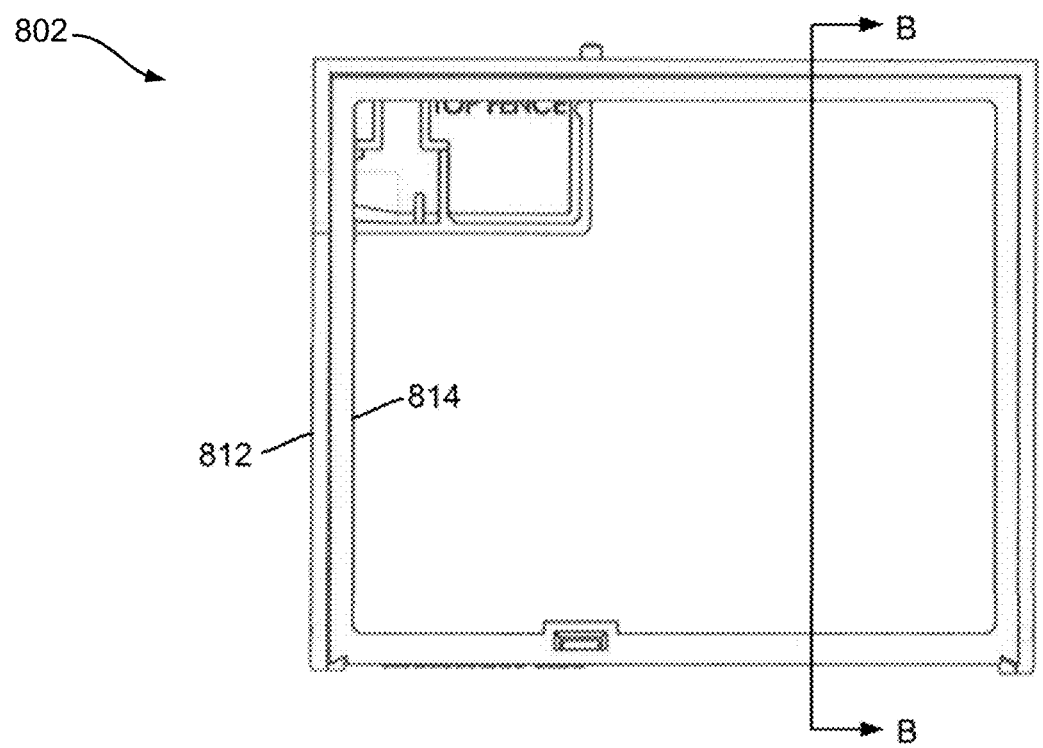
FIG. 54 is a plan view of an assembled enclosure of the electrical device shown in FIG. 36.
Figure 55:
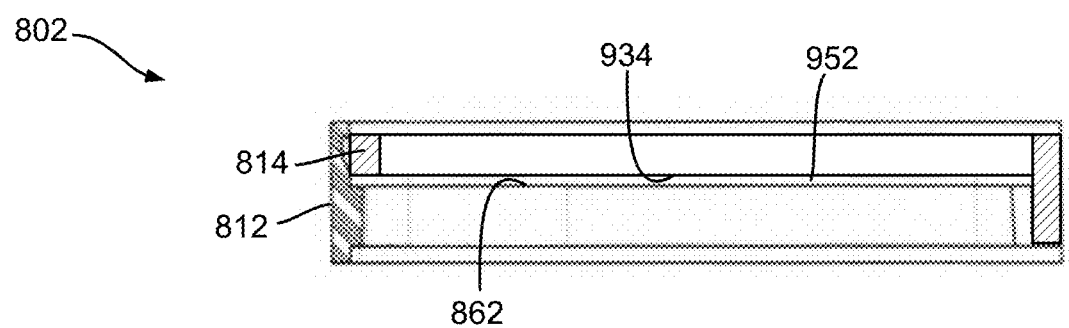
FIG. 55 is a cross-sectional view of the assembled enclosure of the electrical device shown in FIG. 36 along the sectional line B-B shown in FIG. 54.
Figure 56:
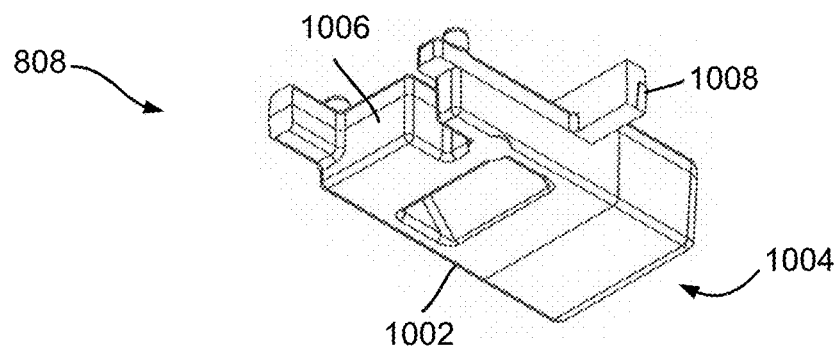
FIGS. 56 and 57 are perspective views of a button of the electrical device shown in FIG. 36.
Figure 57:
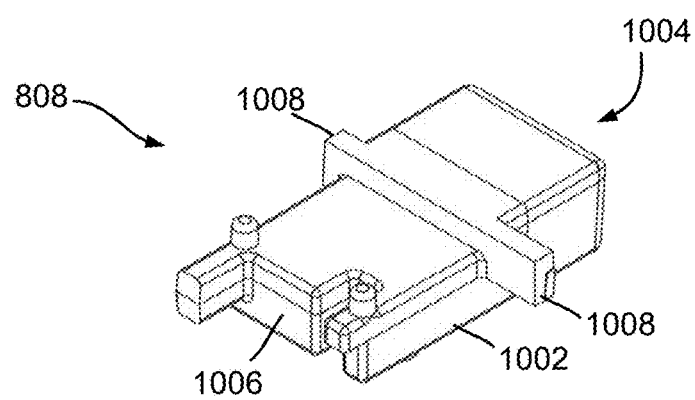
Figure 58:
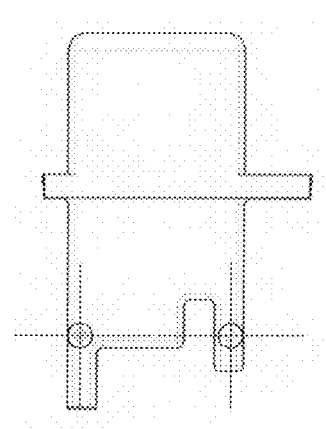
FIG. 58 is a plan view of the button shown in FIG. 56.
Figure 59:
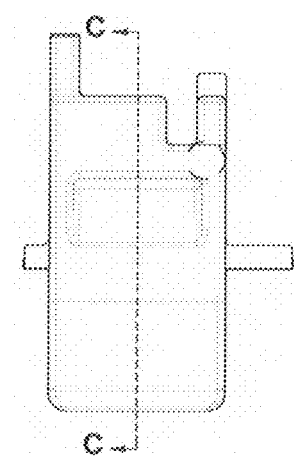
FIG. 59 is a bottom view of the button shown in FIG. 56.
Figure 60:
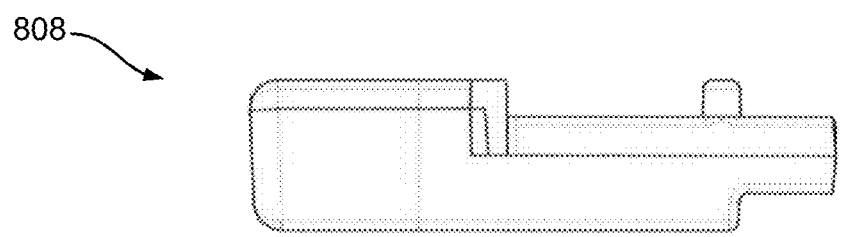
FIG. 60 is a side view of the button shown in FIG. 56.
Figure 61:
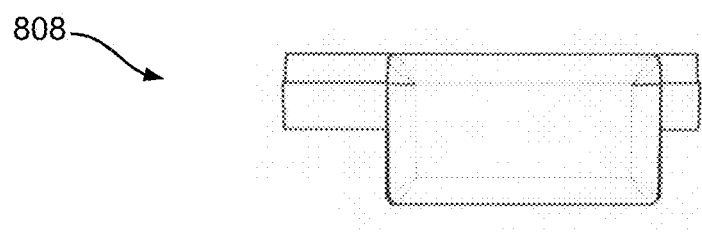
FIG. 61 is a front view of the button shown in FIG. 56.
Figure 62:
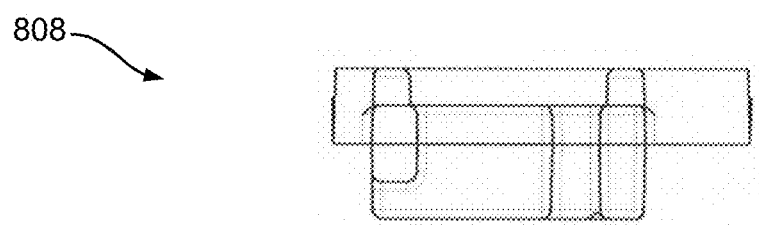
FIG. 62 is a rear view of the button shown in FIG. 56.
Figure 63:
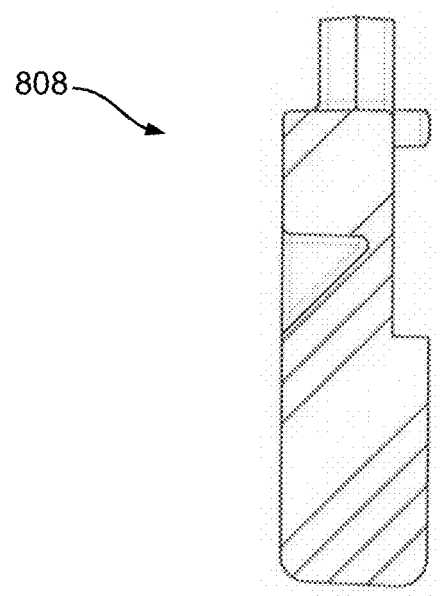
FIG. 63 is a cross-sectional view of the button shown in FIG. 56 along the sectional line C-C shown in FIG. 59.

The insert 814 may be assembled to the housing structure 812 to form an enclosure 802 for receiving therein the PCB 804. FIG. 54 shows a plan view of an assembled enclosure 802. FIG. 55 is a cross-sectional view of the assembled enclosure 802 along the sectional line B-B. As shown, when the housing structure 812 and the insert 814 are assembled, the step 862 of the housing structure 812 and the supporting structure 934 are at a distance to each other, thereby forming a gap 952 therebetween with a width about the same or slightly larger than the thickness of the PCB 804 for receiving the PCB 804 therein.

As described before, the PCB 804 in these embodiments comprises a pushbutton 808. FIGS. 56 to 63 show various views of the pushbutton 808. As shown, the pushbutton 808 comprises a body 1002 having a front surface 1004 for pushing and a rear surface 1006 for engaging a switch (not shown) on the circuit board 804. The pushbutton 808 also comprises a stopper 1008 laterally extending from a middle portion of the body 1002.

Figure 64:
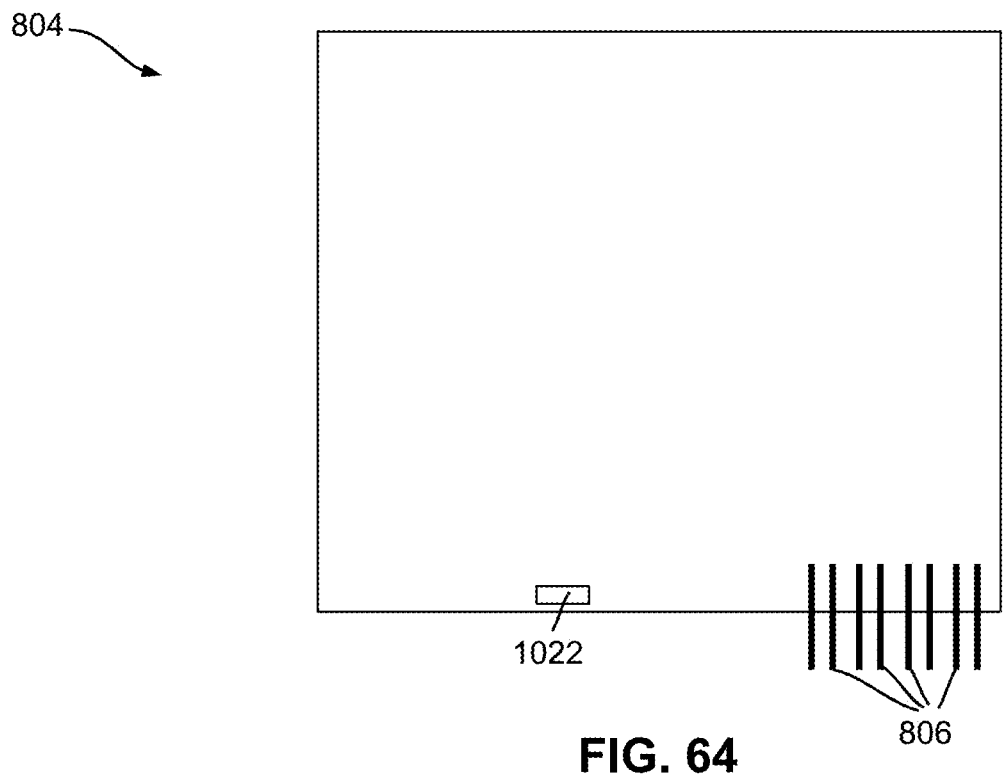
FIG. 64 is a schematic plan view of an electrical circuit board of the electrical device shown in FIG. 36.

FIG. 64 is a schematic plan view of a PCB 804. The PCB 804 has a size suitable for sitting onto the supporting structure 934 of the insert 814, and comprises a locking hole 1022 at a location corresponding to the locking hole 936 of the insert 814. A plurality of electrical pins 806 extending rearwardly from a rear side of the PCB 804. The locations of the electrical pins 806 correspond to those of the pinholes 908 of the insert 814.

Although not shown, the PCB 804 in these embodiments comprises power metal-oxide-semiconductor field-effect transistors (MosFETs) driven by using reverse phase control for eliminating the requirement of a large, expensive inductor. The electrical device 800 in these embodiments only exhibits 1 Watt loss at 1300-Watt load and is in compliance with the International Energy Agency (I.E.A.) 1 Watt Initiative. Moreover, the electrical device 800 uses dual microprocessor technique and fast MosFET turn-on for achieving a 1 mW standby power consumption.

In these embodiments, the electrical device 800 uses tri-color status indicator technique and unique rack address single pushbutton programming technique to permit a wide range of user-friendly capabilities and visual feedback using a custom transparent light pipe button display RGB LED feedback in solid and/or blink rates in various colors. This permits a wide range of various error reporting when installed, thereby permitting ease of troubleshooting over the phone with unskilled electricians or people who have not read the supplied manual. In some embodiments, 21 visual error codes are used.

In these embodiments, the electrical device 800 implements a light curve customization function in the PCB 804. With this function, a user may use the pushbutton 808 to set up a light curve for the line voltage/mains voltage "dimmable" LED lamps connected to the electrical device 800. In particular, the user may use the pushbutton to set the low end (dimmest part) of the light curve at the minimum stable level of the LED lamps. Then, the electrical device 800 stores the user-defined low-end into the memory on the PCB 804 for later use. The electrical device 800 also provides visual feedback via programming "set curve" status with a color change once completed.

Figure 65:
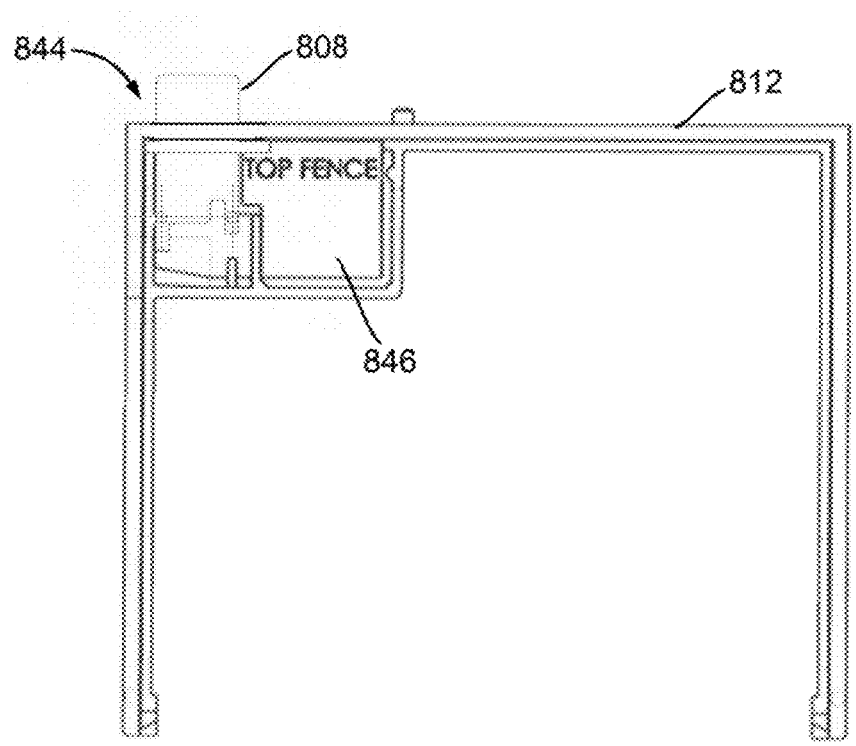
Figure 66A:
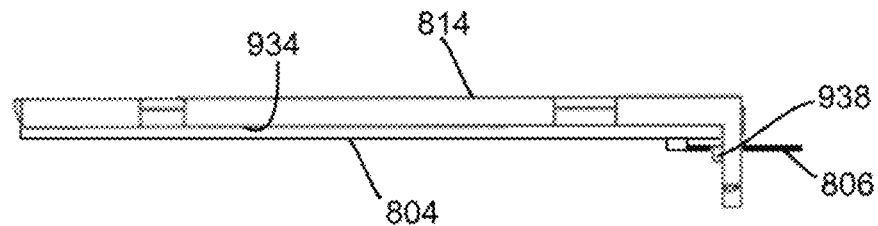
FIGS. 66A and 66B show positioning the PCB (shown in FIG. 64) onto the insert (shown in FIGS. 47 to 53)
Figure 66B:
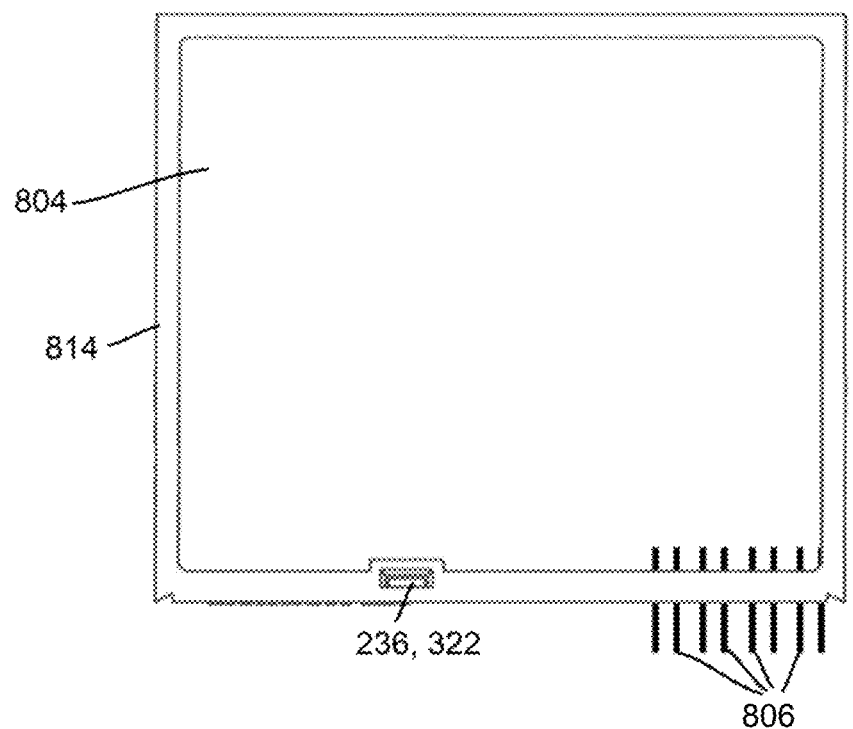
Figure 67A:
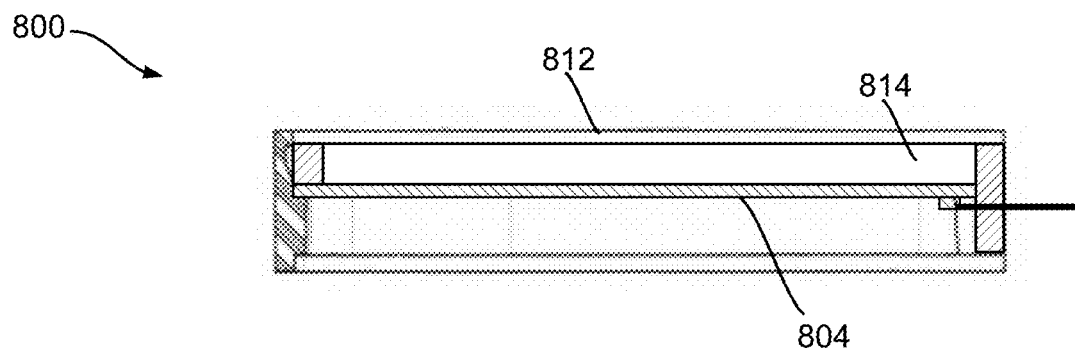
Figure 67B:
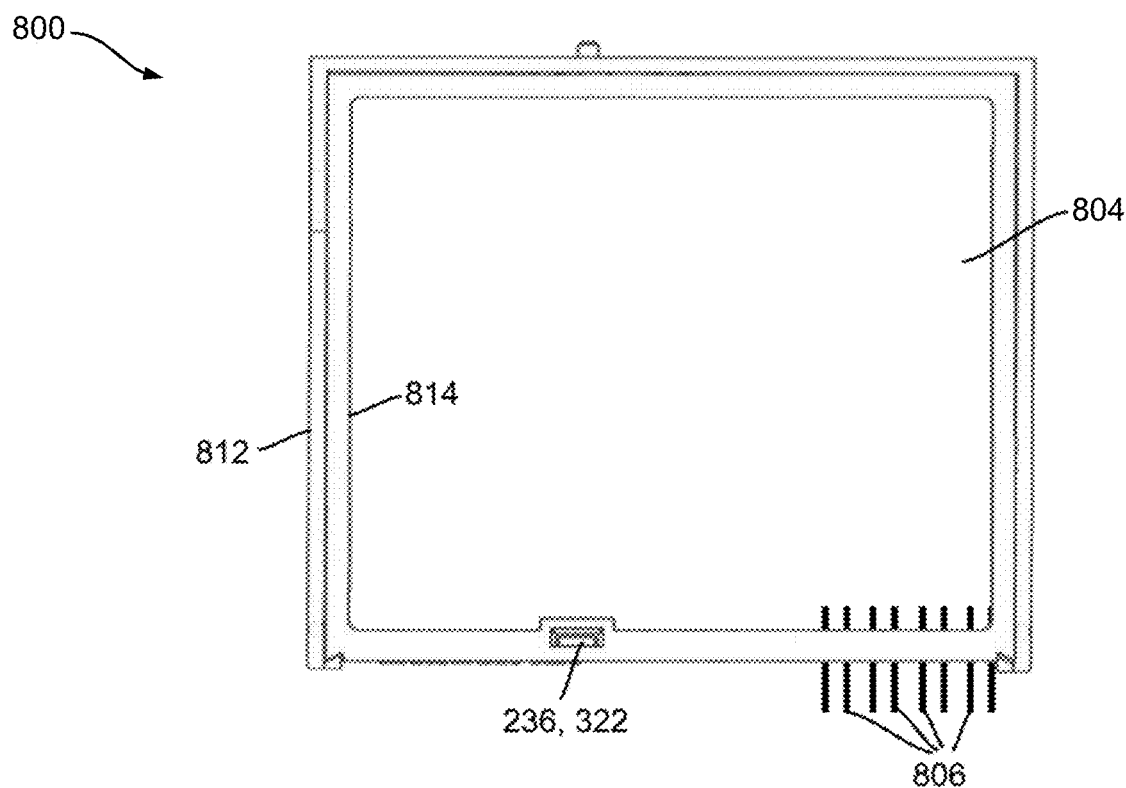

To assemble the electrical device 800, an installer may first put the pushbutton 808 into the fenced platform 846 and slide the pushbutton out of a window 844 (FIG. 65). The stopper 1008 engages the inner surface of the front wall 822 of the housing structure 812 to prevent the pushbutton 808 from completely moving out of the window 844.

Next, the installer may put the PCB 804 against the supporting structure 934 of the insert 814 and insert the rear end of the PCB 804 to the rear wall 906 into the gap between the supporting structure 934 and the stopper 938 thereof such that the electrical pins 806 extend though the pinholes 908 of the rear wall 906 of the insert 814 (FIGS. 66A to 67B). The locking hole 936 of the insert 814 is thus aligned with the locking hole 1022 of the PCB 804.

Then, the installer may install the insert 814/PCB 804 into the housing structure 812 by: (1) sliding the two opposite ends 928 of the rear wall 906 of the insert 814 into the respective grooves 870 of the housing structure 812 and also sliding the outer portion of each ridge 866 of the housing structure 812 into a respective groove 932 of the insert 814, and (2) snapping the protrusions 922 of the insert 814 into respective recesses 864 of the housing structure 812. The PCB 804 is then firmly sandwiched between the shoulders 862 of the housing structure 812 and the supporting structure 934 of the insert 814. The electrical device 800 is thus firmly assembled without using any fastener such as screws, glue, nails and the like.

The assembled electrical device 800 may be easily disassembled without using any tools. For example, one may first push an end 928 of the rear wall 906 of the insert 814 out of the groove 870 of the housing structure 812, and then pop each protrusion 922 of the insert 814 out of the respective recess 864 of the housing structure 812. The assembled electrical device 800 is disassembled after the other end of the rear wall 906 of the insert 814 is pushed out of the groove 870 of the housing structure 812.

Those skilled in the art will appreciate that the installer may optionally insert a suitable fastener such as a pin, glue or hot-melt adhesive into the aligned locking holes 936 and 1022 to further secure the PCB 804 in place.

Those skilled in the art will appreciate that various alternative embodiments are readily available. For example, although in above embodiments, the housing structure 812 comprises one or more recesses 864 for engaging the protrusions 922 of the insert 814, in some alternative embodiments, the housing structure 812 may comprise one or more holes for engaging the protrusions 922 of the insert 814.

Figure 68:
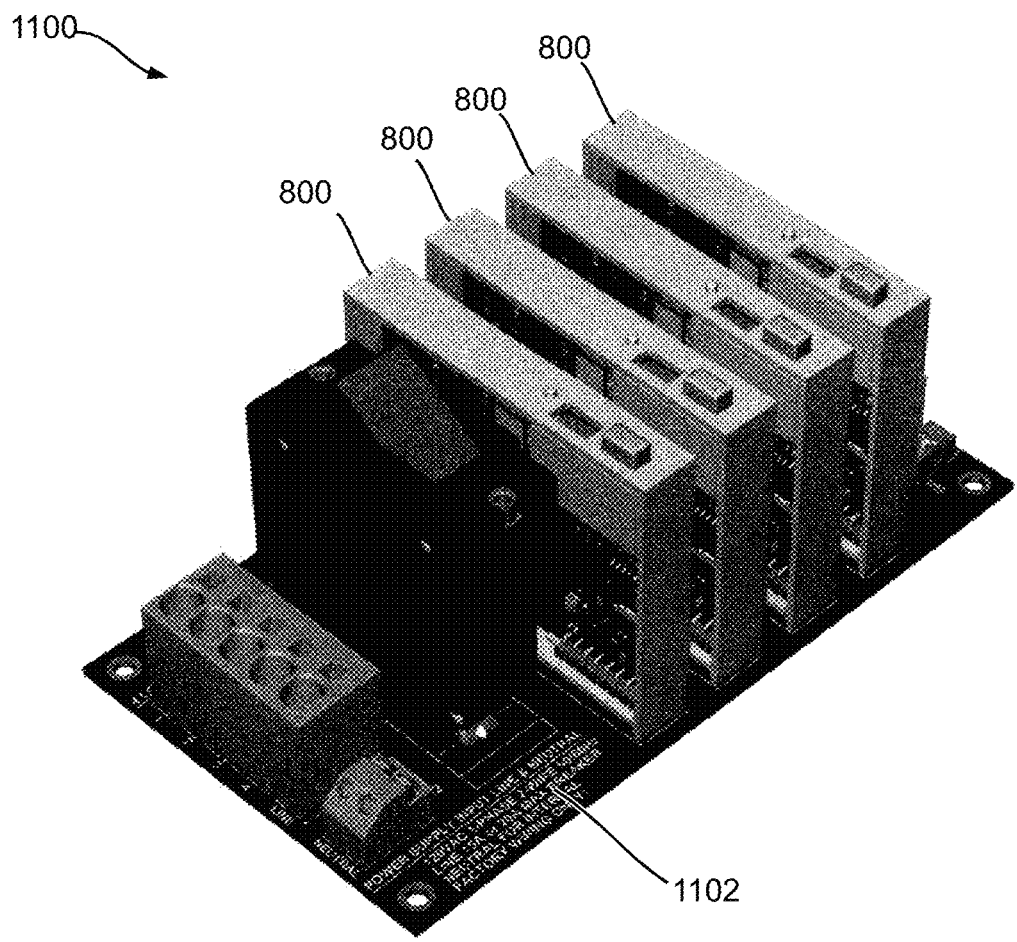
FIGS. 68 and 69 are perspective views of an expandable circuit board having a plurality of the electrical device shown in FIG. 36.
Figure 69:
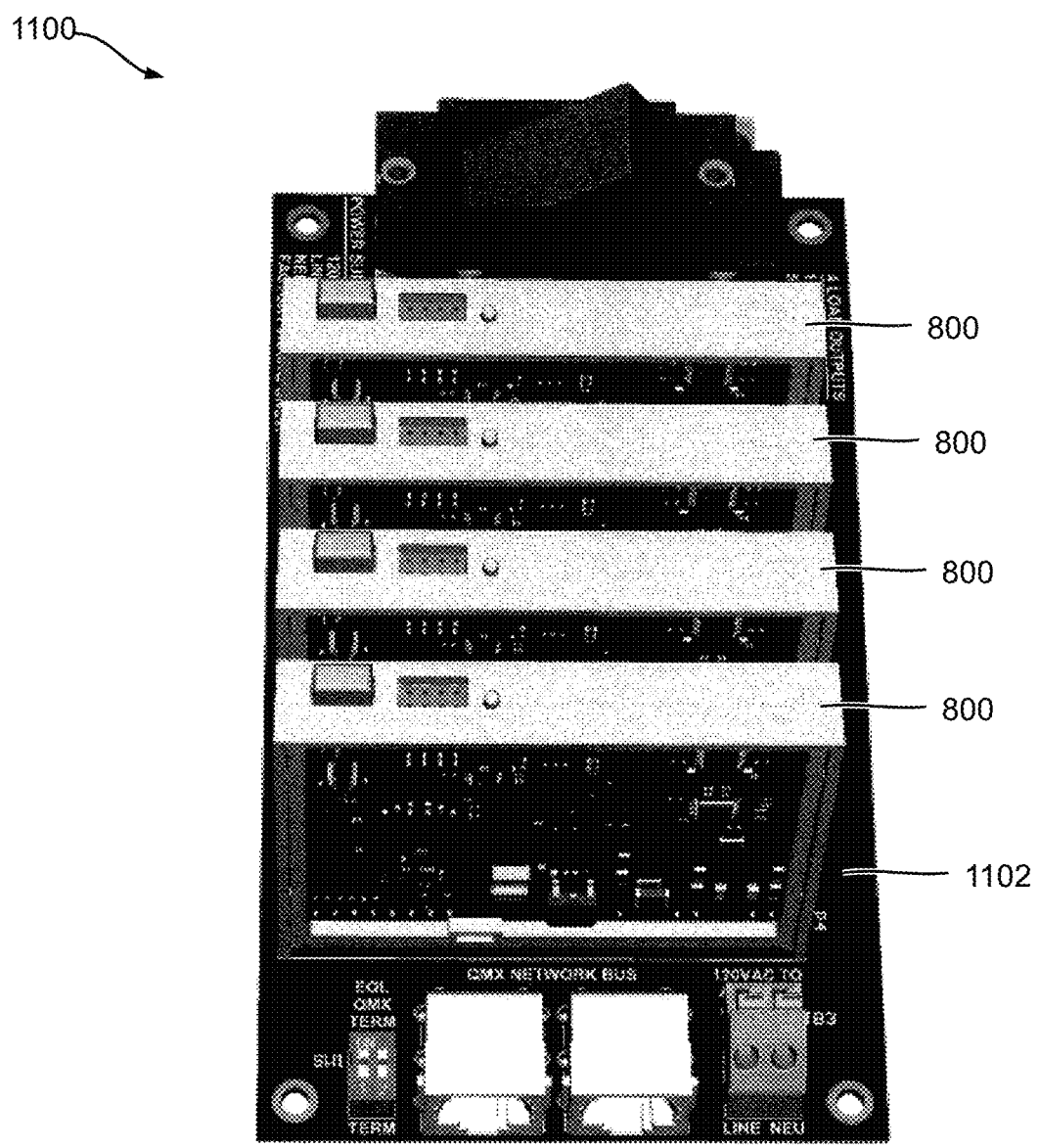

FIGS. 68 and 69 show an expandable LED dimmer module 1100 in some alternative embodiments. As shown, the expandable LED dimmer module 1100 comprises a circuit board 1102 having a plurality of slots (not shown) thereon. Each slot is suitable for coupling, supporting and electrically connecting an above-described electrical device 800. In the example shown in FIGS. 68 and 69, four (4) electrical devices 800 have been coupled to the circuit board 1102. Each of the four electrical devices 800 may have a specific functionality and specific electrical characteristics.

Although in above embodiments, the electrical device 800 is in the form of a LED dimmer device, in some alternative embodiments, the electrical device 800 may be designed and used for other purposes.

Although embodiments have been described above with reference to the accompanying drawings, those of skill in the art will appreciate that variations and modifications may be made without departing from the scope thereof as defined by the appended claims.

What is claimed is:

1. A lighting system for deploying in a lighting area, the light area comprising a plurality of lighting subareas, the lighting system comprising:
a plurality of central-control devices electrically connected in a first daisy-chain; and
one or more groups of local light-control devices separated from the plurality of central-control devices and for deploying in the plurality of lighting subareas for controlling a plurality of lighting devices therein;
wherein each group of local light-control devices are electrically connected in a daisy-chain form thereby forming one or more second daisy-chains; and
wherein each second daisy-chain is connected to one of the plurality of central-control devices of the first daisy-chain.

2. The lighting system of claim 1, wherein the group of local light-control devices of each second daisy-chain are sequentially connected beginning with a first one of the group of local light-control devices of the second daisy-chain and ending with a last one thereof.

3. The lighting system of claim 1, wherein only one local light-control device of each second daisy-chain is immediately connected to one of the plurality of central-control devices of the first daisy-chain.

4. The lighting system of claim 1, wherein the plurality of central-control devices and the one or more groups of local light-control devices form a distributed lighting control structure.

5. The lighting system of claim 1, wherein a first one of the plurality of central-control devices of the first daisy-chain is automatically configured as a master central-control device, and others of the plurality of central-control devices of the first daisy-chain are configured as slave central-control devices manageable by the master central-control device.

6. The lighting system of claim 5, wherein each central-control device comprises a plurality of input ports each configured for connecting one of the one or more groups of local light-control devices.

7. The lighting system of claim 6, wherein one of the plurality of input ports is configured for connecting to a next one of the plurality of central-control devices in the first daisy-chain.

8. The lighting system of claim 7, wherein each central-control device further comprises an output port for connecting to a previous one of the plurality of central-control devices in the first daisy-chain.

9. The lighting system of claim 6, wherein each central-control device is configured for maintaining a link table recording a mapping between the one or more groups of local light-control devices and the plurality of lighting subareas.

10. The lighting system of claim 1, wherein each group of local light-control devices control one or more of the plurality of lighting devices in one of the plurality of lighting areas.

11. The lighting system of claim 1, wherein, in each second daisy-chain, a first one of the plurality of local light-control devices is automatically configured as a master local light-control device, and others of the plurality of local light-control devices are configured as slave local light-control devices manageable by the master local light-control device.

12. The lighting system of claim 1, wherein each of the plurality of local light-control devices comprises a touch-sensitive screen.

13. The lighting system of claim 12, wherein the touch-sensitive screen is configured for displaying a plurality of touchable icons for triggering a plurality of functions.

14. The lighting system of claim 13, wherein the plurality of touchable icons comprise a clean-screen icon for disabling the touch response of the touch-sensitive screen for a predefined time-period.

15. The lighting system of claim 1, wherein each of the plurality of local light-control devices comprises a motion sensor and a light sensor.

16. The lighting system of claim 15, wherein each of the plurality of local light-control devices comprises a faceplate; and wherein the faceplate comprises a pair of tubes engageable with the motion sensor and the light sensor, respectively, for preventing ambient light from entering the light sensor and the motion sensor.

17. The lighting system of claim 1, wherein the plurality of central-control devices is connected via a bidirectional communication link.

18. The lighting system of claim 1, wherein each group of local light-control devices is connected via a bidirectional communication link.

\* \* \* \* \*